US011837232B2

(12) United States Patent
Manjunath et al.

(10) Patent No.: US 11,837,232 B2
(45) Date of Patent: Dec. 5, 2023

(54) DIGITAL ASSISTANT INTERACTION IN A VIDEO COMMUNICATION SESSION ENVIRONMENT

(71) Applicant: Apple Inc., Cupertino, CA (US)

(72) Inventors: Niranjan Manjunath, Sunnyvale, CA (US); Willem Mattelaer, San Jose, CA (US); Jessica Peck, Morgan Hill, CA (US); Lily Shuting Zhang, Seattle, WA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/115,721

(22) Filed: Feb. 28, 2023

(65) Prior Publication Data

US 2023/0215435 A1 Jul. 6, 2023

Related U.S. Application Data

(62) Division of application No. 17/158,703, filed on Jan. 26, 2021.

(Continued)

(51) Int. Cl.
*G10L 15/22* (2006.01)
*G10L 15/26* (2006.01)
(Continued)

(52) U.S. Cl.
CPC ............ *G10L 15/22* (2013.01); *G10L 15/083* (2013.01); *G10L 15/1815* (2013.01); *G10L 15/26* (2013.01); *G10L 2015/223* (2013.01)

(58) Field of Classification Search
CPC ... G10L 15/22; G10L 15/083; G10L 15/1815; G10L 15/26; G10L 2015/223

(Continued)

(56) References Cited

U.S. PATENT DOCUMENTS 7,548,895 B2  6/2009 Pulsipher
8,300,776 B2  10/2012 Davies et al.
(Continued)

FOREIGN PATENT DOCUMENTS

CN  102792320 A  11/2012
CN  104427104 A  3/2015
(Continued)

OTHER PUBLICATIONS

Applicant-Initiated Interview Summary received for U.S. Appl. No. 17/158,703, dated Jan. 26, 2023, 3 pages.
(Continued)

*Primary Examiner* — Susan I McFadden
(74) *Attorney, Agent, or Firm* — DLA Piper LLP (US)

(57) ABSTRACT

This relates to an intelligent automated assistant in a video communication session environment. An example method includes, during a video communication session between at least two user devices, and at a first user device: receiving a first user voice input; in accordance with a determination that the first user voice input represents a communal digital assistant request, transmitting a request to provide context information associated with the first user voice input to the first user device; receiving context information associated with the first user voice input; obtaining a first digital assistant response based at least on a portion of the context information received from the second user device and at least a portion of context information associated with the first user voice input that is stored on the first user device; providing the first digital assistant response to the second user device; and outputting the first digital assistant response.

39 Claims, 24 Drawing Sheets

Related U.S. Application Data

(60) Provisional application No. 63/016,083, filed on Apr. 27, 2020, provisional application No. 62/975,643, filed on Feb. 12, 2020.

(51) Int. Cl.
   *G10L 15/18* (2013.01)
   *G10L 15/08* (2006.01)

(58) Field of Classification Search
   USPC .......................................................... 704/275
   See application file for complete search history.

(56) References Cited

U.S. PATENT DOCUMENTS

| | | |
|---|---|---|
| 8,606,576 B1 | 12/2013 | Barr et al. |
| 8,995,972 B1 | 3/2015 | Cronin |
| 9,338,493 B2 | 5/2016 | Van Os et al. |
| 9,378,740 B1 | 6/2016 | Rosen et al. |
| 9,659,298 B2 | 5/2017 | Lynch et al. |
| 9,760,566 B2 | 9/2017 | Heck et al. |
| 9,966,068 B2 | 5/2018 | Cash et al. |
| 10,135,965 B2 | 11/2018 | Woolsey et al. |
| 10,176,808 B1 | 1/2019 | Lovitt et al. |
| 10,223,066 B2 | 3/2019 | Martel et al. |
| 10,269,345 B2 | 4/2019 | Castillo Sanchez et al. |
| 10,356,243 B2 | 7/2019 | Sanghavi et al. |
| 10,832,684 B2 * | 11/2020 | Sarikaya ................. G10L 17/04 |
| 11,038,934 B1 * | 6/2021 | Hansen ................... H04L 43/08 |
| 11,043,220 B1 * | 6/2021 | Hansen ............... H04L 41/0893 |
| 11,183,193 B1 * | 11/2021 | Hansen ................... H04L 67/12 |
| 2009/0248420 A1 | 10/2009 | Basir et al. |
| 2010/0106500 A1 | 4/2010 | Mckee et al. |
| 2010/0278320 A1 | 11/2010 | Arsenault et al. |
| 2011/0202594 A1 | 8/2011 | Ricci |
| 2012/0008754 A1 | 1/2012 | Mukherjee et al. |
| 2012/0016678 A1 | 1/2012 | Gruber et al. |
| 2012/0108221 A1 | 5/2012 | Thomas et al. |
| 2012/0245944 A1 | 9/2012 | Gruber et al. |
| 2014/0006955 A1 | 1/2014 | Greenzeiger et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0181741 A1 | 6/2014 | Apacible et al. |
| 2014/0278343 A1 | 9/2014 | Tran |
| 2014/0297284 A1 | 10/2014 | Gruber et al. |
| 2014/0310348 A1 | 10/2014 | Keskitalo et al. |
| 2015/0066817 A1 | 3/2015 | Slayton et al. |
| 2015/0088514 A1 | 3/2015 | Typrin |
| 2015/0088998 A1 | 3/2015 | Isensee et al. |
| 2015/0095268 A1 | 4/2015 | Greenzeiger et al. |
| 2015/0149177 A1 | 5/2015 | Kalns et al. |
| 2015/0373183 A1 | 12/2015 | Woolsey et al. |
| 2016/0099892 A1 | 4/2016 | Palakovich et al. |
| 2016/0335532 A1 | 11/2016 | Sanghavi et al. |
| 2016/0357861 A1 | 12/2016 | Carlhian et al. |
| 2016/0360039 A1 | 12/2016 | Sanghavi et al. |
| 2016/0373571 A1 | 12/2016 | Woolsey et al. |
| 2017/0346949 A1 | 11/2017 | Sanghavi et al. |
| 2017/0357716 A1 | 12/2017 | Bellegarda et al. |
| 2018/0146089 A1 | 5/2018 | Rauenbuehler et al. |
| 2018/0366118 A1 | 12/2018 | Lovitt et al. |
| 2019/0007228 A1 | 1/2019 | Vuskovic et al. |
| 2020/0104668 A1 | 4/2020 | Sanghavi et al. |
| 2020/0127988 A1 | 4/2020 | Bradley et al. |
| 2021/0249009 A1 | 8/2021 | Manjunath et al. |
| 2023/0013615 A1 | 1/2023 | Sanghavi et al. |
| 2023/0017115 A1 | 1/2023 | Sanghavi et al. |
| 2023/0058929 A1 | 2/2023 | Lasko et al. |

FOREIGN PATENT DOCUMENTS

| | | | |
|---|---|---|---|
| EP | 2787683 | A1 | 10/2014 |
| JP | 2012-502377 | A | 1/2012 |
| JP | 2013-517566 | A | 5/2013 |
| JP | 2015-526776 | A | 9/2015 |
| WO | 2011/088053 | A2 | 7/2011 |
| WO | 2012/063260 | A2 | 5/2012 |
| WO | 2012/063260 | A3 | 10/2012 |
| WO | 2013/176847 | A1 | 11/2013 |
| WO | 2015/047932 | A1 | 4/2015 |
| WO | 2016/187149 | A1 | 11/2016 |

OTHER PUBLICATIONS

Decision on Appeal received for Korean Patent Application No. 10-2017-7033045, dated Feb. 19, 2020, 32 pages.
Decision to Grant received for Japanese Patent Application No. 2017-553158, dated Jun. 14, 2019, 5 pages.
Decision to Refuse received for European Patent Application No. 16725334.3, dated Jul. 13, 2021, 13 pages.
Final Office Action received for U.S. Appl. No. 14/713,410, dated Nov. 30, 2018, 11 pages.
International Preliminary Report on Patentability received for PCT Patent Application No. PCT/US2016/032763, dated Nov. 30, 2017, 10 pages.
International Preliminary Report on Patentability received for PCT Patent Application No. PCT/US2021/015629, dated Aug. 25, 2022, 9 pages.
International Search Report and Written Opinion received for PCT Patent Application No. PCT/US2016/032763, dated Jun. 27, 2016, 12 pages.
International Search Report and Written Opinion received for PCT Patent Application No. PCT/US2021/015629, dated May 14, 2021, 12 pages.
Minutes of Oral Proceedings received for European Patent Application No. 16725334.3, dated Jul. 9, 2021, 6 pages.
Non-Final Office Action received for U.S. Appl. No. 14/713,410, dated Mar. 28, 2018, 12 pages.
Non-Final Office Action received for U.S. Appl. No. 16/595,108, dated Feb. 17, 2022, 17 pages.
Non-Final Office Action received for U.S. Appl. No. 17/158,703, dated Dec. 15, 2022, 10 pages.
Non-Final Office Action received for U.S. Appl. No. 17/158,703, dated Sep. 30, 2022, 5 pages.
Notice of Acceptance received for Australian Patent Application No. 2016265837, dated Jun. 4, 2019, 3 pages.
Notice of Allowance received for Korean Patent Application No. 10-2017-7033045, dated Mar. 10, 2020, 4 pages.
Notice of Allowance received for U.S. Appl. No. 14/713,410, dated Jun. 21, 2019, 5 pages.
Notice of Allowance received for U.S. Appl. No. 16/595,108, dated Jul. 7, 2022, 5 pages.
Notice of Allowance received for U.S. Appl. No. 17/158,703, dated Feb. 16, 2023, 7 pages.
Office Action received European Patent Application No. 16725334.3, dated Dec. 11, 2019, 7 pages.
Office Action received for Australian Patent Application No. 2016265837, dated Nov. 15, 2018, 3 pages.
Office Action received for Chinese Patent Application No. 201680027821.1, dated Aug. 5, 2020, 20 pages.
Office Action received for Chinese Patent Application No. 201680027821.1, dated May 31, 2021, 16 pages.
Office Action received for Chinese Patent Application No. 201680027821.1, dated Nov. 3, 2021, 13 pages.
Office Action received for Japanese Patent Application No. 2017-553158, dated Dec. 3, 2018, 6 pages.
Result of Consultation received for European Patent Application No. 16725334.3, dated Jun. 28, 2021, 15 pages.
Summons to Attend Oral Proceedings received for European Patent Application No. 16725334.3, dated Dec. 15, 2020, 12 pages.
International Search Report and Written Opinion received for PCT Patent Application No. PCT/IB2022/000474, dated Dec. 19, 2022, 16 pages.
Notice of Allowance received for U.S. Appl. No. 17/158,703, dated Jun. 7, 2023, 7 pages.

(56) References Cited

OTHER PUBLICATIONS

Notice of Allowance received for Korean Patent Application No. 10-2022-7027709, dated Jul. 19, 2023, 7 pages (2 pages of English Translation and 5 pages of Official Copy).

* cited by examiner

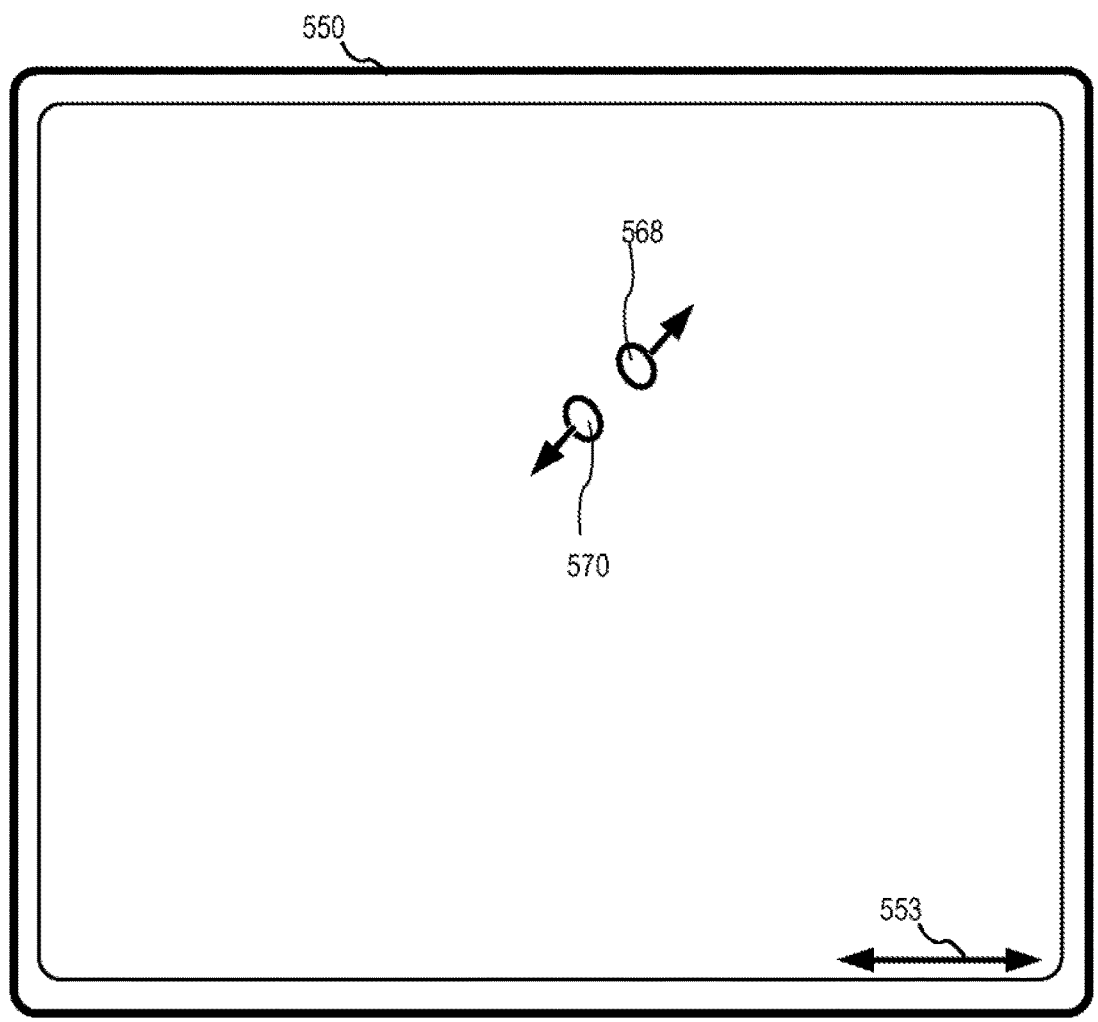
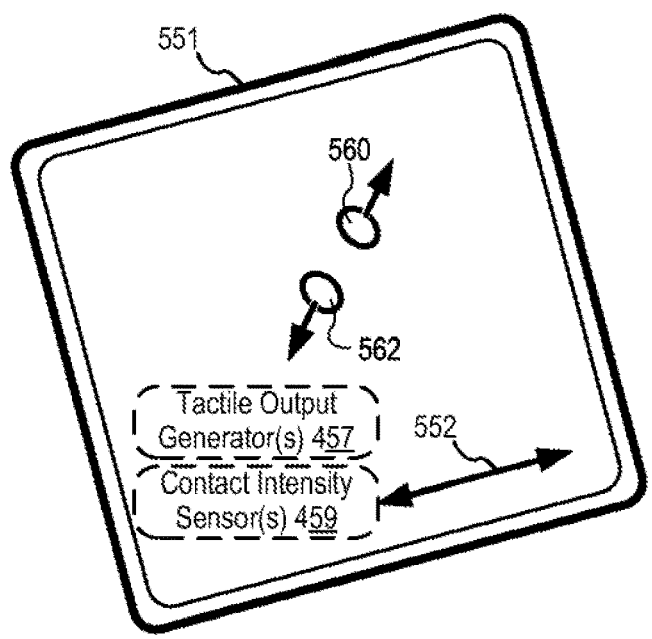
FIG. 5B

DIGITAL ASSISTANT INTERACTION IN A VIDEO COMMUNICATION SESSION ENVIRONMENT

CROSS-REFERENCE TO RELATED APPLICATIONS

This application is a divisional application of U.S. patent application Ser. No. 17/158,703, entitled "DIGITAL ASSISTANT INTERACTION IN A VIDEO COMMUNICATION SESSION ENVIRONMENT," filed Jan. 26, 2021, which claims priority to U.S. Provisional Patent Application No. 62/975,643, entitled "DIGITAL ASSISTANT INTERACTION IN A VIDEO COMMUNICATION SESSION ENVIRONMENT," filed Feb. 12, 2020, and to U.S. Provisional Patent Application No. 63/016,083, entitled "DIGITAL ASSISTANT INTERACTION IN A VIDEO COMMUNICATION SESSION ENVIRONMENT," filed Apr. 27, 2020, the contents of which are hereby incorporated by reference in their entireties for all purposes.

FIELD

This relates generally to intelligent automated assistants and, more specifically, to an intelligent automated assistant in a video communication session environment.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

In some examples, a user of an electronic device may participate in a video communication session with one or more other participants. It thus can be desirable to provide the user and the other participants with digital assistant functionality during the video communication session so that the user and/or the other participants may, for example, request/command their respective digital assistant to perform certain tasks during the video communication session. Further, it can be desirable for the devices participating in the video communication session to share context information during the video communication session so that the digital assistant of each of the devices may, for example, be aware of the digital assistant requests/responses received/provided at the other participating devices. This in turn creates an appearance of a single digital assistant that is participating in the video communication session with the user and the other participants while still allowing the digital assistant of each device participating in the video communication session to locally process requests/commands from their respective users.

Example methods are disclosed herein. An example method includes, during a video communication session between at least two user devices, and at a first user device of the at least two user devices: receiving a first user input; obtaining a first digital assistant response based on the first user input; providing, to a second user device of the at least two user devices, the first digital assistant response and context information associated with the first user input; outputting the first digital assistant response; receiving a second digital assistant response and context information associated with a second user input, wherein the second user input is received at the second user device, and wherein the second digital assistant response is determined based on the second user input and the context information associated with the first user input; and outputting the second digital assistant response.

Another example method includes, during a video communication session between at least two user devices, and at a first user device of the at least two user devices: receiving a first user voice input; generating a textual representation based on the first user voice input; transmitting the textual representation to one or more servers; receiving a shared transcription from the one or more servers, wherein the shared transcription includes the textual representation of the first user voice input and one or more additional textual representations generated by a second user device of the at least two user devices, and wherein the one or more additional textual representations correspond to one or more user voice inputs received at the second user device during the video communication session; and after receiving the shared transcription: determining, based on the textual representations included in the shared transcription, one or more candidate tasks that may be performed by a digital assistant of the first user device; and presenting the one or more candidate tasks.

Another example method includes, during a video communication session between at least two user devices, and at a first user device of the at least two user devices: receiving a first user voice input; determining whether the first user voice input represents a communal digital assistant request; in accordance with a determination that the first user voice input represents a communal digital assistant request, transmitting a request to a second user device of the at least two user devices for the second user device to provide context information associated with the first user voice input to the first user device: receiving context information associated with the first user voice input from the second user device; obtaining a first digital assistant response based at least on a portion of the context information received from the second user device and at least a portion of context information associated with the first user voice input that is stored on the first user device; providing the first digital assistant response to the second user device; and outputting the first digital assistant response.

Example non-transitory computer-readable media are disclosed herein. An example non-transitory computer-readable storage medium stores one or more programs. The one or more programs comprise instructions, which when executed by one or more processors of a first user device during a video communication session between the first user device and at least a second user device, cause the first user device to receive a first user input; obtain a first digital assistant response based on the first user input; provide, to the second user device, the first digital assistant response and context information associated with the first user input; output the first digital assistant response; receive a second digital assistant response and context information associated with a second user input, wherein the second user input is received at the second user device, and wherein the second digital assistant response is determined based on the second user input and the context information associated with the first user input; and output the second digital assistant response.

Another example non-transitory computer-readable storage medium stores one or more programs. The one or more programs comprise instructions, which when executed by one or more processors of a first user device during a video communication session between the first user device and at least a second user device, cause the first user device to receive a first user voice input; generate a textual representation based on the first user voice input; transmit the textual representation to one or more servers; receive a shared transcription from the one or more servers, wherein the shared transcription includes the textual representation of the first user voice input and one or more additional textual representations generated by a second user device of the at least two user devices, and wherein the one or more additional textual representations correspond to one or more user voice inputs received at the second user device during the video communication session; and after receiving the shared transcription: determine, based on the textual representations included in the shared transcription, one or more candidate tasks that may be performed by a digital assistant of the first user device; and present the one or more candidate tasks.

Another example non-transitory computer-readable storage medium stores one or more programs. The one or more programs comprise instructions, which when executed by one or more processors of a first user device during a video communication session between the first user device and at least a second user device, cause the first user device to receive a first user voice input; determine whether the first user voice input represents a communal digital assistant request; in accordance with a determination that the first user voice input represents a communal digital assistant request, transmit a request to a second user device of the at least two user devices for the second user device to provide context information associated with the first user voice input to the first user device; receive context information associated with the first user voice input from the second user device; obtain a first digital assistant response based at least on a portion of the context information received from the second user device and at least a portion of context information associated with the first user voice input that is stored on the first user device; provide the first digital assistant response to the second user device: and outputting the first digital assistant response.

Example electronic devices are disclosed herein. An example user device comprises one or more processors; a memory; and one or more programs, where the one or more programs are stored in the memory and configured to be executed by the one or more processors, the one or more programs including instructions for during a video communication session between the user device and at least a second user device: receiving a first user input; obtaining a first digital assistant response based on the first user input; providing, to a second user device of the at least two user devices, the first digital assistant response and context information associated with the first user input; outputting the first digital assistant response; receiving a second digital assistant response and context information associated with a second user input, wherein the second user input is received at the second user device, and wherein the second digital assistant response is determined based on the second user input and the context information associated with the first user input; and outputting the second digital assistant response.

Another example user device comprises one or more processors; a memory; and one or more programs, where the one or more programs are stored in the memory and configured to be executed by the one or more processors, the one or more programs including instructions for during a video communication session between the user device and at least a second user device: receiving a first user voice input; generating a textual representation based on the first user voice input; transmitting the textual representation to one or more servers; receiving a shared transcription from the one or more servers, wherein the shared transcription includes the textual representation of the first user voice input and one or more additional textual representations generated by a second user device of the at least two user devices, and wherein the one or more additional textual representations correspond to one or more user voice inputs received at the second user device during the video communication session; and after receiving the shared transcription: determining, based on the textual representations included in the shared transcription, one or more candidate tasks that may be performed by a digital assistant of the first user device; and presenting the one or more candidate tasks.

Another example user device comprises one or more processors; a memory; and one or more programs, where the one or more programs are stored in the memory and configured to be executed by the one or more processors, the one or more programs including instructions for during a video communication session between the user device and at least a second user device: receiving a first user voice input; determining whether the first user voice input represents a communal digital assistant request; in accordance with a determination that the first user voice input represents a communal digital assistant request, transmitting a request to a second user device of the at least two user devices for the second user device to provide context information associated with the first user voice input to the first user device; receiving context information associated with the first user voice input from the second user device; obtaining a first digital assistant response based at least on a portion of the context information received from the second user device and at least a portion of context information associated with the first user voice input that is stored on the first user device; providing the first digital assistant response to the second user device; and outputting the first digital assistant response.

An example user device comprises means for during a video communication session between the user device and at least a second user device: receiving a first user input; means for obtaining a first digital assistant response based on the first user input; means for providing, to a second user device of the at least two user devices, the first digital assistant response and context information associated with the first user input; means for outputting the first digital assistant response; means for receiving a second digital assistant response and context information associated with a second user input, wherein the second user input is received at the second user device, and wherein the second digital assistant response is determined based on the second user input and the context information associated with the first user input; and means for outputting the second digital assistant response.

Another example user device comprises means for during a video communication session between the user device and at least a second user device: receiving a first user voice input; means for generating a textual representation based on the first user voice input; means for transmitting the textual representation to one or more servers; means for receiving a shared transcription from the one or more servers, wherein the shared transcription includes the textual representation of the first user voice input and one or more additional textual representations generated by a second user device of the at least two user devices, and wherein the one or more additional textual representations correspond to one or more user voice inputs received at the second user device during the video communication session; and after receiving the shared transcription: means for determining, based on the textual representations included in the shared transcription, one or more candidate tasks that may be performed by a digital assistant of the first user device; and means for presenting the one or more candidate tasks.

Another example user device comprises means for during a video communication session between the user device and at least a second user device: receiving a first user voice input: means for determining whether the first user voice input represents a communal digital assistant request; in accordance with a determination that the first user voice input represents a communal digital assistant request, means for transmitting a request to a second user device of the at least two user devices for the second user device to provide context information associated with the first user voice input to the first user device; means for receiving context information associated with the first user voice input from the second user device; means for obtaining a first digital assistant response based at least on a portion of the context information received from the second user device and at least a portion of context information associated with the first user voice input that is stored on the first user device; means for providing the first digital assistant response to the second user device; and means for outputting the first digital assistant response.

In some examples, receiving, at a first user device (and during a video communication session), a second digital assistant response and context information associated with a second user input, wherein the second user input is received at a second user device, and wherein the second digital assistant response is determined based on the second user input and the context information associated with a first user input (received at the first user device), may improve a video communication session experience involving digital assistants. Specifically, using context information associated with the first user input to determine the second digital assistant response allows a digital assistant of the second user device to provide a digital assistant response that is based on, and/or is in furtherance to, the first user input even though the first user input was not provided by a user of the second user device. In this manner, a user of the second user device may provide a digital assistant request (e.g., in the second user input) in a more natural and conversational manner, and without having to repeat certain aspects of a request if those aspects were already introduced in the first user input. For example, if the first user input includes the user request "Hey Siri, what's the weather like in Palo Alto?", a user of the second user device can subsequently request weather information with respect to New York by providing the second user input "Hey Siri, how about in New York?" instead of having to repeat that weather information is desired (e.g., "Hey Siri, what's the weather like in New York?"). This in turn creates an appearance of a single digital assistant that is participating in the video communication session with the users of the first user device and the second user device, which as mentioned above, may ultimately improve the users' video communication session experience.

In some examples, determining, based on textual representations included in a shared transcription, one or more candidate tasks that may be performed by a digital assistant of a first user device allows the digital assistant of the first user to proactively determine one or more tasks that a user of the first user device may want the digital assistant to perform based on conversations held during a video communication session. In this manner, the digital assistant prevents the user from having to separately request such tasks, ensures that the user does not forget to request such tasks, and/or informs the user of tasks that the digital assistant is capable of performing (e.g., that the user was not previously aware of). This in turn may improve the user's experience with respect to video communication sessions and the digital assistant of the first user device.

In some examples, determining whether the first user voice input represents a communal digital assistant request at a first user device of at least two user devices participating in a video communication session, and in accordance with a determination that the first user voice input represents a communal digital assistant request, transmitting a request to a second user device of the at least two user devices for the second user device to provide context information associated with the first user voice input to the first user device, may improve a video communication session experience involving digital assistants. Specifically, determining whether a user voice input is a communal digital assistant request and subsequently transmitting a request for context information associated with the user voice input to the second user device (if the user voice input is a communal digital assistant request) allows users of the first user device and second user device to provide digital assistant requests during the video communication session in a more natural and conversational manner. For example, instead of each user having to individually provide the same digital assistant request (e.g., "Hey Siri, when am I free today?") during the video communication session, a user of the first user device can provide a communal digital assistant request (e.g., "Hey Siri, find a time for us to meet.") and, as will be described in greater detail below, the first user device can subsequently obtain and provide one or more digital assistant responses that take context information from both the first user device and the second user device into account (e.g., "You and John are all free today at 5:30 PM."). This in turn creates an appearance of a single digital assistant that is participating with the users of the first user device and the second user device (as opposed to an individual digital assistant for each user device) and that is aware of the context of the users/user devices. This ultimately improves the video communication session experience for the users of the first user device and the second user device.

BRIEF DESCRIPTION OF THE DRAWINGS

FIG. 5B illustrates an exemplary user interface for a multifunction device with a touch-sensitive surface that is separate from the display, according to various examples.

DETAILED DESCRIPTION

Figure 1:
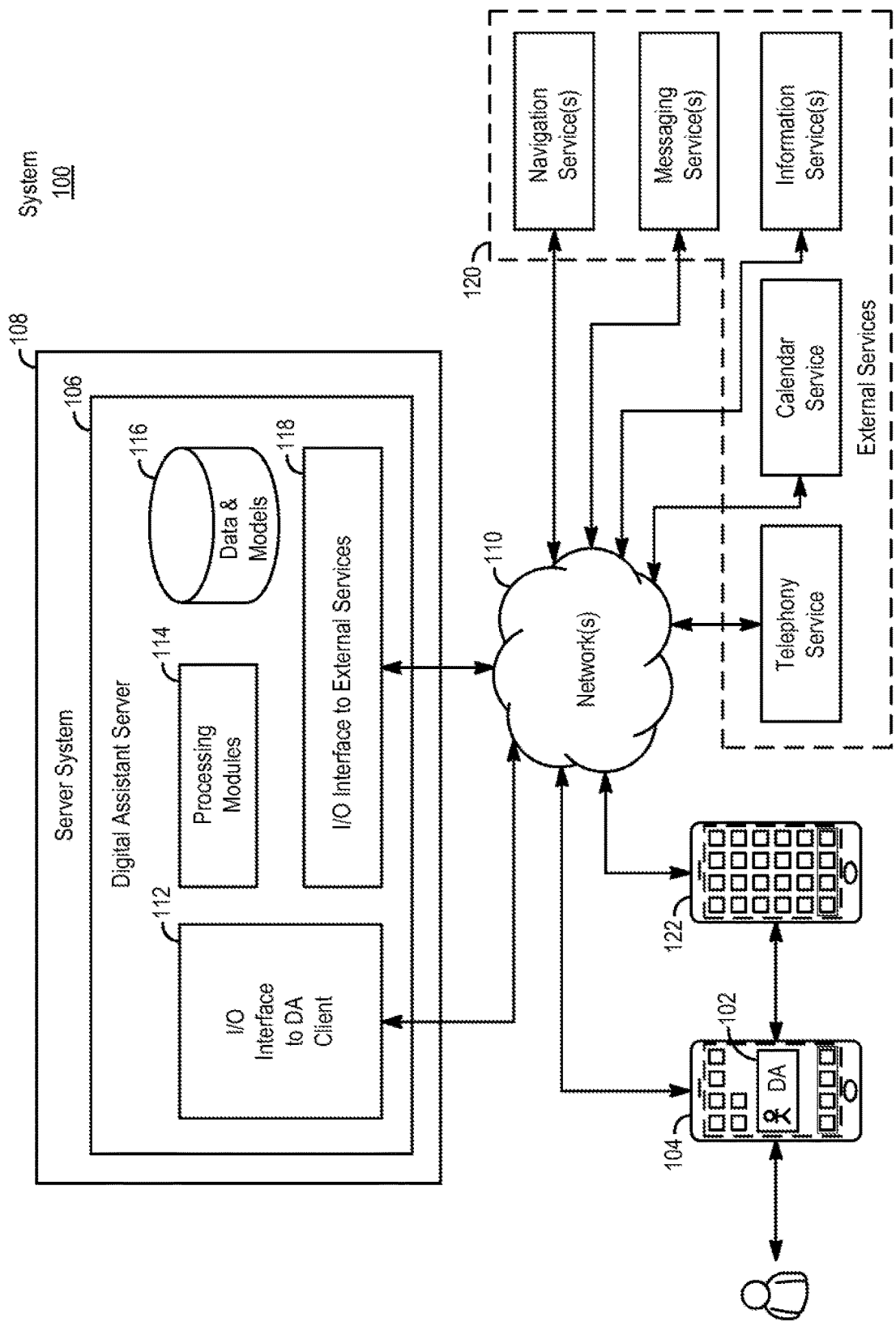
FIG. 1 is a block diagram illustrating a system and environment for implementing a digital assistant, according to various examples.

In the following description of examples, reference is made to the accompanying drawings in which are shown by way of illustration specific examples that can be practiced. It is to be understood that other examples can be used and structural changes can be made without departing from the scope of the various examples.

The present disclosure relates to an intelligent automated assistant in a video communication session environment. For example, the present disclosure describes providing a context-aware digital assistant at multiple user devices participating in a video communication session by using context information from a first user device to determine a digital assistant response at a second user device. In this manner, users participating in the video communication session may interact with the digital assistant during the video communication session as if the digital assistant is another participant in the video communication session. The present disclosure further describes automatically determining candidate digital assistant tasks based on a shared transcription of user voice inputs received at user devices participating in a video communication session. In this manner, a digital assistant of a user device participating in a video communication session may proactively determine one or more tasks that a user of the user device may want the digital assistant to perform based on conversations held during the video communication session.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two.

For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
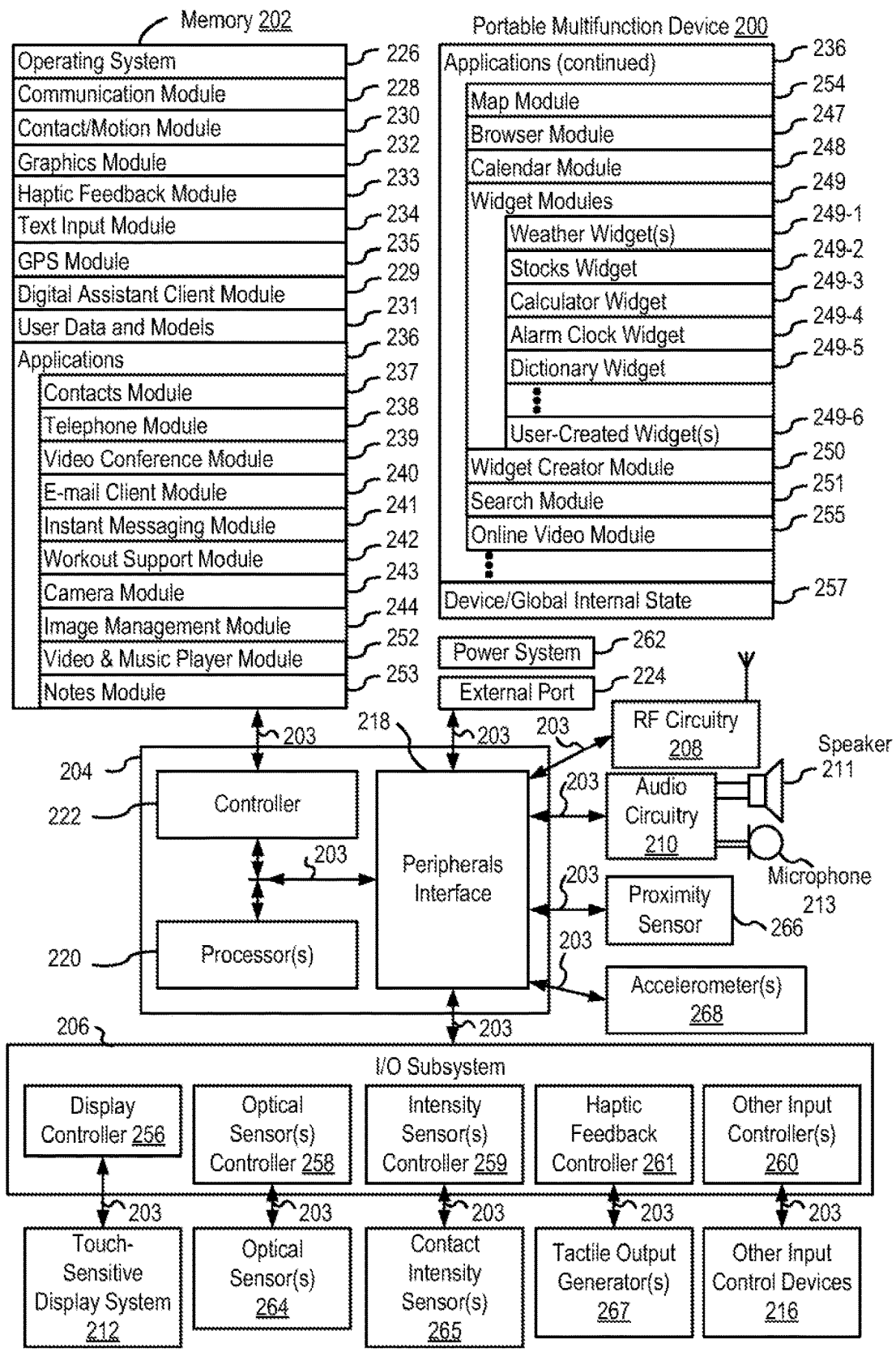
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® V from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in LO subsystem 206. Proximity sensor 266 is performed as described in U.S. patent application Ser. No. 11/241,839, "Proximity Detector In Handheld Device"; Ser. No. 11/240,788, "Proximity Detector In Handheld Device" Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
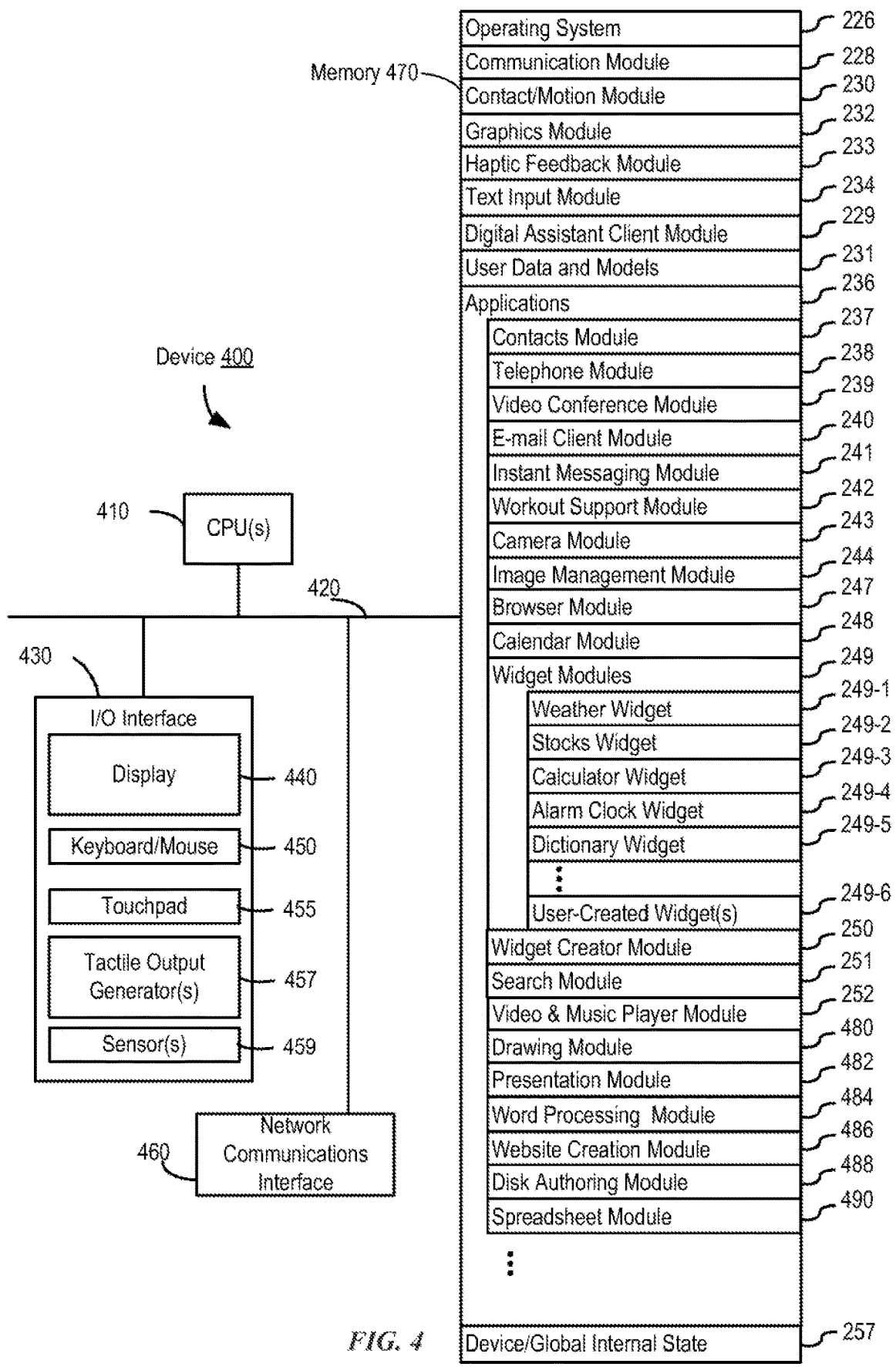
FIG. 4 is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
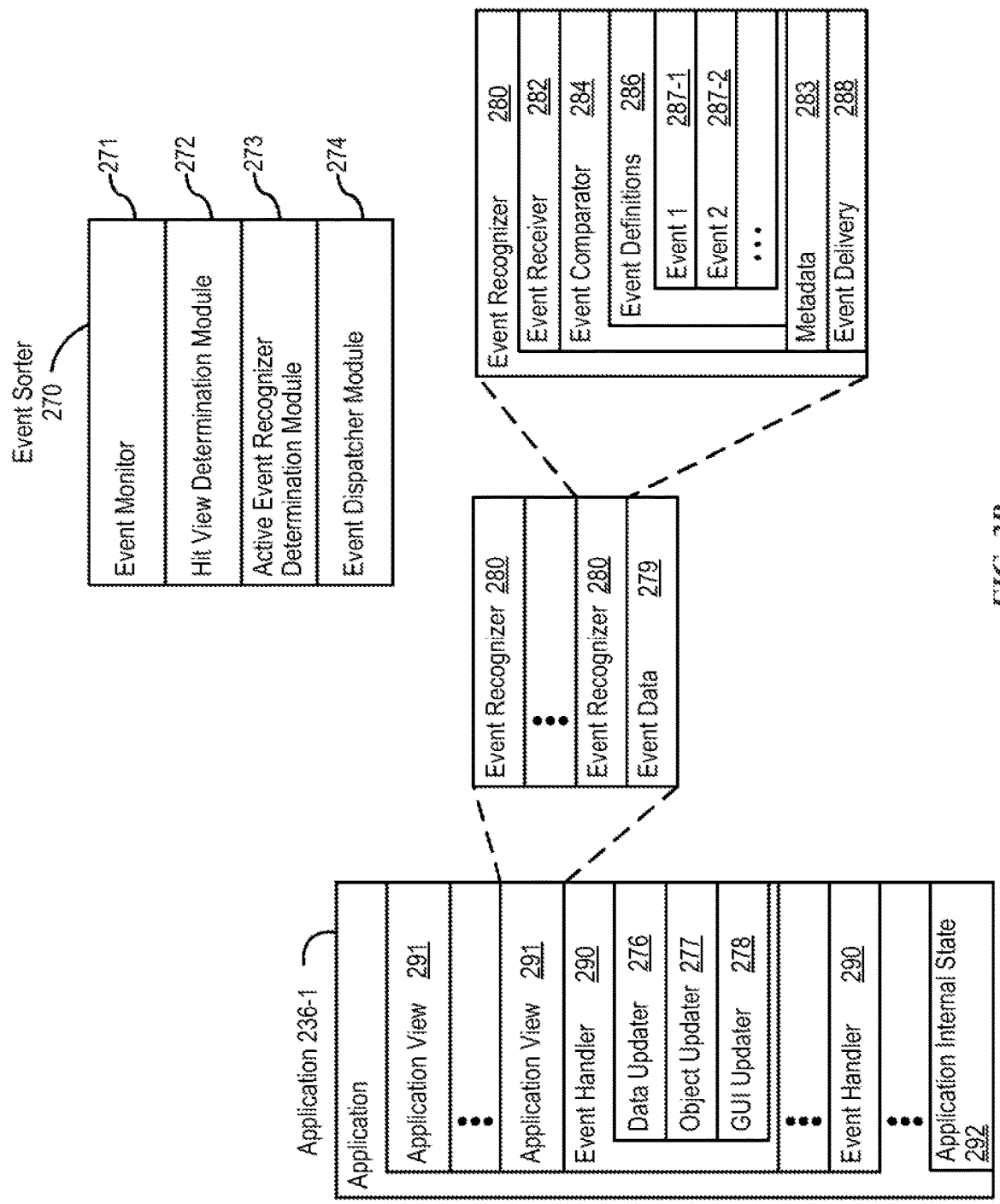
FIG. 2B is a block diagram illustrating exemplary components for event handling, according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
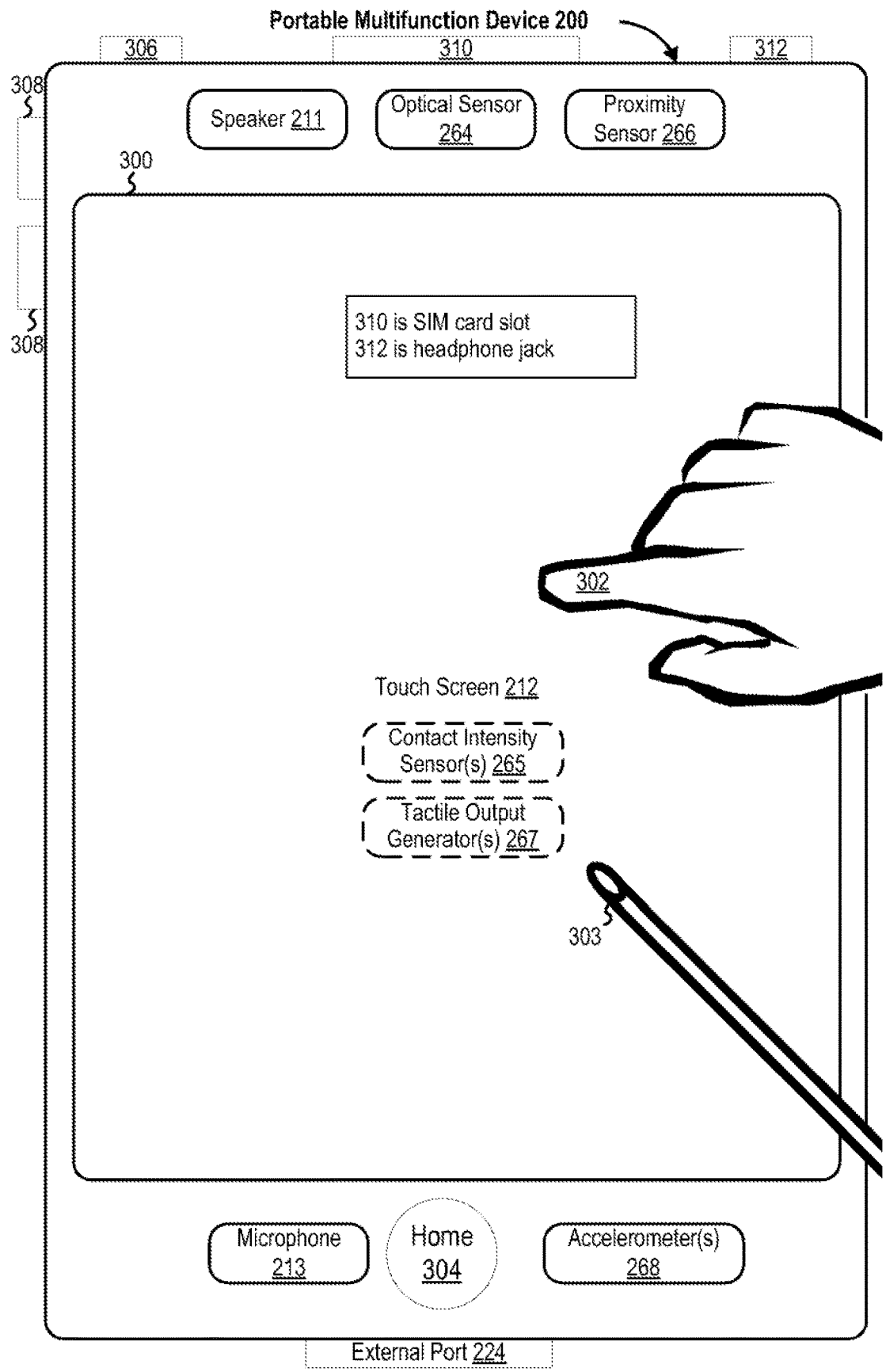
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
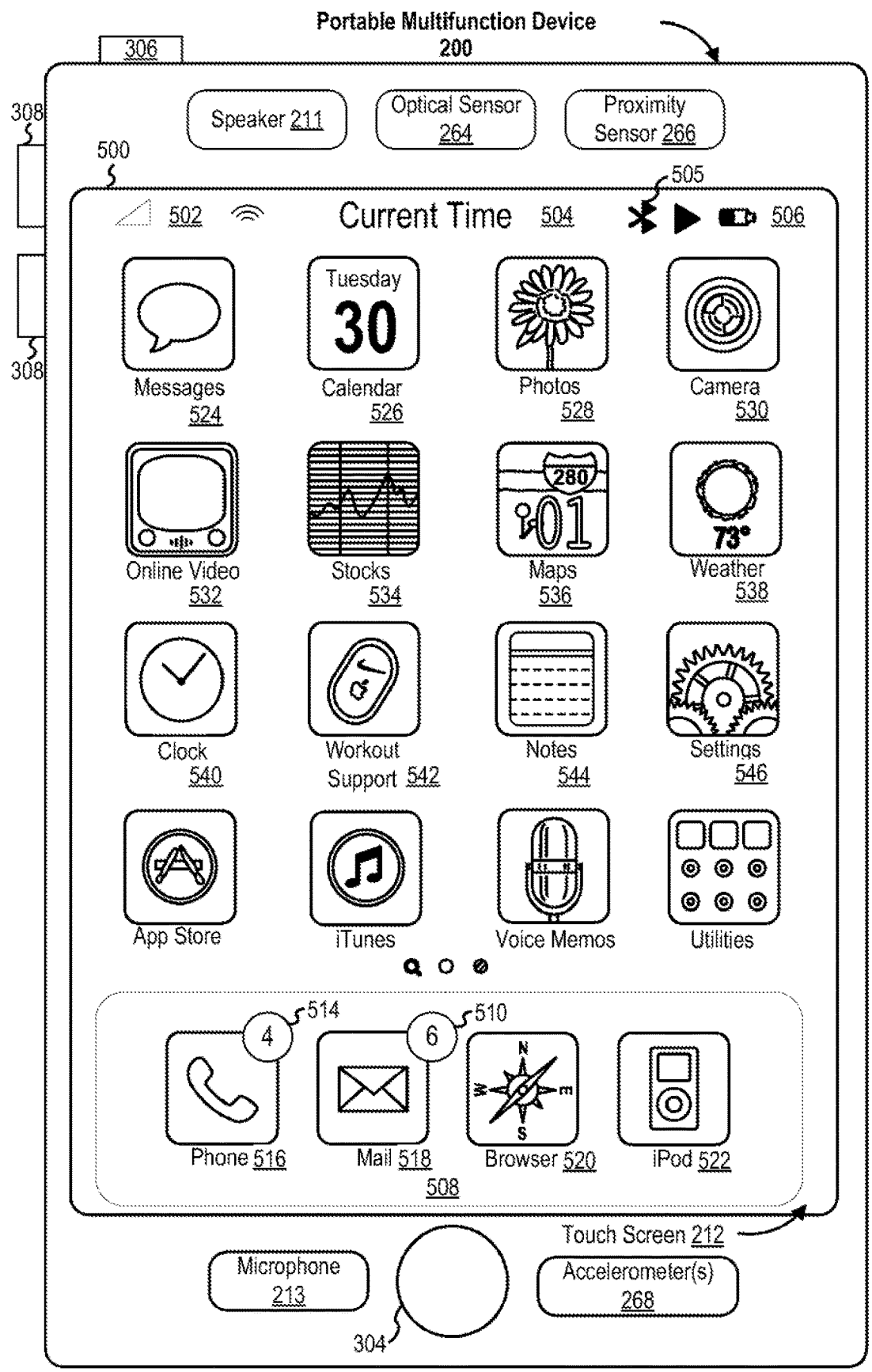
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages;
  Icon 518 for e-mail client module 240, labeled "Mail," which optionally includes an indicator 510 of the number of unread e-mails;
  Icon 520 for browser module 247, labeled "Browser;" and
  Icon 522 for video and music player module 252, also referred to as iPod (trademark of Apple Inc.) module 252, labeled "iPod;" and
Icons for other applications, such as:
  Icon 524 for IM module 241, labeled "Messages;"
  Icon 526 for calendar module 248, labeled "Calendar,"
  Icon 528 for image management module 244, labeled "Photos;"
  Icon 530 for camera module 243, labeled "Camera;"
  Icon 532 for online video module 255, labeled "Online Video;"
  Icon 534 for stocks widget 249-2, labeled "Stocks;"
  Icon 536 for map module 254, labeled "Maps;"
  Icon 538 for weather widget 249-1, labeled "Weather;"
  Icon 540 for alarm clock widget 249-4, labeled "Clock;"
  Icon 542 for workout support module 242, labeled "Workout Support;"
  Icon 544 for notes module 253, labeled "Notes;" and
  Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
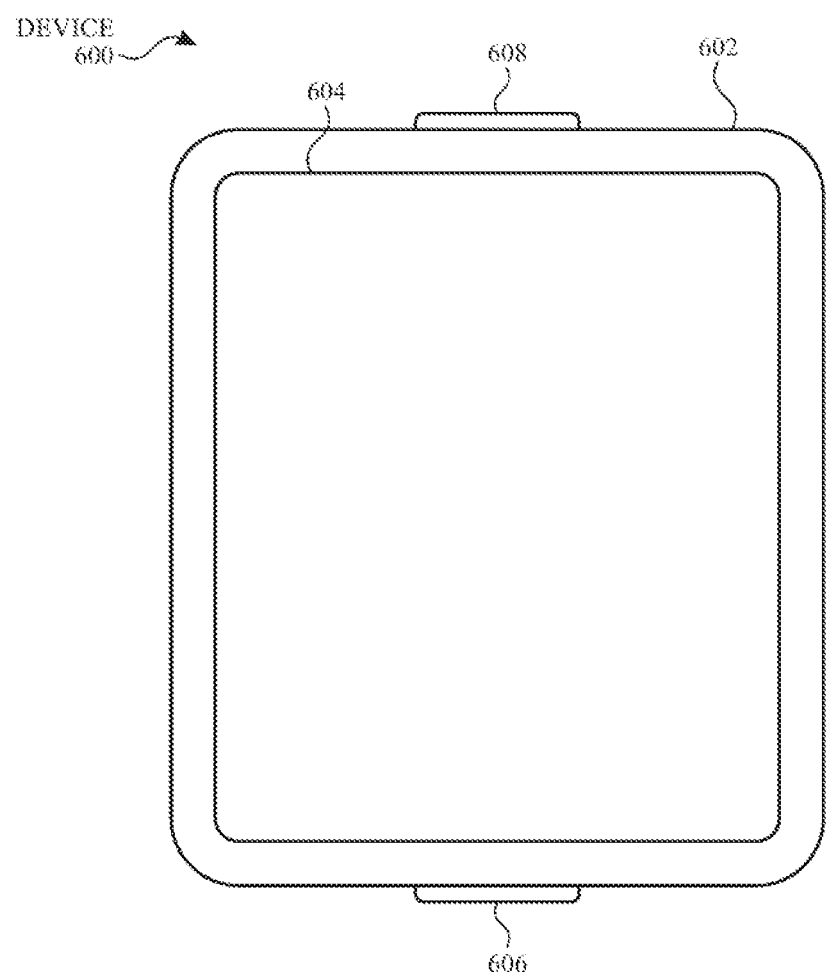
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
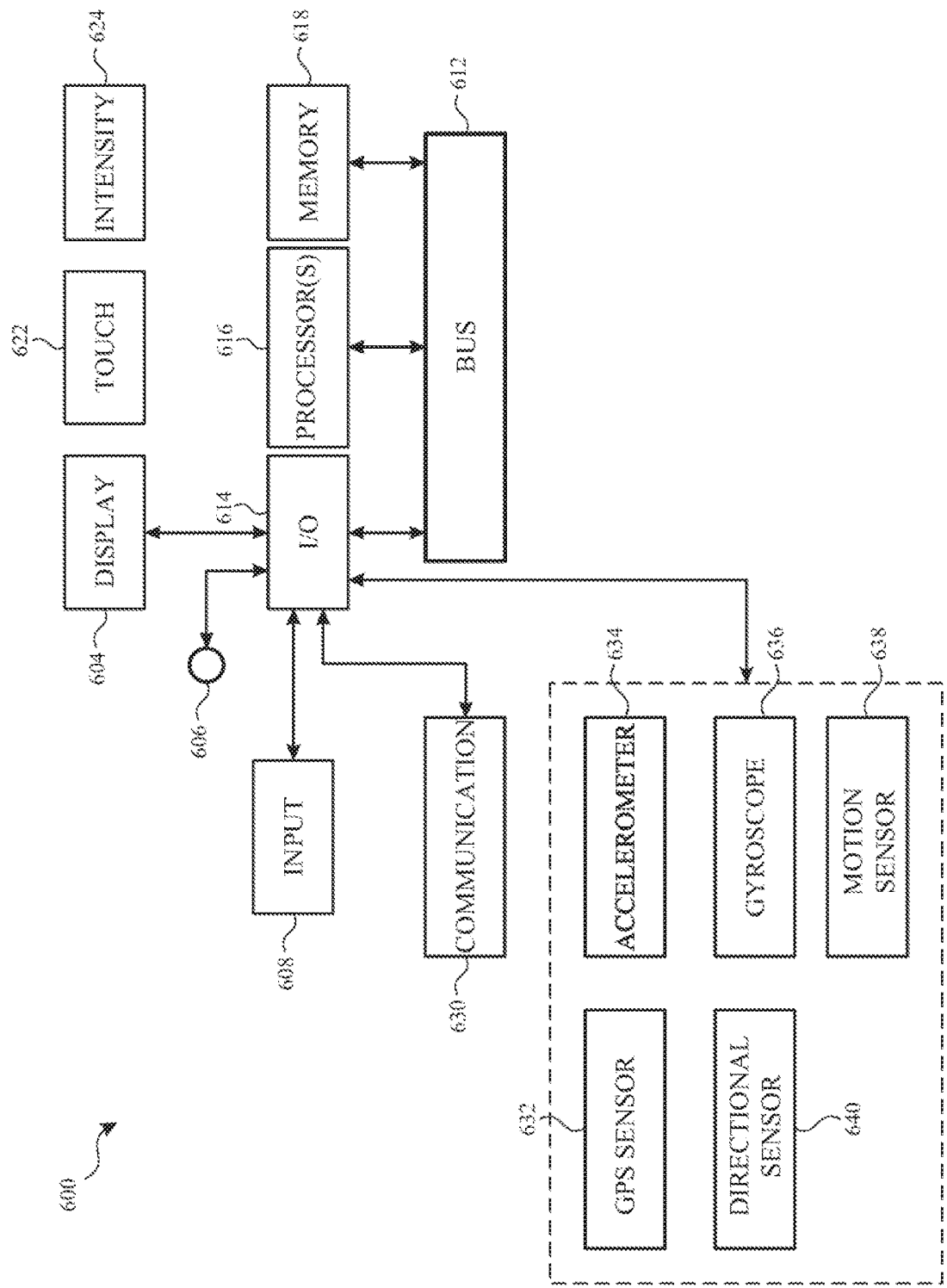
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to U/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2A, 4, and 6A-B). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
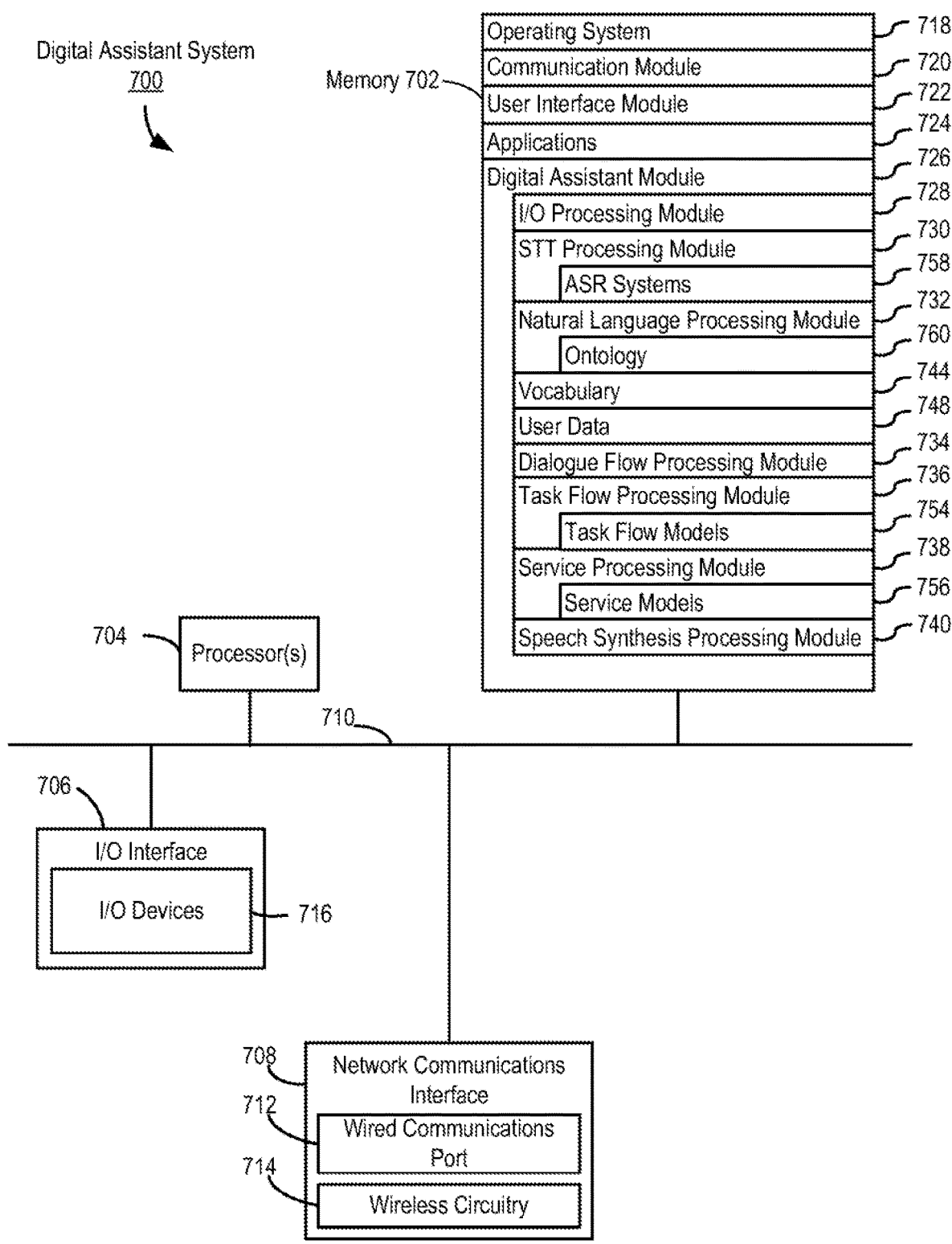
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following submodules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user, actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
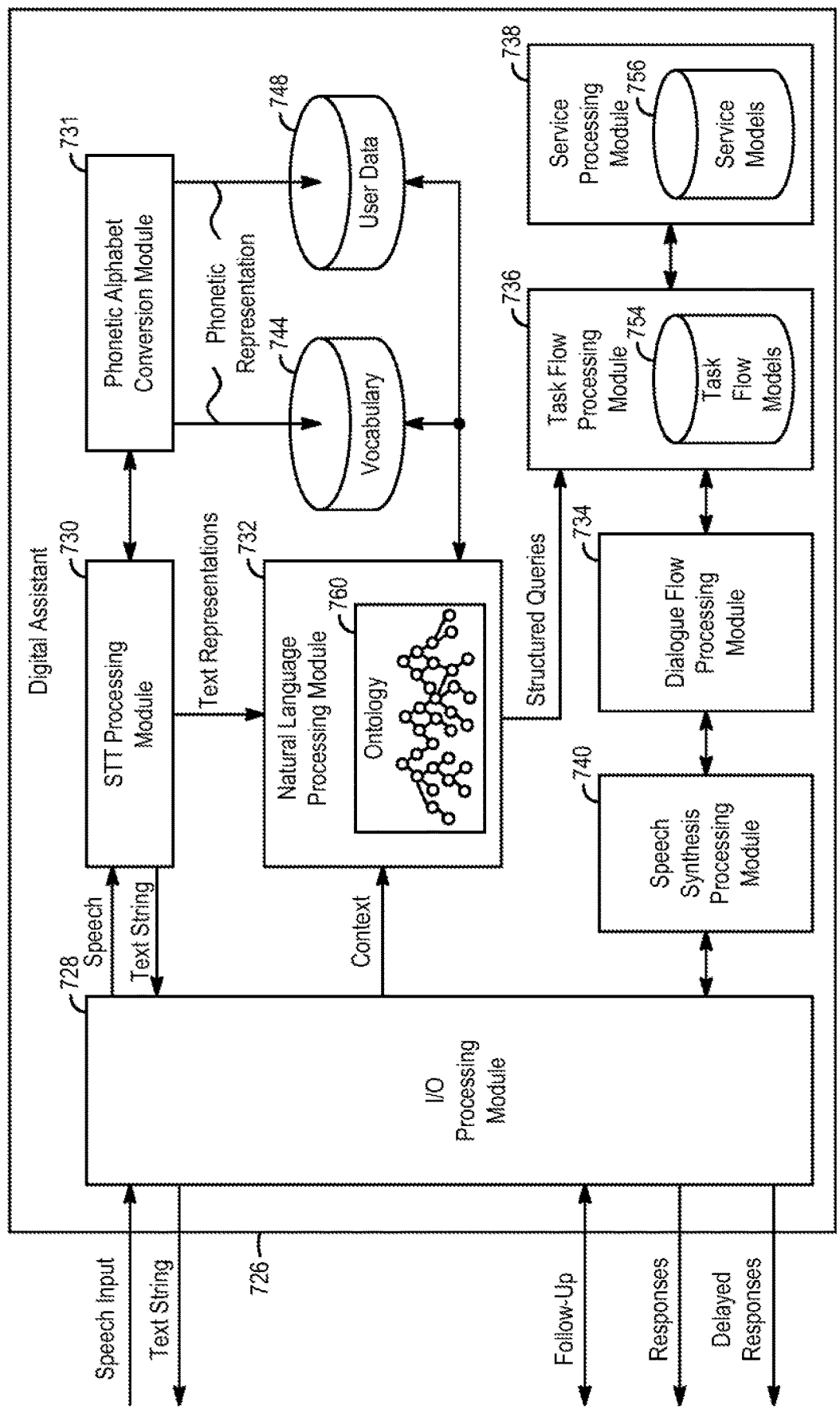
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. LO processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by 1I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," fled on Sep. 20, 2011, the entire disclosure of which is incorporated herein by reference.

In some examples, ST processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /tə'meɪroʊ/ and /tə'mɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /tə'meɪroʊ/ is ranked higher than /tə'meɪroʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /tə'meɪroʊ/ is associated with the United States, whereas the candidate pronunciation /tə'mɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /tə'meɪroʊ/ (associated with the United States) is ranked higher than the candidate pronunciation /tə'meɪroʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /tə'meɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /tə'meɪroʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
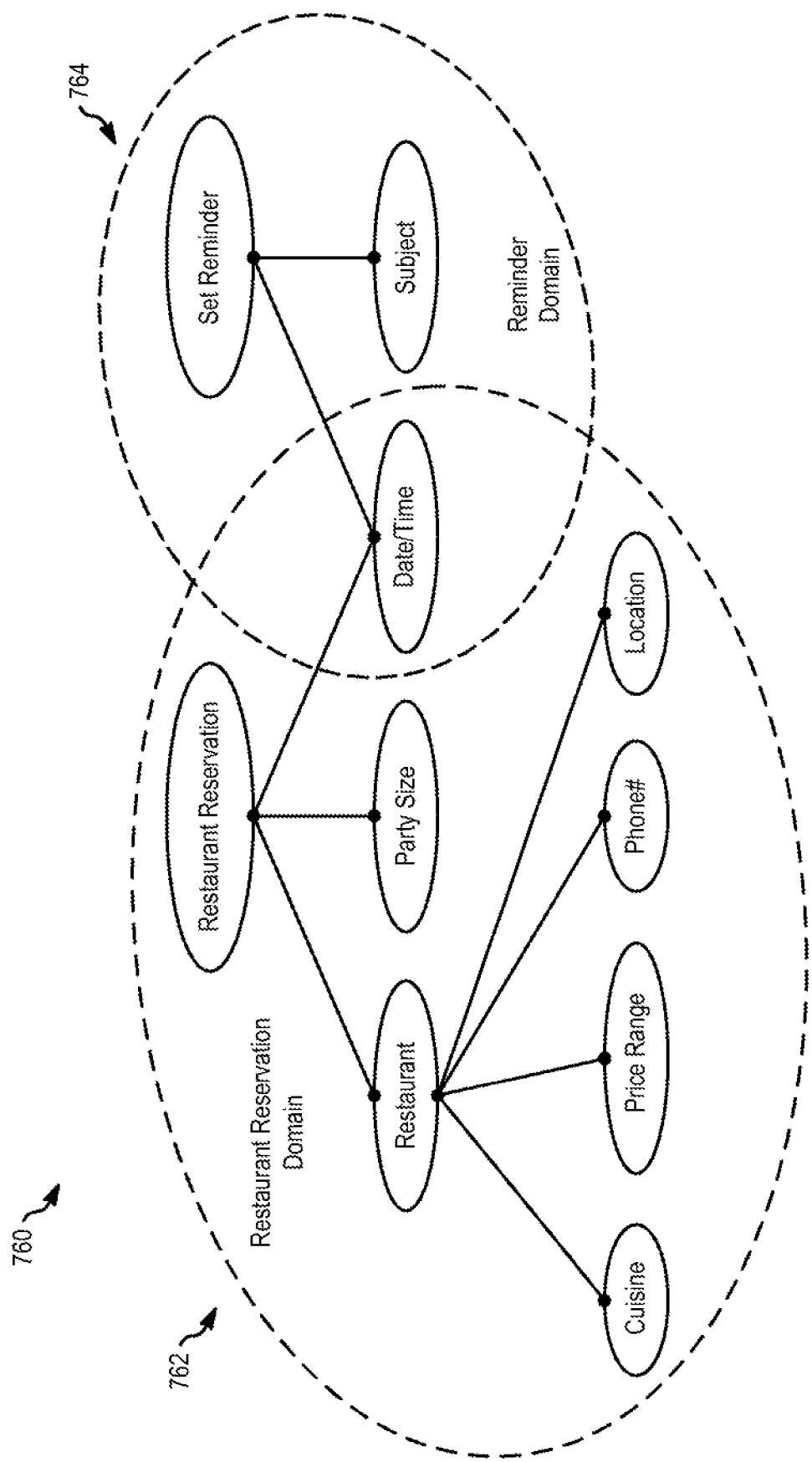
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring." "call this number." "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Figure 8:
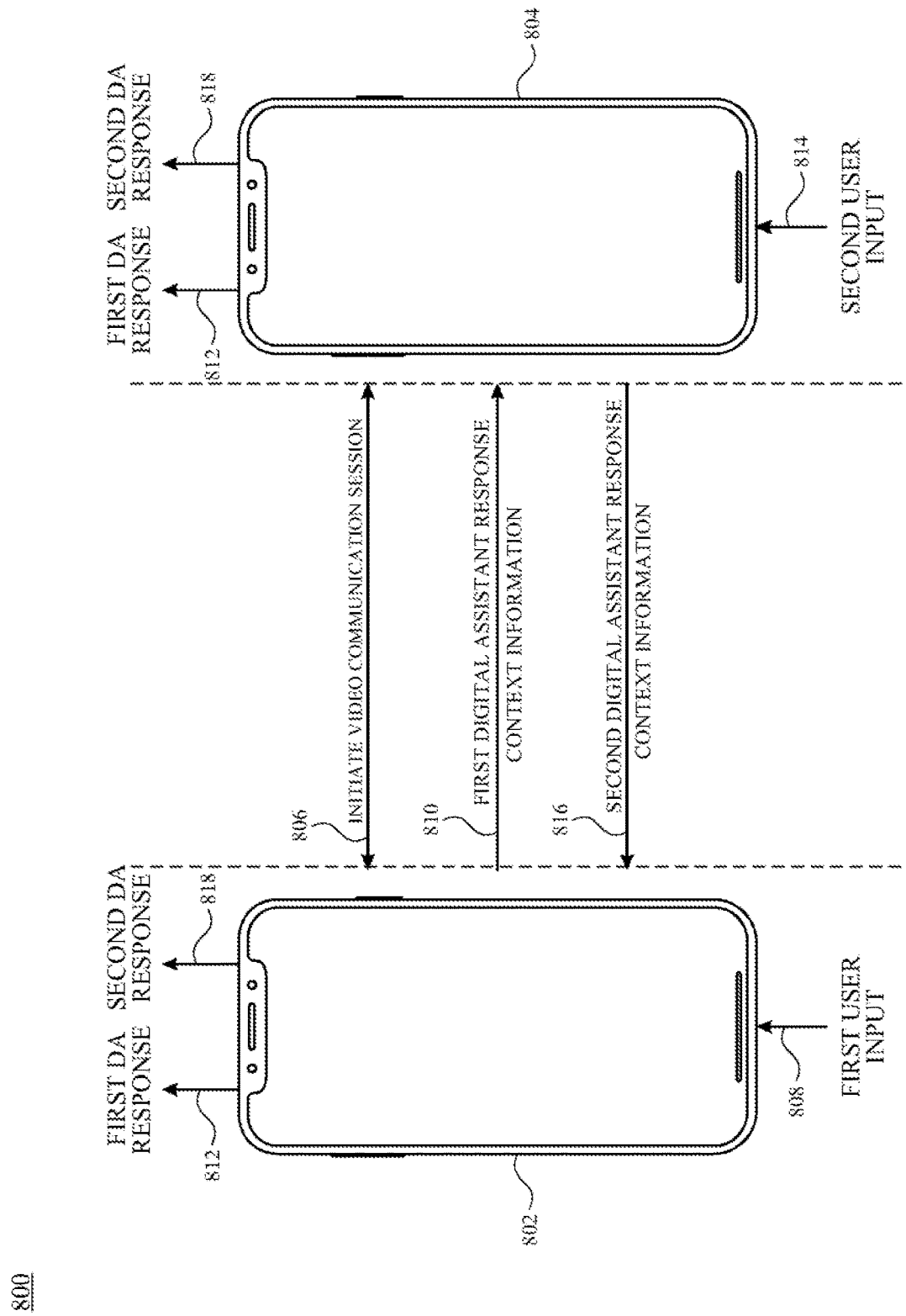
FIG. 8 illustrates a system and technique for providing context-aware digital assistant responses during a video communication session, according to various examples.

4. System and Technique for Providing Context-Aware Digital Assistant Responses During a Video Communication Session FIG. 8 illustrates a system and technique for providing context-aware digital assistant responses during a video communication session, according to various examples. System 800 includes user device 802 and user device 804. User device 802 and user device 804 are both client devices (e.g., user devices 104, 122, 200, 400, or 600). In some examples, system 800 includes one or more servers (e.g., DA server 106). It should be recognized that, in these examples, any of the operations performed by user device 802 and/or user device 804 can instead be performed by the one or more servers. For example, the one or more servers can perform the operations of the respective DA client modules (e.g., DA client module 229) of user device 802 and/or user device 804.

As represented by arrow 806, user device 802 and user device 804 initiate a video communication session (e.g., a video conference). In some examples, more than two user devices (e.g., four user devices) participate in the video communication session. In some examples, initiating a video communication session establishes one or more audio streams between each user device participating in the video communication session. For example, upon initiating a video communication session, user device 802 and user device 804 establish a first audio stream between one another. If, for example, a third user device were to join the video communication session, the third user device would establish a second audio stream between itself and user device 802 and a third audio stream between itself and user device 804. In some examples, the remaining steps of the technique (described in greater detail below with reference to FIG. 8) occur during an initiated video communication session between user device 802 and user device 804.

Figure 9:
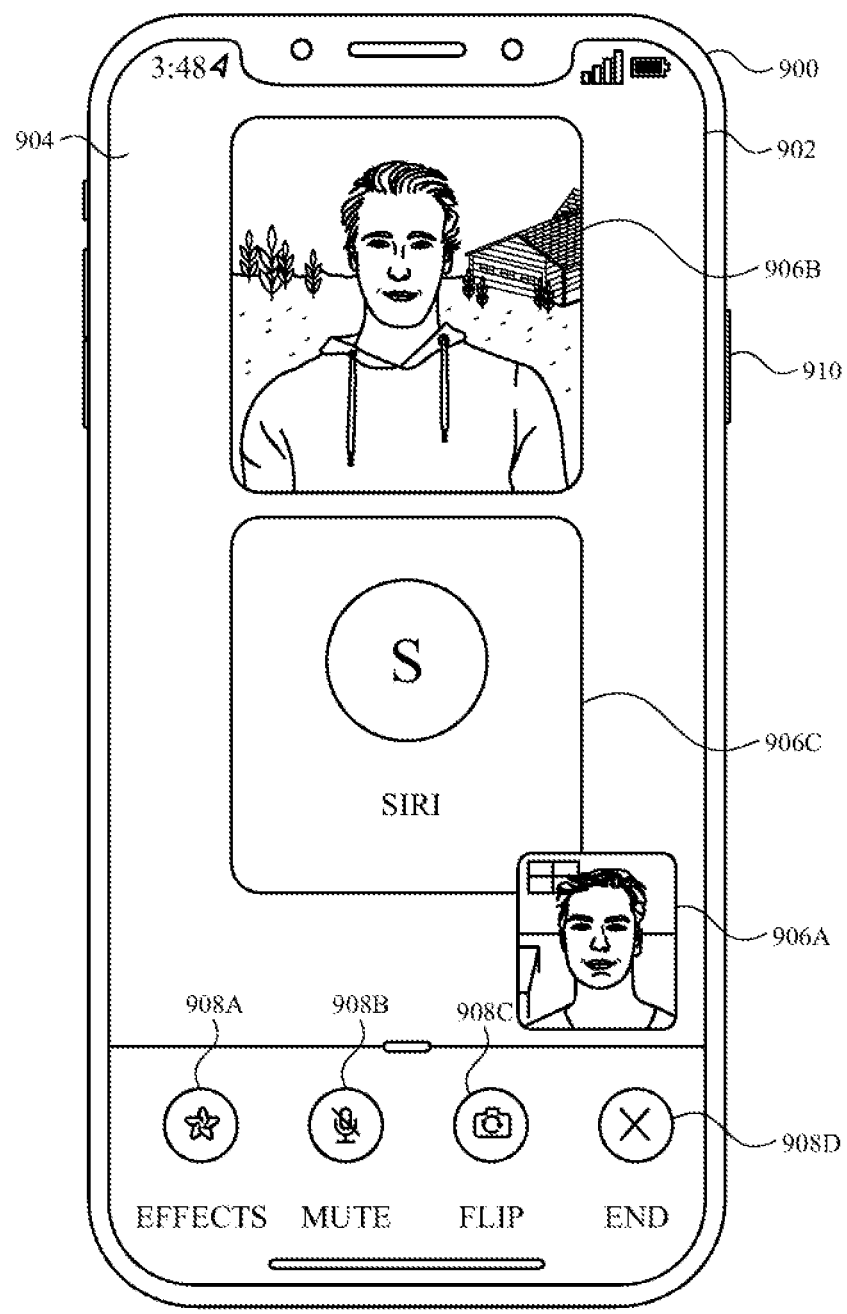
FIG. 9 illustrates an exemplary user interface for a video communication session, according to various examples.

FIG. 9 illustrates an exemplary user interface for a video communication session, according to various examples. Specifically, FIG. 9 illustrates user device 900 (e.g., user device 104, 122, 200, or 600). User device 900 is similar or identical to user device 802 and/or user device 804. In the non-limiting exemplary embodiment illustrated in FIG. 9, user device 900 is a smartphone. In other embodiments, user device 900 can be a different type of user device, such as a wearable device (e.g., a smartwatch or smart glasses), tablet, lap-top, or desk-top computer device, or the like. As shown, user device 900 includes display 902. In some examples, user device 900 includes one or more input devices (e.g., touchscreen of display 902, button 910, a microphone, etc.).

In FIG. 9, user device 900 displays, on display 902 (e.g., touch-sensitive display system 212), video communication session interface 904. Video communication session interface 904 is an exemplary user interface for a video communication session (e.g., a video conference) between two user devices (e.g., user device 802 and user device 804). As shown, video communication session interface 904 includes representations of three participants in the video communication session. Representation 906A includes a view from a camera (e.g., optical sensor 164) of user device 900 (e.g., user device 802). Representation 906B includes a live video feed from a second user device (e.g., user device 804).

In some examples, a representation (e.g., representation 906B) includes a representative image for a user device that is providing only audio data (e.g., because video data is unavailable). For example, the representative image may include one or more letters representing a participant (e.g., the first letter of the participant's contact name stored on user device 900) and/or the participant's full name (e.g., the full participant contact name stored on user device 900). Further, the representative image may be any two-dimensional shape (e.g., circle, square, rectangle, triangle, or the like) or any three-dimensional shape (e.g., sphere, cube, pyramid, or the like). In some examples, a representation (e.g., representation 906B) includes an avatar (e.g., an icon or figure representing a particular person). For example, the avatar may represent a user of the user device that is providing only audio data. In some examples, one or more movements of the avatar (e.g., movements of the avatar lips, eyes, and/or head) are synchronized with the audio data received from a user device that is providing only audio data. In this manner, the avatar appears to be speaking and/or moving in accordance with the audio output generated based on the audio data.

Representation 906C includes a representative image for a digital assistant of user device 900. As shown, the representative image for the digital assistant includes the letter "S" and the name "Siri." However, the representative image for the digital assistant is not limited to this example, and may include any other image, letter, name, number, or combination thereof. Further, a representative image for a digital assistant may be any two-dimensional shape (e.g., circle, square, rectangle, triangle, or the like) or any three-dimensional shape (e.g., sphere, cube, pyramid, or the like). In some examples, a representative image for a digital assistant includes an avatar. In some examples, one or more movements of the avatar (e.g., movements of the avatar lips, eyes, and/or head) are synchronized with a digital assistant response (i.e., the audio output for a digital assistant response). In this manner, the avatar appears to be speaking and/or moving in accordance with a digital assistant response.

Lastly, video communication session interface 904 includes effects affordance 908A, mute affordance 908B, flip affordance 908C, and end affordance 908D.

As will be discussed in greater detail below with respect to FIG. 8, the digital assistant of user device 900 is represented in video communication session interface 904 as representation 906C because the digital assistant is capable of interacting with one or more participants of the video communication session (e.g., with a user of user device 900 and/or a user of the second user device). Specifically, in some examples, when the digital assistant is invoked by a participant during a video communication session (e.g., the user of user device 900), the participant can request the digital assistant to perform a task and the digital assistant can subsequently provide a response to the participant's request. Further, in some examples, each participant of the video communication session can hear the digital assistant request and the subsequent digital assistant response. This in turn creates the appearance of a single digital assistant that is actively participating in a video communication session between multiple participants.

Note, in some examples, a user interface for a video communication session is based on a number of user devices participating in the video communication session. For example, if a third user device joined the video communication session illustrated in FIG. 9, video communication session interface 904 would transition to a new video communication session interface having an additional representation for the third user device (e.g., representation 906D). In these examples, the additional representation would include a live video feed from the third user device or a representative image for the third user device.

Further, in some examples, each user device participating in a video communication session has an activity level that is used to determine a layout of the representations included in a video communication session user interface (e.g., a layout of representations 906A and 906B of video communication session interface 904). In some examples, the activity level of a user device is based on an audio and/or video feed (e.g., motion or sound in the video feed) received from the user device. In some examples, the activity level of a participant is based on movement identified in a video feed received from the user device that meets a set of movement criteria (e.g., movement that is of a certain type (e.g., hand movement, head/face movement, movement that is not background movement (e.g., non-participant movement)).

In some examples, a digital assistant has an activity level that is used to determine a layout of a representation for the digital assistant included in the video communication session interface (e.g., a layout of representation 906C). In some examples, the activity level of a digital assistant is based on an audio feed of the digital assistant (e.g., based on audio responses provided by the digital assistant and/or outputted by a user device (e.g., user device 900)).

Returning to FIG. 8, as represented by arrow 808, user device 802 receives a first user input. In some examples, the first user input is a user voice input. In some examples, the first user input includes a digital assistant trigger (e.g., "Hey Siri", "Siri", or the like) that invokes a digital assistant of user device 802 (e.g., initiates a dialog session between a user of user device 802 and a digital assistant of user device 802). For example, the first user input can include a digital assistant trigger at the beginning of the first user input (e.g., "Hey Siri, what's the weather like in Palo Alto?"). As another example, the first user input can include a digital assistant trigger at the end of the first user input (e.g., "What's the weather like in Palo Alto, Siri?"). In some examples, in response to determining that the first user input includes a digital assistant trigger, user device 802 determines that the first user input represents a user request for a digital assistant of user device 802 to perform one or more tasks (and, in some examples, provide one or more digital assistant responses to the user request). For example, the user input "Hey Siri, what's the weather like in Palo Alto?" represents a user request for the digital assistant to retrieve and provide weather information for Palo Alto. In some examples, the first user input represents a user request for a digital assistant of user device 802 to perform one or more tasks (and, in some examples, provide one or more digital assistant responses to the user request) even if the first user input does not include a digital assistant trigger. In these examples, the digital assistant of user device 802 is invoked prior to receiving the first user input. For example, the digital assistant of user device 802 may be invoked in response to a user selection of an affordance displayed in a user interface for the video communication session. As another example, the digital assistant of user device 802 may be invoked in response to a user of user device 802 pressing (e.g., long pressing) a physical button of user device 802. In these examples, user device 802 may receive the first user input once the digital assistant of user device 802 has been invoked.

In some examples, in response to receiving the first user input, user device 802 transmits the first user input (e.g., audio data or text data representing the first user input) to user device 804. In some examples, user device 802 transmits the first user input to user device 804 as a peer-to-peer transmission (e.g., using an audio stream established between the two user devices when the video communication session was initiated). In other examples, user device 802 transmits the first user input to one or more servers (e.g., DA server 106), which then transmit the first user input (e.g., audio data representing the first user input) to user device 804. In some examples, after receiving the first user input, user device 804 outputs the first user input as an audio output (e.g., using speaker 211).

Upon receiving the first user input, user device 802 obtains a first digital assistant response based on the first user input. In some examples, obtaining the first digital assistant response includes user device 802 performing natural language processing of the first user input, determining one or more tasks to perform based on results of the natural language processing, and performing the one or more tasks to determine the first digital assistant response (e.g., performing a search, retrieving data, performing text-to-speech processing, etc.). In some examples, obtaining the first digital assistant response includes user device 802 transmitting the first user input (e.g., audio data representing the first user input) to one or more servers (e.g., DA server 106) and subsequently receiving the first digital assistant response from the one or more servers (e.g., after the one or more servers perform natural language processing of the first user input and perform one or more tasks to determine the first digital assistant response). In some examples, after user device 802 transmits the first user input to the one or more servers, user device 802 receives one or more commands to perform one or more tasks from the one or more servers (e.g., a command to search for/retrieve the current temperature in Palo Alto based on the user input "Hey Siri, what's the weather like in Palo Alto?"). In some examples, after performing the one or more tasks in response to the one or more commands, user device 802 determines the first digital assistant response based on results of the one or more performed tasks (e.g., determining the first digital assistant response based on current temperature information for Palo Alto acquired via a search). In other examples, after performing the one or more tasks in response to the one or more commands, user device 802 transmits the results of the one or more performed tasks (e.g., data representing the results) to the one or more servers. The one or more servers then determine the first digital assistant response based on the results and subsequently transmit the first digital assistant response (e.g., data representing the first digital assistant response) to user device 802.

In some examples, the first digital assistant response includes a natural-language expression corresponding to a task performed by a digital assistant of user device 802 (and/or one or more servers) based on the first user input. For example, if the first user input is "Hey Siri, what's the weather like in Palo Alto?", the first digital assistant response may include the natural language expression "It is currently 90 degrees in Palo Alto." In this example, the natural language expression "It is currently 90 degrees in Palo Alto" corresponds to the digital assistant tasks of, for example, searching for, retrieving, and providing weather information/data for Palo Alto. In some examples, the first digital assistant response includes data that is retrieved and/or determined by a digital assistant of user device 802 (and/or one or more servers) (e.g., website hyperlinks, images, audio data, video data, navigational information, stored contact information, weather information, or the like). For example, the first digital assistant response in the example above includes current temperature data for Palo Alto (e.g., "90 degrees").

As represented by arrow 810, user device 802 provides the first digital assistant response and context information associated with the first user input (e.g., data corresponding to the first digital assistant response and the context information) to user device 804. As shown in FIG. 8, user device 802 directly transmits the first digital assistant response and the context information to user device 804 (e.g., in a peer-to-peer fashion). For example, user device 802 can transmit the first digital assistant response to device 804 as audio data via an audio stream established between user device 802 and user device 804 when the video communication session that the two devices are participating in was initiated. As another example, user device 802 can directly transmit the first digital assistant response to user device 804 as text data (e.g., a textual representation of the first digital assistant response). In some examples, user device 802 provides a command to perform one or more tasks and context information associated with the first user input to user device 804. In these examples, user device 804 performs the one or more tasks in response to receiving the command and subsequently obtains the first digital assistant response based on results of the performance of the one or more tasks.

In some examples, providing the first digital assistant response and the context information to user device 804 includes user device 802 transmitting the first digital assistant response and the context information (e.g., audio and/or text data representing the first digital assistant response and the context information) to one or more servers. In these examples, the one or more servers subsequently transmit the first digital assistant response and the context information to user device 804.

In some examples, the context information associated with the first user input includes data corresponding to a contextual state of user device 802 when user device 802 receives the first user input. For example, the contextual state of user device 802 includes a local time when user device 802 receives the first user input, a current location and/or orientation of user device 802 when user device 802 receives the first user input, a speed and/or direction of movement of user device 802 when user device 802 receives the first user input, a signal strength (e.g., Wi-Fi signal strength) when user device 802 receives the first user input, and/or the like. Note, in some examples, the contextual state of user device 802 "when user device 802 receives the first user input" includes the contextual state of user device 802 closely preceding and/or closely following user device 802's receipt of the first user input. For example, the contextual state of user device 802 when user device 802 receives the first user input can include the contextual state of user device 802 at time of 5, 10, and/or 15 seconds before and/or after user device 802 receives the first user input.

In some examples, the context information associated with the first user input includes data stored on user device 802 that is associated with the first user input. For example, the data stored on user device 802 that is associated with the first user input includes stored contact information, stored user-specific preferences and/or information (e.g., favorite restaurants, favorite sports teams, navigation preferences, calendar information, or the like), and/or any other information stored on user device 802 that is used to determine the first digital assistant response based on the first user input (e.g., used to disambiguate the first user input, used to determine one or more parameters for performing a digital assistant task based on the first user input, and/or the like). For example, if the first user input is "Hey Siri, how long will it take me to drive to John's home address?", the context information associated with the first user input can include the home address in John's contact information stored on user device 802 (e.g., stored in application internal state 292 of contacts module 237 in memory 202 or memory 470).

In some examples, the data stored on user device 802 that is associated with the first user input includes data (e.g., contact information, user-specific preferences and/or information, or the like) that is stored (e.g., locally or remotely) by a software application on user device 802 (e.g., a native software application or third-party software application stored on user device 802). In these examples, user device 802 requests the data from the software application. For example, user device 802 may request user-specific calendar information (e.g., all of a user's calendar entries or a user's calendar entries for one or more particular dates) from a third-party calendar software application stored on user device 802. In response, the software application retrieves the data (e.g., retrieves the requested data from local memory (e.g., memory 202 or memory 470) and/or requests that one or more servers provide the requested data to the software application) and provides the data to user device 802.

In some examples, the context information associated with the first user input includes a dialog history between a digital assistant of user device 802 and a user of user device 802 during the video communication session (e.g., data representing the dialog history). In some examples, the dialog history includes previous user inputs received by user device 802 during the video communication session (e.g., prior to receiving the first user input) and/or previous digital assistant responses determined and/or provided by user device 802 during the video communication session (e.g., determined and/or provided prior to determining and/or providing the first digital assistant response).

In some examples, the context information associated with the first user input includes context information (such as the context information described above) that user device 802 receives during the video communication session from one or more other user devices participating in the video communication session (e.g., prior to user device 802 receiving the first user input). For example, user device 802 can receive contextual state data (e.g., data representing a current location) from a third user device participating in the video communication session (e.g., with a digital assistant response determined by the third user device). Then, user device 802 can transmit the third user device's contextual state data that is associated with the first user input to user device 804 (e.g., with the first digital assistant response). As another example, user device 802 can receive the third user device's dialog history during the video communication session, which can include user inputs received by the third user device during the video communication session (e.g., prior to user device 802 receiving the first user input) and/or previous digital assistant responses determined and/or provided by the third user device during the video communication session (e.g., determined and/or provided prior to user device 802 determining and/or providing the first digital assistant response). Then, user device 802 can transmit data from the third user device's received dialog history that is associated with the first user input (e.g., data representing a user input received at the third user device that is associated with the first user input).

In this manner, a device that joins a video communication session late (e.g., after conversation between two or more devices participating in the video communication session has occurred) can still be aware of user inputs and/or digital assistant responses received and/or provided by other user devices participating in the video communication session before the late user device joined the video communication session. This in turn allows a digital assistant of the late device to determine and/or provide digital assistant responses based on the previous user inputs and/or digital assistant responses and thus seamlessly/naturally integrate into the existing conversation.

In some examples, the context information associated with the first user input includes any information and/or data that is accessible to user device 802 (e.g., stored on user device 802, stored on one or more servers, and/or accessible via an Internet search) and that user device 802 uses (or that one or more servers use) to determine the first digital assistant response.

In some examples, prior to user device 802 providing the first digital assistant response and the context information associated with the first user input to user device 804, user device 802 determines whether the context information includes private information. In some examples, private information includes private information associated with a user of user device 802 (e.g., that is stored on user device 802) and/or private information associated with one or more contacts stored on user device 802 (e.g., stored in application internal state 292 of contacts module 237 in memory 202 or memory 470). For example, private information associated with a user and/or stored contact includes the user's and/or stored contact's personal information (e.g., ethnicity, sex, age, weight, and/or the like), Social Security Number (SSN), personal and/or business email address, personal and/or business address, personal health records, and/or the like.

If user device 802 determines that the context information associated with the first user input includes private information, user device 802 removes at least a portion of the private information from the context information. In some examples, user device 802 removes private information that is not specifically requested in the first user input. For example, if the first user input represents a user request for a stored contact's email address (e.g., "Hey Siri, what's John's email address?"), user device 802 will remove private information other than the stored contact's email address from the context information prior to providing the context information to user device 804 (e.g., with the first digital assistant response). In some examples, user device 802 removes private information that is not used to determine the first digital assistant response (e.g., all private information that is not used to disambiguate the first user input, determine one or more parameters for performing a digital assistant task based on the first user input, and/or the like). For example, if the first user input represents a user request for navigational information regarding the user's home address (e.g., "Hey Siri, how long will it take me to get home right now?"), user device 802 will remove private information other than the user's home address (and any other private information used to determine the first digital assistant response) from the context information prior to providing the context information to user device 804 (e.g., with the first digital assistant response).

After user device 802 removes at least a portion of the private information from the context information (e.g., private information not specifically requested in the first user input and/or private information not used to determine the first digital assistant response), user device 802 provides the first digital assistant response and the remaining context information associated with the first user input to user device 804 (e.g., as described above with reference to arrow 810).

As represented by arrows 812, user device 802 and user device 804 output the first digital assistant response. In some examples, user device 802 and user device 804 output the first digital assistant response at the same time. In some examples, user device 802 and user device 804 output the first digital assistant response at different times. For example, user device 802 may output the first digital assistant response several seconds (e.g., 1, 2, 5, or 10 seconds) before user device 804 outputs the first digital assistant response. In some examples, user device 802 outputs the first digital assistant response prior to providing the first digital assistant response (and context information associated with the first user input) to user device 804. Then, in some examples, user device 804 outputs the first digital assistant response after receiving the first digital assistant response.

In some examples, outputting the first digital assistant response includes user device 802 and/or user device 804 outputting the first digital assistant response as an audio output (e.g., using speaker 211). As mentioned above, in some examples, user device 802 provides the first digital assistant response to user device 804 as text data. In these examples, user device 804 performs text-to-speech processing of the text data corresponding to the first digital assistant response to generate an audio output corresponding to the first digital assistant response (and subsequently output the audio output). In some examples, user device 802 and/or user device 804 output the audio output corresponding to the first digital assistant response based on one or more predefined digital assistant language and/or voice settings (for each respective user device). For example, user device 802 may have a predefined digital assistant language setting of English and a predefined digital assistant voice setting of British (male) whereas user device 804 may have a predefined digital assistant language setting of English and a predefined digital assistant voice setting of American (female).

In some examples, outputting the first digital assistant response includes user device 802 and/or user device 804 displaying (e.g., using touch-sensitive display system 212) data that is included in the first digital assistant response (e.g., text, images, videos, navigational information, etc. that is retrieved and/or determined by a digital assistant of user device 802 based on the first user input). In some examples, user device 802 and/or user device 804 display the data that is included in the first digital assistant response during the video communication session. For examples, user device 802 and/or user device 804 may display an image included in the first digital assistant response as overlaying a user interface of the video communication session (e.g., video communication session interface 904) while outputting the first digital assistant response as an audio output. In some examples, user device 802 and/or user device 804 display the data that is included in the first digital assistant response after the video communication session has ended. For example, user device 802 and/or user device 804 may display a video included in the first digital assistant response after the video communication session has ended and a user interface for the video communication session is no longer displayed.

In some examples, outputting the first digital assistant response includes user device 802 and/or user device 804 storing data that is included in the first digital assistant response (e.g., permanently or temporarily). In some examples, a user of user device 802 and/or user device 804 accesses the stored data that is included in the first digital assistant response via an application stored on user device 802 and/or user device 804 (e.g., via an application of applications 236). For example, if the first user input represents a request for navigational directions (e.g., "Hey Siri, give me directions to John's home."), user device 802 and/or user device 804 may output the first digital assistant response as an audio output (e.g., "Directions to John's home may be found in your Maps application.") and store the navigational information included in the first digital assistant response so that a user of user device 802 and/or user device 804 may access the navigational information using a navigation application stored on user device 802 and/or user device 804.

As represented by arrow 814, user device 804 receives a second user input. In some examples, the second user input is a user voice input. In some examples, the second user input includes a digital assistant trigger (e.g., "Hey Siri", "Siri", or the like) that invokes a digital assistant of user device 804 (e.g., initiates a dialog session between a user of user device 804 and a digital assistant of user device 804). For example, the second user input can include a digital assistant trigger at the beginning of the second user input (e.g., "Hey Siri, how long will it take me to drive there?"). As another example, the second user input can include a digital assistant trigger at the end of the second user input (e.g., "How long will it take me to drive there, Siri?"). In some examples, in response to determining that the second user input includes a digital assistant trigger, user device 804 determines that the second user input represents a user request for a digital assistant of user device 804 to perform a task (and, in some examples, provide a digital assistant response to the user request). For example, the user input "Hey Siri, how long will it take me to drive there?" represents a user request for the digital assistant to retrieve and provide navigational information to a previously-mentioned location (i.e., "there".

In some examples, in response to receiving the second user input, user device 804 transmits the second user input (e.g., audio data representing the second user input) to user device 802 (and other user devices participating in the video communication session). In some examples, user device 804 transmits the second user input to user device 802 as a peer-to-peer transmission (e.g., using an audio stream established between the two user devices when the video communication session was initiated). In other examples, user device 804 transmits the second user input to one or more servers (e.g., DA server 106), which then transmit the second user input (e.g., audio data representing the second user input) to user device 802. In some examples, after receiving the second user input, user device 802 outputs the second user input as an audio output (e.g., using speaker 211).

Upon receiving the second user input, user device 804 obtains a second digital assistant response based on the second user input. In some examples, obtaining the second digital assistant response includes user device 804 performing natural language processing of the second user input, determining one or more tasks to perform based on results of the natural language processing, and performing the one or more tasks to determine the second digital assistant response (e.g., performing a search, retrieving data, performing text-to-speech processing, etc.). In some examples, obtaining the second digital assistant response includes user device 804 transmitting the second user input (e.g., audio data representing the second user input) to one or more servers (e.g., DA server 106) and subsequently receiving the second digital assistant response from the one or more servers (e.g., after the one or more servers perform natural language processing of the second user input and perform one or more tasks to determine the second digital assistant response). In some examples, after user device 804 transmits the second user input to the one or more servers, user device 804 receives one or more commands to perform one or more tasks from the one or more servers. In some examples, after performing the one or more tasks in response to the one or more commands, user device 804 determines the second digital assistant response based on results of the one or more performed tasks. In other examples, after performing the one or more tasks in response to the one or more commands, user device 804 transmits the results of the one or more performed tasks (e.g., data representing the results) to the one or more servers. The one or more servers then determine the second digital assistant response based on the results and subsequently transmit the second digital assistant response (e.g., data representing the second digital assistant response) to user device 804.

In some examples, user device 804 obtains the second digital assistant response further based on context information associated with the first user input (and received with the first digital assistant response). Specifically, in some examples, user device 804 (or one or more servers) uses context information associated with the first user input to disambiguate one or more ambiguous terms or phrases in the second user input (e.g., when determining a user intent based on the second user input) and subsequently determine the second digital assistant response based on the disambiguated second user input. For example, if the first user input is "Hey Siri, what's the weather like in Palo Alto?" and the second user input is "Hey Siri, how long will it take me to drive there?", user device 804 (or one or more servers) can use context information associated with the first user input (e.g., a dialog history received from user device 802) to disambiguate the term "there" and determine that the second user input represents a user request for navigation information (i.e., travel time) from a current location of user device 804 to Palo Alto (e.g., because "there" refers to the location mentioned in the first user input (i.e., Palo Alto)). As another example, if the first user input is "Hey Siri, what's the weather like in Palo Alto?" and the second user input is "Hey Siri, how about in New York?", user device 804 (or one or more servers) can use context information associated with the first user input (e.g., a dialog history received from user device 802) to disambiguate the phrase "how about in New York" and determine that the second user input represents a user request for weather information with respect to New York (e.g., because "how about in New York" refers to the task requested in the first user input).

In some examples, user device 804 (or one or more servers) uses context information associated with the first user input to determine one or more parameters (e.g., one or more structured query parameter) for performing one or more tasks based on the second user input. Example parameters that user device 804 (or one or more servers) determine based on context information associated with the first user input include (but are not limited to) a location, a website hyperlink, a phone number, an email address, a home and/or business address, and the like. For example, if the first user input is "What's John's cell phone number, Siri?" and the second user input is "Hey Siri, save John's cell phone number to my contacts.", user device 804 (or one or more servers) can use context information associated with the first user input and received with the first digital assistant response (e.g., John's cell phone number stored on user device 802) to determine the phone number that the user of user device 804 wishes to save (e.g., if user device 804 does not already have John's cell phone number stored prior to receiving the second user input). After user device 804 (or one or more servers) performs one or more tasks based on the one or more determined parameters, user device 804 (or one or more servers) determines the second digital assistant response based on results of the performed one or more tasks. For example, in the previous example, the second digital assistant response may be "John's cell phone number has been added to your stored contacts."

Using context information as described above to determine the second digital assistant response allows the digital assistant of the second user device to provide a digital assistant response that is based on, and/or is in furtherance to, a user request and/or digital assistant response received/provided at the first user device. In this manner, users of the first user device and the second user device may provide digital assistant requests during a video communication session in a more natural and conversational manner, and without having to repeat certain aspects of a request if those aspects were already introduced in a previous user request and/or digital assistant response during the video communication session. For example, as described above, if a user of the first user device provides the user request "Hey Siri, what's the weather like in Palo Alto?", a user of the second user device can subsequently request weather information with respect to New York by providing the user request "Hey Siri, how about in New York?" instead of having to repeat that weather information is desired (e.g., "Hey Siri, what's the weather like in New York?"). This in turn creates an appearance of a single digital assistant that is participating in the video communication session with the users of the first user device and the second user device while still allowing the digital assistant of each user device to locally process requests from their respective users. This ultimately improves the video communication session experience for the users of the first user device and the second user device.

In some examples, the second digital assistant response includes a natural-language expression corresponding to a task performed by a digital assistant of user device 802 (and/or one or more servers) based on the second user input. For example, if the second user input is "Hey Siri, how long will it take me to drive there?", the second digital assistant response may include the natural language expression "Traffic to Palo Alto is light, so I'm estimating 45 minutes via I-280 N." In this example, the natural language expression "Traffic to Palo Alto is light, so I'm estimating 45 minutes via I-280 N" corresponds to the digital assistant tasks of, for example, retrieving navigational information (e.g., travel time) with respect to the current location of user device 804 and a previously-mentioned location (in this case, Palo Alto). In some examples, the second digital assistant response includes data that is retrieved and/or determined by a digital assistant of user device 802 (and/or one or more servers) (e.g., website hyperlinks, images, videos, navigational information, stored contact information, weather information, or the like). For example, the second digital assistant response in the example above includes navigational data determined and/or retrieved by user device 804 (or one or more servers) (e.g., 45 minutes to Palo Alto via I-280 N).

As represented by arrow 816, user device 804 provides the second digital assistant response (e.g., data corresponding to the second digital assistant response) and context information associated with the second user input to user device 802. As shown in FIG. 8, user device 804 directly transmits the second digital assistant response and the context information to user device 802 (e.g., in a peer-to-peer fashion). For example, user device 804 can directly transmit the second digital assistant response to device 802 as audio data via an audio stream established between user device 802 and user device 804 when the video communication session that the two devices are participating in was initiated. As another example, user device 804 can directly transmit the second digital assistant response to user device 802 as text data (e.g., a textual representation of the second digital assistant response). In some examples, user device 804 provides a command to perform one or more tasks and context information associated with the second user input to user device 802. In these examples, user device 802 performs the one or more tasks in response to receiving the command and subsequently obtains the second digital assistant response based on results of the performance of the one or more tasks.

In some examples, providing the second digital assistant response and the context information to user device 802 includes user device 804 transmitting the second digital assistant response and the context information (e.g., audio and/or text data representing the second digital assistant response and the context information) to one or more servers. In these examples, the one or more servers subsequently transmit the second digital assistant response and the context information to user device 802.

The context information associated with the second user input can include any of the various types of context information described above with respect to the context information associated with the first user input (e.g., described with reference to arrow 810). That is, in some examples, the context information associated with the second user input includes data corresponding to a contextual state of user device 804 when user device 804 receives the second user input. In some examples, the context information associated with the second user input includes data stored on user device 804 that is associated with the second user input. In some examples, the context information associated with the second user input includes a dialog history between a digital assistant of user device 804 and a user of user device 804 during the video communication session (e.g., data representing the dialog history). In some examples, the context information associated with the second user input includes context information (such as the context information described above) that user device 804 receives during the video communication session from one or more other user devices participating in the video communication session (e.g., prior to user device 804 receiving the second user input). In some examples, the context information associated with the second user input includes any information and/or data that is accessible to user device 804 (e.g., stored on user device 804, stored on one or more servers, and/or accessible via an Internet search) and that user device 804 uses (or that one or more servers use) to determine the second digital assistant response.

In some examples, prior to user device 804 providing the second digital assistant response and the context information associated with the second user input to user device 802, user device 804 determines whether the context information includes private information (e.g., as described above with respect to user device 802 and the context information associated with the first user input). If user device 804 determines that the context information associated with the second user input includes private information, user device 804 removes at least a portion of the private information from the context information (e.g., in the same manner that user device 802 removes private information from the context information associated with the first user input). After user device 804 removes at least a portion of the private information from the context information (e.g., private information not specifically requested in the second user input and/or private information not used to determine the second digital assistant response), user device 804 provides the second digital assistant response and the remaining context information associated with the second user input to user device 802 (e.g., as described above with reference to arrow 816). Additional details regarding types of private information and removing private information from context information are described above with respect to removing private information from the context information associated with the first user input. Those additional details also apply to removing private information from the context information associated with the second user input.

As represented by arrow 818, user device 802 and user device 804 output the second digital assistant response. In some examples, user device 802 and user device 804 output the second digital assistant response at the same time. In some examples, user device 802 and user device 804 output the second digital assistant response at different times. For example, user device 802 may output the second digital assistant response several seconds (e.g., 1, 2, 5, or 10 seconds) before user device 804 outputs the second digital assistant response. In some examples, user device 804 outputs the second digital assistant response prior to providing the second digital assistant response (and context information associated with the second user input) to user device 802. Then, in some examples, user device 802 outputs the second digital assistant response after receiving the second digital assistant response.

User device 802 and/or 804 output the second digital assistant response in any of the various ways described above with respect to outputting the first digital assistant response (e.g., as described above with reference to arrow 810). That is, in some examples, outputting the second digital assistant response includes user device 802 and/or user device 804 outputting the second digital assistant response as an audio output (e.g., using speaker 211). As mentioned above, user device 804 can provide various forms of data corresponding to the second digital assistant response to user device 802 (e.g., audio data, text data, a command to perform one or more tasks, etc.). In all of these examples, user device 802 performs any processing of the received data that is needed in order to output the second digital assistant response. For example, if user device 804 provides the second digital assistant response to user device 802 as text data, user device 802 will perform text-to-speech processing of the text data corresponding to the second digital assistant response to generate an audio output corresponding to the second digital assistant response (and subsequently output the audio output).

In some examples, user device 802 and/or user device 804 output an audio output corresponding to the second digital assistant response based on one or more predefined digital assistant language and/or voice settings (for each respective user device). For example, user device 802 may have a predefined digital assistant language setting of English and a predefined digital assistant voice setting of British (male) whereas user device 804 may have a predefined digital assistant language setting of English and a predefined digital assistant voice setting of American (female).

In some examples, outputting the second digital assistant response includes user device 802 and/or user device 804 displaying (e.g., using touch-sensitive display system 212) data that is included in the second digital assistant response (e.g., text, images, videos, navigational information, etc. that is retrieved and/or determined by a digital assistant of user device 804 based on the second user input). In some examples, outputting the second digital assistant response includes user device 802 and/or user device 804 storing data that is included in the second digital assistant response (e.g., permanently or temporarily).

In some examples, in response to receiving a user input from a user (e.g., the first user input and/or the second user input) and prior to obtaining a digital assistant response based on the user input (e.g., the first digital assistant response and/or the second digital assistant response), user device 802 or user device 804 determines whether the user input includes a digital assistant trigger (e.g., "Hey Siri," "Siri," or the like). In response to determining that the user input includes a digital assistant trigger, user device 802 or user device 804 performs the invocation indication process or the invocation permission process (also called the "baton" sharing process) to determine whether to proceed with obtaining a digital assistant response based on the user input.

In some examples, user device 802 or user device 804 performs the invocation indication process. Specifically, in response to determining that the user input includes a digital assistant trigger, user device 802 or user device 804 generates an indication (e.g., a message, a signal, or the like) that a digital assistant of the user device has been invoked and transmits the indication to all other user device participating in the video communication session. For example, if user device 802 determines that the first user input includes a digital assistant trigger, user device 802 generates an indication that its digital assistant has been invoked and transmits the indication to user device 804 (prior to obtaining the first digital assistant response). In some examples, the indication includes data indicating a time (e.g., a time of the day) at which the digital assistant of user device 802 or user device 804 was invoked.

Ater receiving an indication that a digital assistant of another user device has been invoked, user device 802 or user device 804 determines, based on the indication, whether a digital assistant of the user device that provided the indication was invoked prior to receiving one or more user inputs (e.g., user inputs received before and/or after receiving the indication). For example, after receiving an indication from user device 804 (that a digital assistant of user device 804 has been invoked (e.g., by the second user input)), user device 802 determines (e.g., based on data indicating a time (included in the indication) at which the digital assistant of user device 804 was invoked) whether a third user input was received before or after the digital assistant of user device 804 was invoked.

If user device 802 or user device 804 determines that a user input was received after the digital assistant of the other user device was invoked, user device 802 or user device 804 forgoes obtaining a digital assistant response based on the user input. Returning to the previous example, if user device 802 determines that the digital assistant of user device 804 was invoked prior to user device 802 receiving the third user input, user device 802 forgoes obtaining a third digital assistant response based on the third user input. In some examples, after user device 802 or user device 804 determines that a user input was received after the digital assistant of another user device was invoked, user device 802 or user device 804 will continue to forgo obtaining digital assistant responses based on user inputs until user device 802 or user device 804 receives a digital assistant response from the other device (e.g., a digital assistant response based on the user input that invoked the other device's digital assistant).

However, if user device 802 or user device 804 determines that a user input was received before the digital assistant of the other user device was invoked, user device 802 or user device 804 obtains and/or provides a digital assistant response based on the user input to the other user devices participating in the video communication session (e.g., as described above with reference to obtaining and/or providing the first digital assistant response and the second digital assistant response). Returning to the previous example, if user device 802 determines that the digital assistant of user device 804 was invoked after user device 802 received the third user input, user device 802 proceeds with obtaining and/or providing a third digital assistant response to user device 804 (and any other user devices participating in the video communication session) based on the third user input.

Overall, when implementing the invocation indication process, user device 802 or user device 804 will (1) transmit an indication that its digital assistant has been invoked (to the other user device participating in the video communication session) in response to determining that a user input includes a digital assistant trigger and (2) determine whether the user input was received before or after the invocation of a digital assistant of another user device participating in the video communication session (based on any invocation indications recently received from the other user devices participating in the video communication session (e.g., received in the last 1, 5, or 10 seconds)).

In some examples, user device 802 or user device 804 performs the invocation permission process (also called the "baton" passing process). Specifically, in response to determining that the user input includes a digital assistant trigger, user device 802 or user device 804 determines whether it currently holds the digital assistant invocation permission. The digital assistant invocation permission (e.g., data indicating that a user device may invoke a digital assistant of the user device) is the "baton" that a user device needs have in order to invoke its digital assistant during a video communication session. Only one user device participating in the video communication session holds the invocation permission at a time. If user device 802 or user device 804 determines that it currently holds the invocation permission, user device 802 or user device 804 obtains and/or provides a digital assistant response based on the user input to the other user devices participating in the video communication session (e.g., as described above with reference to obtaining and/or providing the first digital assistant response and the second digital assistant response).

If user device 802 or user device 804 determines that it does not currently hold the invocation permission, user device 802 or user device 804 transmits a request for the invocation permission to the other user devices participating in the video communication session. Only the user device that currently holds the invocation permission can transmit the invocation right to the requesting user device. A user device that holds the invocation permission and receives an invocation permission request will transmit the invocation permission to the requesting user device (e.g., user device 802 or user device 804) if the user device that receives the request (1) did not recently receive a user input representing a digital assistant request prior to receiving the invocation permission request (e.g., 0.5 seconds, 1 second, or 2 seconds prior to receiving the request) and/or (2) is not in the process of obtaining and/or providing a digital assistant response based on a user input when it receives the invocation permission request. If user device 802 or user device 804 receives the invocation permission from another user device participating in the video communication session within a predetermined period of time after transmitting the request for the invocation permission (e.g., 0.5 seconds, 1 second, or 2 seconds after transmitting the request), user device 802 or user device 804 obtains and/or provides a digital assistant response based on the user input to the other user devices participating in the video communication session. However, if user device 802 or user device 804 does not receive the invocation permission from another user device participating in the video communication session within the predetermined period of time after transmitting the request for the invocation permission, user device 802 or user device 804 forgoes obtaining and/or providing a digital assistant response based on the user input.

In some examples, instead of waiting for the predetermined period of time to expire, user device 802 or user device 804 forgoes obtaining and/or providing a digital assistant response based on the user input in response to receiving an invocation permission request denial from another user device participating in the video communication session. Only the user device that currently holds the invocation permission can transmit the invocation permission request denial to the requesting user device. A user device that holds the invocation permission and receives an invocation permission request will transmit an invocation permission request denial if the user device (1) recently received a user input representing a digital assistant request prior to receiving the invocation permission request (e.g., 0.5 seconds, 1 second, or 2 seconds prior to receiving the request) and/or (2) is in the process of obtaining and/or providing a digital assistant response based on a user input when it receives the invocation permission request. In some of these examples, user device 802 or user device 804 will continue to wait to act on the user input (but not entirely forgo obtaining and/or providing a digital assistant response based on the user input) until user device 802 or user device 804 receives the invocation permission or an invocation permission request denial from another user device participating in the video communication session.

In some examples, after (e.g., immediately after, 1 second after, or the like) user device 802 or user device 804 forgoes obtaining and/or providing a digital assistant response based on the user input (e.g., because user device 802 or user device 804 never received the invocation permission and/or received an invocation permission request denial), user device 802 or user device 804 displays (e.g., on touch-sensitive display system 212 of user device 802 or user device 804) an indication that a digital assistant of user device 802 or user device 804 is currently unavailable, or an indication that a digital assistant of another user device participating in the video communication session is currently invoked. In some examples, user device 802 or user device 804 continues to display the indication (or at least a portion of the indication) until its digital assistant is once again available (e.g., because the digital assistant of the other user device participating in the video communication session is no longer invoked).

Note, in the above examples of the invocation permission process, them is always a user device participating in the video communication that currently holds the invocation permission. Specifically, the invocation permission is first assigned to the user device that initiates the video communication session (e.g., the user device that sends out the initial call or request to initiate the video communication session). For example, if user device 802 initially called or requested user device 804 to initiate a video communication session, user device 802 would hold the invocation permission once the video communication session was established (e.g., after arrow 806). Further, if the user device that currently holds the invocation permission leaves the video communication session without transmitting the invocation permission to another user device participating in the video communication session, the invocation permission automatically returns to the user device that sent out the initial call or request to initiate the video communication session (e.g., user device 802 in the previous example). If the user device that sent out the initial call or request to initiate the video communication session is no longer participating in the video communication session when the invocation permission holder leaves the video communication session, then the invocation permission automatically goes to the user device that has been participating in the video communication session the longest (with the user device that most recently joined the video communication session being last in line to automatically receive the invocation permission).

The invocation indication and invocation permission processes described above help prevent concurrent invocations of multiple digital assistants during the video communication session. In this manner, only one user device at a time (of the two or more user devices participating in a video communication session) can obtain/provide a digital assistant response based on a user input during the video communication session. This in turn maintains the appearance of a single digital assistant that is participating in the video communication session by, for example, preventing the provision of multiple overlapping digital assistant response at the same time (e.g., the audio output of two digital assistant response at the same time).

In some examples, during the video communication session, user device 802 or user device 804 initiates a private digital assistant conversation and forgoes transmitting one or more user inputs and one or more corresponding digital assistant responses to other devices participating in the video communication session. Specifically, in some examples, user device 802 or user device 804 receives a user input and determines that the user input represents a user intent of providing a private digital assistant request. For example, after outputting the second digital assistant response (e.g., as described above with reference to arrow 818), user device 802 may receive a third user input (from a user of user device 802) and determine that the third user input represents a user intent of providing a private digital assistant request. Examples of user inputs that represent a user intent of providing a private digital assistant request include (1) a user selection of a mute affordance included in a displayed video communication session user interface (e.g., mute affordance 908B) and (2) a button push and/or press that invokes a digital assistant of user device 802 or user device 804 (e.g., a long press of button 910).

If user device 802 or user device 804 determines that a user input represents a user intent of providing a private digital assistant request, user device 802 or user device 804 will forgo providing (e.g., transmitting) subsequent user inputs (received from a user of user device 802 or user device 804, respectively) and digital assistant responses to other user devices participating in the video communication session until a predetermined condition is satisfied (as will be described further below). User device 802 or user device 804 may then receive another user input (specifically, a user voice input such as, for example, "Hey Siri, when's my mother's birthday?" or "Hey Siri, how many calories did I burn today?"), obtain a digital assistant response based on the user voice input (e.g., as described above with reference to obtaining the first digital assistant response and the second digital assistant response), forgo providing the digital assistant response to the other user devices participating in the video communication session, and output the digital assistant response (e.g., as an audio output).

Private digital assistant conversations such as this (e.g., a user voice input representing a digital assistant request and a subsequent digital assistant response) allow a user of user device 802 or user device 804 to make private digital assistant requests during a video communication session, and receive subsequent digital assistant responses, that the user may not want users of other user devices participating in the video communication session to hear. This in turn prevents the user of user device 802 or user device 804 from having to wait until after the video communication session to, for example, make a digital assistant request for information that the user may want or need during the video communication session. For example, if the user of user device 802 is participating in a video communication session with the user's mother (who is using user device 804), the user may want to find out the birthday of the user's mother without the user's mother knowing. In this situation, the user may, for example, initiate a private digital assistant conversation after user device 802 outputs the second digital assistant response (e.g., by selecting a mute affordance or pushing/pressing a button) and provide the third user input "Hey Siri, when's my mother's birthday?" User device 802 would then forgo providing the third user input and corresponding third digital assistant response (e.g., audio data representing the third user voice input and third digital assistant response) to user device 804. Thus, the user's mother would not hear the third user input or the third digital assistant response. Further, as mentioned above, user device 802 would continue forgoing providing user inputs and digital assistant responses to user device 804 (and other user devices participating in the video communication session) until a predetermined condition is satisfied.

The manner in which the predetermined condition is satisfied depends on the manner in which a user of user device 802 or user device 804 initiates a private digital assistant conversation. In some examples, if a user of user device 802 or user device 804 initiates a private digital assistant conversation by selecting a mute affordance (e.g., mute affordance 906B), the predetermined condition is satisfied when user device 802 or user device 804 once again receives a user selection of the mute affordance (i.e., to unmute and thus allow users at other devices participating in the video communication session to once again hear voice inputs received at user device 802 or user device 804). In these examples, the second user selection of the mute affordance ends the private digital assistant conversation and allows user device 802 or user device 804 to once again provide user inputs and digital assistant responses to the other user devices participating in the video communication session. In yet other examples, if a user of user device 802 or user device 804 initiates a private digital assistant conversation by pushing/pressing a physical button that invokes a digital assistant of user device 802 or user device 804 (e.g., a long press of button 910), the predetermined condition is satisfied once user device 802 or user device 804 outputs a digital assistant response in response to the private user input. Thus, unlike when a user initiates a private digital assistant conversation by selecting a mute affordance, in these examples, a user may only provide a single user input (e.g., "Hey Siri, when's my mother's birthday?") and receive a single corresponding digital assistant response before the private digital assistant conversation ends.

Figure 10:
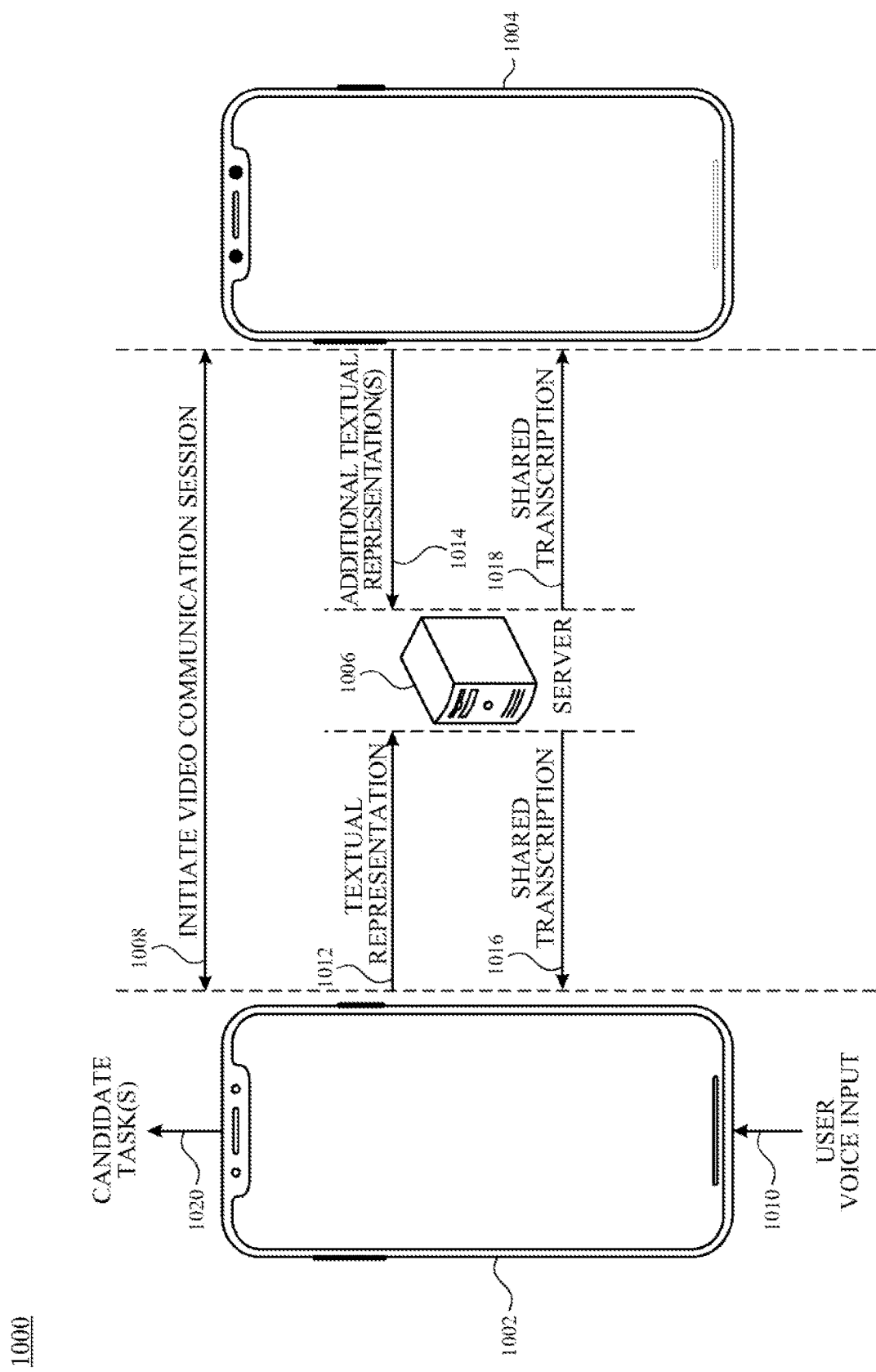
FIG. 10 illustrates a system and technique for determining candidate digital assistant tasks based on user voice inputs received at user devices participating in a video communication session, according to various examples.

5. System and Technique for Determining Candidate Digital Assistant Tasks Based on User Voice Inputs Received at User Devices Participating in a Video Communication Session FIG. 10 illustrates a system and technique for determining candidate digital assistant tasks based on user voice inputs received at user devices participating in a video communication session, according to various examples. System 1000 includes user device 1002 (e.g., user device 104, 122, 200, 400, 600), user device 1004 (e.g., user device 104, 122, 200, 400, 600), and server 1006 (e.g., DA server 106). In some examples, user device 1002 and user device 1004 are similar or identical to user device 802 and user device 804, respectively. It should be recognized that, in these examples, any of the operations performed by user device 1002 and/or user device 1004 can instead be performed by server 1006, and that any of the operations performed by server 1006 can instead be performed by user device 1002 and/or user device 1004. For example, server 1006 can perform the operations of the respective DA client modules (e.g., DA client module 229) of user device 1002 and/or user device 1004.

As represented by arrow 1008, user device 1002 and user device 1004 initiate a video communication session (e.g., a video conference). In some examples, more than two user devices (e.g., four user devices) participate in the video communication session. In some examples, initiating a video communication session establishes one or more audio streams between each user device participating in the video communication session. For example, upon initiating a video communication session, user device 1002 and user device 1004 establish a first audio stream between one another. If, for example, a third user device were to join the video communication session, the third user device would establish a second audio stream between itself and user device 1002 and a third audio stream between itself and user device 1004. In some examples, the remaining steps of the technique (described in greater detail below with reference to FIG. 10) occur during an initiated video communication session between user device 1002 and user device 1004.

As represented by arrow 1010, user device 1002 receives a user voice input. In some examples, the user voice input includes a digital assistant trigger (e.g., "Hey Siri", "Siri", or the like) that invokes a digital assistant of user device 1002 (e.g., initiates a dialog session between a user of user device 1002 and a digital assistant of user device 1002). For example, the user voice input can include a digital assistant trigger at the beginning of the first user input (e.g., "Hey Siri, what's the weather like in Palo Alto?"). As another example, the user voice input can include a digital assistant trigger at the end of the first user input (e.g., "What's the weather like in Palo Alto, Siri?"). In some examples, in response to determining that the user voice input includes a digital assistant trigger, user device 1002 determines that the user voice input represents a user request for a digital assistant of user device 1002 to perform one or more tasks (and, in some examples, provide one or more digital assistant responses to the user request). For example, the user input "Hey Siri, what's the weather like in Palo Alto?" represents a user request for the digital assistant to retrieve and provide weather information for Palo Alto. In some examples, the user voice input does not include a digital assistant trigger and thus does not invoke a digital assistant of user device 1002. In some examples, the user voice input does not include a digital assistant trigger but causes a digital assistant of user device 1002 to determine and/or provide a digital assistant response (e.g., when the digital assistant is invoked via a user selection of an affordance and/or a physical button press prior to user device 1002 receiving the user voice input).

In some examples, in response to receiving the user voice input, user device 1002 transmits the user voice input (e.g., audio data representing the user voice input) to user device 1004. In some examples, user device 1002 transmits the user voice input to user device 1004 as a peer-to-peer transmission (e.g., using an audio stream established between the two user devices when the video communication session was initiated). In other examples, user device 1002 transmits the user voice input to server 1006, which then transmits the user voice input (e.g., audio data representing the user voice input) to user device 1004. In some examples, after receiving the user voice input, user device 1004 outputs the user voice input as an audio output (e.g., using speaker 211).

Upon receiving the user voice input, user device 1002 generates a textual representation based on the user voice input (e.g., using STT processing module 730). Then, as represented by arrow 1012, user device 1002 transmits the generated textual representation (e.g., data representing the textual representation) to server 1006. In some examples, user device 1002 transmits the textual representation to server 1006 along with context information associated with the user voice input. Examples of context information associated with the user voice input include (but are not limited to) a time (e.g., timestamp) when user device 1002 received the user voice input from the user, a location of user device 1002 when the user voice input is received (e.g., determined by GPS module 235), an orientation of user device 1002 when the user voice input is received, and the like.

As represented by arrow 1014, server 1006 receives one or more additional textual representations (e.g., data representing one or more additional textual representations) from user device 1004. In some examples, the one or more additional textual representations correspond to user voice inputs that user device 1004 receives during the video communication session, and/or digital assistant responses that user device 1004 provides during the video communication session, before and/or after user device 1002 receives the user voice input (as represented by arrow 1010). Thus, although FIG. 10 illustrates server 1006 receiving the one or more additional textual representations (represented by arrow 1014) after server 1006 receives the textual representation (represented by arrow 1012), in some examples, server 1006 receives one or more additional textual representations from user device 1004 (e.g., corresponding to one or more user voice inputs and/or digital assistant responses) before server 1006 receives the textual representation from user device 1002 (e.g., as represented by arrow 1010).

In some examples, user device 1004 transmits the one or more additional textual representations to server 1006 along with context information associated with the one or more user voice inputs and/or one or more digital assistant responses that correspond to the one or more additional textual representations. Examples of context information associated with the one or more user voice inputs include (but are not limited to) a time (e.g., timestamp) when user device 1004 received each of the user voice inputs from the user, a location and/or orientation of user device 1004 when each of the user voice inputs is received (e.g., determined by GPS module 235), and the like. Examples of context information associated with the one or more digital assistant responses include (but are not limited to) a time (e.g., timestamp) when user device 1004 provided each of the digital assistant responses (e.g., provided to the other user devices participating in the video communication session), a location and/or orientation of user device 1004 when user device 1004 provided each of the digital assistant responses, and the like.

After receiving the textual representation from user device 1002 and the one or more additional textual representations from user device 1004 (e.g., immediately after receiving each), server 1006 adds the textual representation and the additional textual representations to a shared transcription. A shared transcription is a digital note, file, document, collection of text, or the like that is stored on server 1006 and that is shared between all user devices participating in a video communication session. Specifically, the shared transcription is "shared" in that all user devices participating in a video communication session may transmit textual representations (e.g., corresponding to user voice inputs and/or digital assistant responses) to server 1006 to be added to the shared transcription associated with the video communication session. In some examples, a shared transcription associated with a video communication session is generated once the video communication session is established (e.g., between at least two user devices).

In some examples, server 1006 adds the textual representation and the one or more additional textual representations to the shared transcription based on an order in which server 1006 receives the textual representation and the one or more additional textual representations. For example, if server 1006 receives the one or more additional textual representations prior to server 1006 receiving the textual representation from user device 1002, server 1006 would add the one or more additional textual representations to the shared transcription (e.g., immediately after they are received) and subsequently add the textual representation to the shared transcription (e.g., immediately after it is received). In some examples, server 1006 uses context information received with the textual representation and context information received with the one or more additional textual representations to determine an order in which to add the textual representations and one or more additional textual representations to the shared transcription. In this manner, server 1006 accounts for any delay (e.g., network delay) in receiving the textual representation and/or the one or more additional textual representations from user device 1002 and/or user device 1004. Returning to the example above, if context information received with the textual representation and the one or more additional textual representations (e.g., user voice input and/or digital assistant response timestamps) indicate that user device 1002 received the user voice input corresponding to the textual representation before user device 1004 received and/or provided the user voice inputs and/or digital assistant responses corresponding to the one or more additional textual representations, server 1006 would add the textual representation to the shared transcription prior to adding the one or more additional textual representations.

In some examples, server 1006 includes one or more indications in the shared transcription that, based on context information (e.g., timing information) received with the textual representation and/or context information received with the one or more additional textual representations, two or more textual representations correspond to user voice inputs and/or digital assistant responses received and/or provided at the same time. For example, server 1006 may include an indication in the shared transcription that indicates that the textual representation received from user device 1002 and a textual representation of the one or more additional textual representations received from user device 1004 each correspond to a user voice input that user device 1002 and user device 1004 received at the same time (e.g., because their respective user(s) spoke at the same time during the video communication session). As will be described in greater detail below, user device 1002 and/or user device 1004 may use such an indication in the shared transcription to determine how to display (e.g., in a video communication session user interface) the two or more textual representations corresponding to user voice inputs and/or digital assistant responses received and/or provided by user device 1002 and user device 1004 at the same time.

After adding the textual representation and the one or more additional textual representations to the shared transcription, server 1006 transmits the shared transcription to user device 1002 and user device 1004, as represented by arrow 1016 and arrow 1018, respectively. In some examples, server 1006 periodically transmits the shared transcription (e.g., every 1 second, 5 seconds, 10 seconds, or the like) to user device 1002 and user device 1004 (and all other user devices participating in the video communication session). In some examples, server 1006 transmits the shared transcription to user device 1002 and user device 1004 (and all other user devices participating in the video communication session) after server 1006 adds each textual representation to the shared transcription. Thus, for example, server 1006 may transmit the shared transcription to user device 1002 and user device 1004 after adding the textual representation (received from user device 1002) to the shared transcription but before adding the one or more additional textual representations (received from user device 1004) to the shared transcription. Then, server 1006 may once again transmit the shared transcription to user device 1002 and user device 1004 after adding the one or more additional textual representations to the shared transcription (e.g., transmitting the shared transcription after adding each of the one or more additional textual representations).

In some examples, after receiving the shared transcription, user device 1002 and/or user device display (e.g., using touch-sensitive display system 212) the textual representations included in the shared transcription (e.g., the textual representation and the one or more additional textual representations). In some examples, user device 1002 and/or user device 1004 display the textual representations as overlaying a user interface for the video communication session. In some examples, one or more of the textual representations included in a received shared transcription are already displayed as overlaying the user interface for the video communication session. In these examples, displaying the textual representations included in the shared transcription includes user device 1002 and/or user device 1004 displaying the one or more textual representations that have not yet been displayed in addition to the one or more textual representations included in the shared transcription that have already been displayed. For example, user device 1002 and/or user device 1004 may display the new textual representations included in the shared transcription (i.e., those textual transcriptions that have not yet been displayed) beneath the textual representations included in the shared transcription that have already been displayed. In this manner, user device 1002 and/or user device 1004 may maintain one or more of the already-displayed textual representations in the user interface and simply add the new textual representations to the user interface (e.g., below the already-displayed textual representations).

Figure 11:
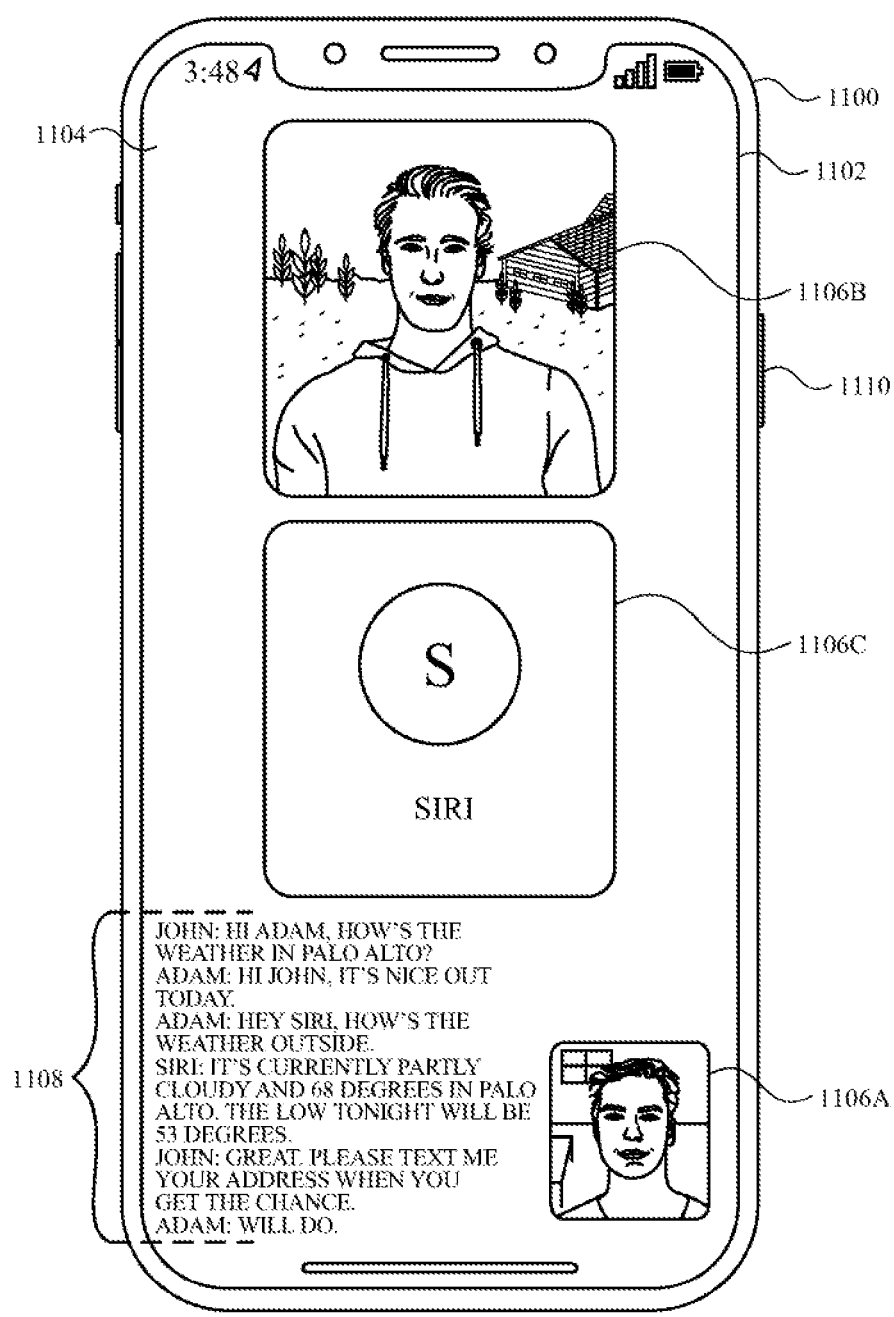
FIG. 11 illustrates an exemplary user interface for a live transcription of a video communication session, according to various examples.

For example, FIG. 11 illustrates an exemplary user interface for a live transcription of a video communication session, according to various examples. Specifically, FIG. 11 illustrates user device 1100 (e.g., user device 104, 122, 200, or 600). User device 1100 is similar or identical to user device 1002, user device 1004, and/or user device 900. In the non-limiting exemplary embodiment illustrated in FIG. 11, user device 1100 is a smartphone. In other embodiments, user device 1100 can be a different type of user device, such as a wearable device (e.g., a smartwatch or smart glasses), a tablet, lap-top, or desk-top computer. As shown, user device 1100 includes display 1102. In some examples, user device 1100 includes one or more input devices (e.g., touchscreen of display 902, button 1110, a microphone, etc.).

In FIG. 11, user device 1100 displays, on display 1102 (e.g., touch-sensitive display system 212), video communication session interface 1104. Video communication session interface 1104 is an exemplary user interface for a video communication session (e.g., a video conference) between two user devices (e.g., user device 1002 and user device 1004). In some examples, video communication session interface 1104 is similar or identical to video communication session interface 904 (described above with reference to FIG. 9). As shown, video communication session interface 1104 includes representations of three participants in the video communication session. Representation 1106A includes a view from a camera (e.g., optical sensor 164) of user device 1100 (e.g., user device 1002). Representation 1106B includes a live video feed from a second user device (e.g., user device 1004). In some examples, a representation (e.g., representation 1106B) includes a representative image for a user device that is providing only audio data (e.g., because video data is unavailable). For example, the representative image may include one or more letters representing a participant (e.g., the first letter of the participant's contact name stored on user device 1100) and/or the participant's full name (e.g., the full participant contact name stored on user device 1100). Representation 1106C includes a representative image for a digital assistant of user device 1100. As shown, the representative image for the digital assistant includes the letter "S" and the name "Siri." However, the representative image for the digital assistant is not limited to this example, and may include any other image, letter, name, number, or combination thereof.

As shown, video communication session interface 1104 includes live transcript 1108. Live transcript 1108 includes a plurality of textual representations of user voice inputs received by user devices participating in the video communication session and/or digital assistant responses provided by the user devices participating in the video communication session. Further, live transcript 1108 includes a user name (e.g., Adam or John) for each textual representation corresponding to a user voice input (e.g., to indicate the user device that received the user voice input from a user) and a digital assistant name (e.g., Siri) for each textual representation corresponding to a digital assistant response. As discussed above, the plurality of textual representations included in live transcript 1108 correspond to textual representations included in one or more shared transcriptions received by user device 1100. The textual representations included in live transcript 1108 are "live" in that they are displayed in video communication session interface 1104 in real-time, or soon after (e.g., immediately after, less than 1 second after, less than 2 seconds after, or the like), user device 1100 receives and/or provides user voice inputs and/or digital assistant responses that correspond to the textual representations. For example, as shown in FIG. 11, the live transcription "JOHN: HI ADAM, HOW'S THE WEATHER IN PALO ALTO?" is displayed in live transcript 1108 as soon as, or soon after, user device 1100 receives the user voice input corresponding to the live transcription from John's user device (e.g., because user device 1100 receives a shared transcription including the textual representation from one or more servers (e.g., server 1006) as soon as, or soon after, user device 1100 receives the user voice input from John's user device).

In some examples, user device 1100 displays one or more textual representations (included in live transcript 1108) in different colors based on the user device participating in the video communication session that generated/provided the textual representations (e.g., each user device has a corresponding color). For example, the textual representations in live transcript 1108 generated/provided by user device 1100 (i.e., the textual representations beginning with "ADAM:") may be in one color (e.g., white) whereas the textual representations generated/provided by John's user device (i.e., the textual representations beginning with "JOHN:") are in another color (e.g., red).

In some examples, user device 1100 displays two or more textual representations in live transcript 1108 in a specific color (e.g., red, white, blue, or the like) if user device 1100 determines that the two or more textual representations correspond to user voice inputs and/or digital assistant responses that were received and/or provided by two or more user devices participating in the video communication session (e.g., user device 1100 and John's user device) at the same time. As described above, in some examples, the shared transcription includes an indication that two or more textual representations included in the shared transcription correspond to user voice inputs and/or digital assistant responses that were received and/or provided at the same time. Thus, in these examples, user device 1100 determines that two or more textual representations correspond to user voice inputs and/or digital assistant responses that were received and/or provided at the same time based on the indication included in the shared transcription. Thereafter, user device 1100 displays the two or more textual representations in one color (e.g., red) while displaying all other textual representations in live transcript 1108 (e.g., those textual representations that do not correspond to user voice inputs and/or digital assistant responses that were received and/or provided at the same time) in another color (e.g., white). In this manner, a user of user device 1100 (e.g., Adam) will be able to quickly determine which textual representations included in live transcript 1108 correspond to user voice inputs and/or digital assistant responses that were received and/or provided at the same time.

In some examples, user device 1100 only displays a predetermined number of the most recent textual representations (e.g., one, two, five, ten, or the like) in live transcript 1108 (e.g., instead of displaying all textual representations included in a shared transcription). In this manner, once user device 1100 displays the predetermined number of textual representations in live transcript 1108, user device 1100 ceases to display older textual representations in live transcript 1108 as user device 1100 displays new textual representations in live transcript 1108. For example, if user device 1100 only displays six textual representations in live transcript 1108 at one time (i.e., because the predetermined number of textual representations is six), user device 1100 will display the next (e.g., most recent) textual representation beneath "ADAM: WILL DO." and cease to display the textual representation "JOHN: HI ADAM, HOW'S THE WEATHER IN PALO ALTO?" In some examples, user device 1100 determines which textual representations included in a shared transcription are most recent based on the order in which server 1006 added the textual representations to the shared transcription. In some examples, user device 1100 determines which textual representations included in a shared transcription are most recent based on context information (e.g., timing information) corresponding to the textual representations that server 1006 provides with the shared transcription.

Returning to FIG. 10, upon receiving the shared transcription, user device 1002 determines, based on the textual representations included in the shared transcription, one or more candidate tasks that may be performed by a digital assistant of user device 1002. Example candidate tasks include setting a reminder, creating a calendar event, setting an alarm, creating a new stored contact, requesting a service from a third-party application (e.g., requesting an Uber car using the Uber Application), and the like. For example, with reference to FIG. 11, upon receiving a shared transcription that includes the textual representation "GREAT. PLEASE TEXT ME YOUR ADDRESS WHEN YOU GET THE CHANCE.", a digital assistant of user device 1100 may determine the candidate task of setting a reminder to "Text John your address" based on the textual representation. In some examples, user device 1002 determines the one or more candidate tasks by performing natural language processing (e.g., using natural language processing module 732) of one or more (e.g., all) textual representations included in the shared transcription. In some examples, user device 1002 performs natural language processing of textual representations included in each shared transcription that user device 1002 receives during a video communication session. In some of these examples, user device 1002 performs natural language processing of one or more textual representations included in the shared transcription only if user device 1002 has not yet performed natural language processing of the one or more textual representations (i.e., if the one or more textual representations were not included in a shared transcription that user device 1002 previously-received during the video communication session).

As represented by arrow 1020, after user device 1002 determines one or more candidate tasks that may be performed by a digital assistant of user device 1002, user device 1002 presents the one or more candidate tasks. In some examples, presenting the one or more candidate tasks includes displaying the one or more candidate tasks on a display of user device 1002 during the video communication session and/or after the video communication session has ended. In some examples, user device 1002 displays the one or more candidate tasks as text overlaying the video communication session user interface (i.e., during the video communication session). For example, user device 1002 may display the one or more candidate tasks as text in a live transcript (e.g., live transcript 1108) included in the video communication session user interface (e.g., video communication session interface 1104). In some examples, user device 1002 displays the one or more candidate tasks in a text message within a text messaging application (e.g., in a text messaging conversation between a user of user device 1002 and a digital assistant of user device 1002). In some examples, user device 1002 displays the one or more candidate tasks in one or more notifications (e.g., displayed as text in a banner notification, a notification included in a notification history interface, a notification included in a lock screen interface, and/or the like). In some examples, user device 1002 displays the one or more candidate tasks as one or more task suggestions (e.g., displayed in a lock screen interface, in a notification history interface, and/or the like).

In some examples, user device 1002 presents the one or more candidate tasks in an audio output (e.g., with or without a corresponding user interface). In some examples, user device 1002 presents the one or more candidate tasks in an audio output in response to a user voice input (e.g., received during a private digital assistant conversation with a user of user device 1002 (during the video communication session) or after the video communication session has ended) that represents a user request for the one or more candidate tasks (e.g., "Hey Siri, what are my action items?"). In some examples, user device 1002 automatically presents the one or more candidate tasks in an audio output after the video communication session has ended (e.g., immediately after or several seconds after). In some examples, the audio output (1) requests a user of user device 1002 to confirm or reject each of the one or more candidate tasks, (2) requests the user of user device 1002 to select at least one candidate task of the one or more candidate tasks for the digital assistant to perform, and/or (3) requests user permission to perform a candidate task of the one or more candidate tasks.

Automatically determining and presenting one or more candidate tasks based on textual representations included in a shared transcription received during a video communication session (as described above) allows a digital assistant of a user device participating in a video communication session to proactively determine one or more tasks that a user of the user device may want the digital assistant to perform based on conversations held during the video communication session. In this manner, the digital assistant prevents the user from having to separately request such tasks, ensures that the user does not forget to request such tasks, and/or informs the user of tasks that the digital assistant is capable of performing (e.g., that the user was not previously aware of). This in turn improves the user's experience with respect to video communication sessions and the digital assistant of the user device.

Figure 12:
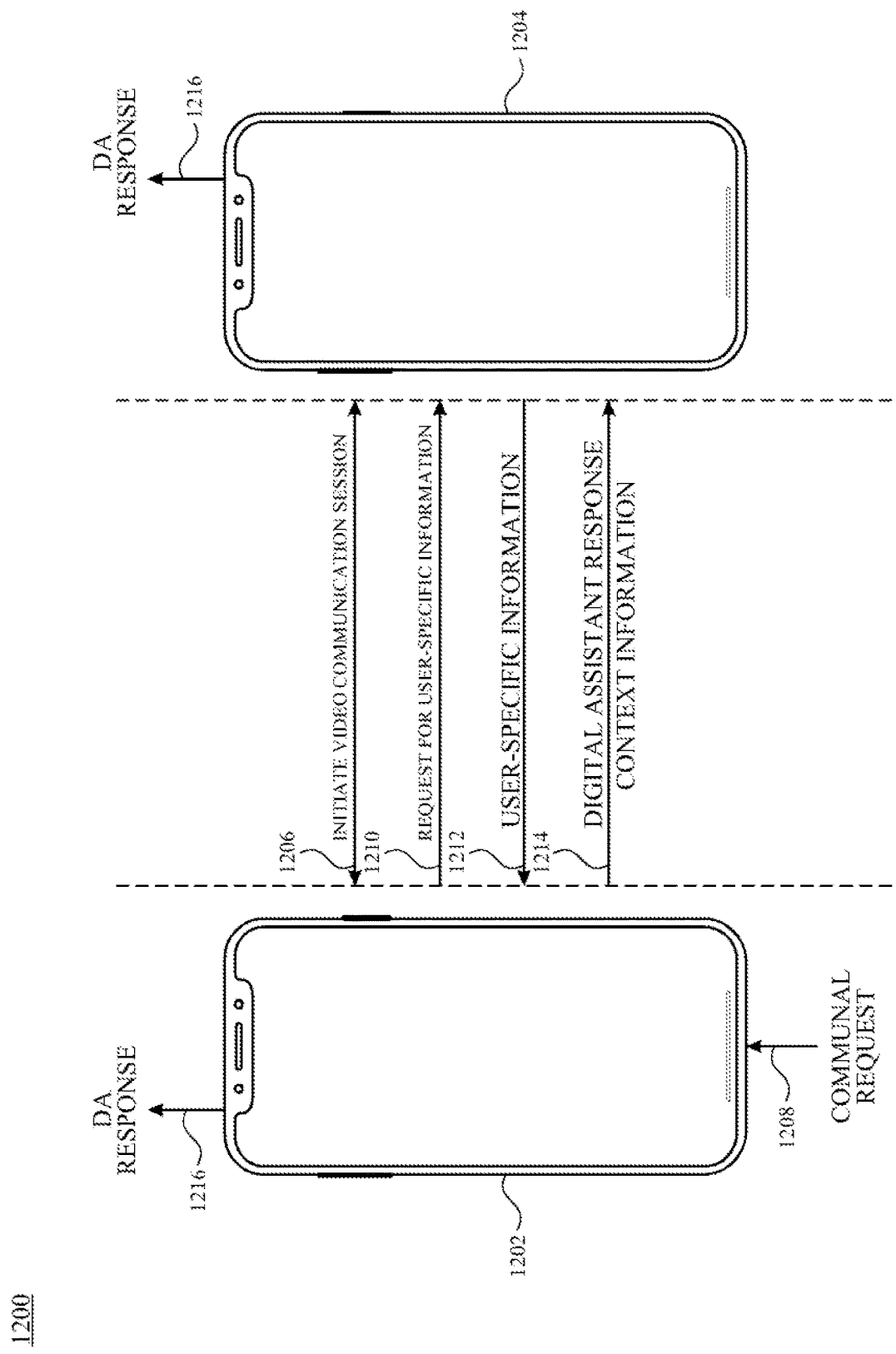
FIG. 12 illustrates a system and technique for providing a digital assistant response to a communal digital assistant request during a video communication session, according to various examples.

6. System and Technique for Providing a Digital Assistant Response to a Communal Digital Assistant Request Received During a Video Communication Session FIG. 12 illustrates a system and technique for providing a digital assistant response to a communal digital assistant request during a video communication session, according to various examples. System 1200 includes user device 1202 (e.g., user device 104, 122, 200, 400, 600) and user device 1204 (e.g., user device 104, 122, 200, 400, 600). In some examples, user device 1202 and user device 1204 are similar or identical to user device 802/1002 and user device 804/1004, respectively. It should be recognized that, in these examples, any of the operations performed by user device 1202 and/or user device 1204 can instead be performed by one or more servers (e.g., DA server 106). For example, one or more servers can perform the operations of the respective DA client modules (e.g., DA client module 229) of user device 1202 and/or user device 1204.

As represented by arrow 1206, user device 1202 and user device 1204 initiate a video communication session (e.g., a video conference, a virtual reality video conference, or an augmented reality video conference). In some examples, more than two user devices (e.g., four user devices) participate in the video communication session. In some examples, initiating a video communication session establishes one or more audio streams between each user device participating in the video communication session. For example, upon initiating a video communication session, user device 1202 and user device 1204 establish a first audio stream between one another. If, for example, a third user device were to join the video communication session, the third user device would establish a second audio stream between itself and user device 1002 and a third audio stream between itself and user device 1004. In some examples, the remaining steps of the technique (described in greater detail below with reference to FIG. 12) occur during the initiated video communication session between user device 1202 and user device 1204.

As represented by arrow 1208, user device 1202 receives a user voice input representing a communal digital assistant request. A communal digital assistant request is a user request for a digital assistant to perform one or more tasks based on context information (e.g., user device contextual state information, user-specific information and/or data, or the like) associated with at least two user devices participating in a video communication session (or in some examples, participating in a phone call). Some exemplary communal digital assistant requests include "Hey Siri, find a time for us to meet," "Hey Siri, play a song that John and I would like," and "Hey Siri, how long will it take John and I to get to Palo Alto?" As will be described in greater detail below, in some examples, a digital assistant provides/outputs a single digital assistant response to a communal digital assistant request. In other examples, a digital assistant provides/outputs more than one digital assistant response (e.g., two, three, or four responses) to a communal digital assistant request.

After receiving the user voice input, user device 1202 determines whether the voice input represents a communal digital assistant request (instead of, for example, a standard digital assistant request such as those described above with reference to FIG. 8). In some examples, determining whether the first user voice input represents a communal digital assistant request includes user device 1202 determining whether context information from at least two user devices participating in the video communication session can be used to fulfill a user request included in the user voice input (e.g., to perform one or more tasks associated with the user request). For example, in response to receiving the user voice input "Hey Siri, find a time for us to meet," user device 1202 (more specifically, the digital assistant of user device 1202) may determine that user-specific calendar information (which, as explained above with reference to FIG. 8, is a type of context information) from user device 1202 and from user device 1204 can be used to determine a time at which users of the two devices can meet and thus can be used to fulfill the user request included in the user voice input. Thus, in this example, user device 1202 would determine that the user voice input "Hey Siri, find a time for us to meet" represents a communal digital assistant request.

In some examples, determining whether the user voice input represents a communal digital assistant request includes user device 1202 determining whether the user voice input references more than one participant of the video communication session. In some examples, user device 1202 determines that the user voice input references more than one participant of the video communication session based on whether the user voice input (e.g., audio data corresponding to the user voice input or a text representation of the user voice input) includes a proper name (e.g., a stored contact name) of two or more video communication session participants. For example, user device 1202 may determine that the user voice input "Hey Siri, find a time for John, Adam, and I to meet" represents a communal digital assistant request if there are users named John and Adam that are participating in the video communication session (e.g., if John is the user of user device 1204 and Adam is a user of a third user device participating in the video communication session). In other words, user device 1202 would determine that "Hey Siri, find a time for John, Adam, and I to meet" represents a communal digital assistant request for at least the reason that the user voice input includes a proper name of two or more video communication session participants.

In some examples, user device 1202 determines that the user voice input references more than one participant of the video communication session based on whether the user voice input includes at least one proper name of a video communication session participant and a first-person singular pronoun (e.g., "I" or "me"). For example, user device 1202 may determine that the user voice input "Hey Siri, play a song that John and I would like" represents a communal digital assistant request if there is a user named John that is participating in the video communication session (e.g., if John is the user of user device 1204). In other words, user device 1202 would determine that "Hey Siri, play a song that John and I would like" represents a communal digital assistant request for at least the reason that the user voice input includes a proper name of a video communication session participant ("John") and a first-person singular pronoun ("I").

In some examples, user device 1202 determines that the user voice input references more than one participant of the video communication session based on whether the user voice input includes at least one plural pronoun (e.g., "us," "they," "them," "both," "our," and/or "we")). For example, user device 1202 may determine that the user voice input "Hey Siri, find a time for us to meet" represents a communal digital assistant request for at least the reason that the user voice input includes a plural pronoun ("us").

Note, in some examples, user device 1202 uses a combination of two or more of the above determinations to determine whether the received voice input represents a communal digital assistant request. For example, user device may determine that the user voice input is a communal digital assistant request because context information from at least two user devices participating in the video communication session can be used to fulfill a user request included in the user voice input and because the user voice input includes a plural pronoun.

If user device 1202 determines that the user voice input represents a communal digital assistant request, user device 1202 then transmits a request to user device 1204 (described in greater detail below with reference to arrow 1210). If user device 1202 determines that the user voice input does not represent a communal digital assistant request, user device 1202 forgoes transmitting a request to user device 1204 and, in some examples, obtains and/or outputs a digital assistant response based on the user voice input (e.g., as described above with reference to FIG. 8, arrow 808 and/or arrow 812).

In some examples, in response to receiving the user voice input and prior to determining whether the user voice input represents a communal digital assistant request, user device 1202 transmits the user voice input (e.g., audio data or text data representing the user voice input) to user device 1204. In some examples, user device 1202 transmits the user voice input to user device 1204 as a peer-to-peer transmission (e.g., using an audio stream established between the two user devices when the video communication session was initiated). In other examples, user device 1202 transmits the user voice input to one or more servers (e.g., DA server 106), which then transmit the user voice input (e.g., audio data or text data representing the first user input) to user device 1204. In some examples, after receiving the user voice input, user device 1204 outputs the user voice input as an audio output (e.g., using speaker 211).

In some examples, in response to receiving the user voice input and prior to determining whether the user voice input represents a communal digital assistant request, user device 1202 determines whether the user voice input (e.g., audio data corresponding to the user voice input or a text representation of the user voice input) includes a digital assistant trigger (e.g., "Hey Siri," "Siri," or the like). In response to determining that the user voice input includes a digital assistant trigger, user device 1202 performs the invocation indication process or the invocation permission process (e.g., as described above with reference to FIG. 8, arrow 818) to determine whether it should (1) proceed with determining whether the user voice input represents a communal digital assistant request or (2) forgo determining whether the user voice input represents a communal digital assistant request (and thus forgo obtaining and/or providing a digital assistant response based on the user voice input).

In some examples, user device 1202 performs the invocation indication process. Specifically, in response to determining that the user input includes a digital assistant trigger, user device 1202 (1) transmits an indication that its digital assistant has been invoked (to the other user device participating in the video communication session) in response to determining that a user input includes a digital assistant trigger and (2) determines whether the user voice input was received before or after the invocation of a digital assistant of another user device participating in the video communication session (based on any invocation indications recently received from the other user devices participating in the video communication session (e.g., received in the last 1, 5, or 10 seconds)). If user device 1202 determines that it received the user voice input after the invocation of a digital assistant of another user device participating in the video communication session, user device 1202 forgoes determining whether the user voice input represents a communal digital assistant request (and thus forgoes obtaining and/or providing a digital assistant response based on the user voice input). Alternatively, if user device 1202 determines that it received the user voice input before the invocation of a digital assistant of another user device participating in the video communication session, user device 1202 proceeds with determining whether the user voice input represents a communal digital assistant request (as described above).

In some examples, user device 1202 performs the invocation permission process (also called the baton passing process). Specifically, in response to determining that the user input includes a digital assistant trigger, user device 1202 determines whether it currently holds the digital assistant invocation permission. If user device 1202 determines that it currently holds the invocation permission, user device 1202 proceeds with determining whether the user voice input represents a communal digital assistant request.

If user device 1202 determines that it does not currently hold the invocation permission, user device 1202 transmits a request for the invocation permission to the other user devices participating in the video communication session. If user device 1202 receives the invocation permission from another user device participating in the video communication session (e.g., user device 1204) within a predetermined period of time after transmitting the request for the invocation permission (e.g., 0.5 seconds, 1 second, or 2 seconds after transmitting the request), user device 1202 proceeds with determining whether the user voice input represents a communal digital assistant request. However, if user device 1202 does not receive the invocation permission from another user device participating in the video communication session within the predetermined period of time after transmitting the request for the invocation permission, user device 1202 forgoes determining whether the user voice input represents a communal digital assistant request (and thus forgoes obtaining and/or providing a digital assistant response based on the user voice input).

In some examples, instead of waiting for the predetermined period of time to expire, user device 1202 forgoes determining whether the user voice input represents a communal digital assistant request in response to receiving an invocation permission request denial from another user device participating in the video communication session. In some of these examples, user device 1202 will continue to wait to act on the user voice input (but not entirely forgo determining whether the user voice input represents a communal digital assistant request) until user device 1202 receives the invocation permission or an invocation permission request denial from another user device participating in the video communication session.

In some examples, after (e.g., immediately after, 1 second after, or the like) user device 1202 forgoes determining whether the user voice input represents a communal digital assistant request (e.g., because user device 1202 never received the invocation permission and/or received an invocation permission request denial), user device 1202 displays (e.g., on touch-sensitive display system 212 of user device 1202) an indication that a digital assistant of user device 1202 is currently unavailable and/or an indication that a digital assistant of another user device participating in the video communication session is currently invoked. In some examples, user device 1202 continues to display the indication (or at least a portion of the indication) until its digital assistant is once again available (e.g., because the digital assistant of the other user device participating in the video communication session is no longer invoked).

As explained above with reference to arrow 818 of FIG. 8, the invocation indication and invocation permission processes described above help prevent concurrent invocations of multiple digital assistants during the video communication session. In this manner, only one user device at a time (of the two or more user devices participating in a video communication session) can obtain/provide a digital assistant response based on a user input during the video communication session. This in turn maintains the appearance of a single digital assistant that is participating in the video communication session by, for example, preventing the provision of multiple overlapping digital assistant response at the same time (e.g., the audio output of two digital assistant response at the same time). For more information regarding the invocation indication process and the invocation permission process, refer to the description corresponding to arrow 818 of FIG. 8.

As represented by arrow 1210, user device 1202 transmits a request to user device 1204 for user device 1204 to provide user device 1202 with user-specific information associated with the user voice input. User-specific information includes information and/or data corresponding to a current user of a user device (e.g., a current user of user device 1204). Examples of user-specific information and/or data are described above in greater detail with reference to arrow 810 of FIG. 8. In some examples, the request for the user-specific information associated with the user voice input is a request for user device 1204 to provide a certain piece of user-specific information (e.g., user-specific calendar entries for one or more particular dates, a user's favorite song, a user's favorite restaurant, or the like). For example, if the user voice input is "Hey Siri, find a time for John and I to meet today", user device 1202 may transmit a request to user device 1204 (which in this example is John's user device) for data corresponding to John's calendar entries for today.

In some examples, the request for the user-specific information associated with the user voice input is a request for user device 1204 to provide a certain type of user-specific information based on one or more domains (e.g., domains of ontology 760) of the user voice input. For example, if user device 1202 determines that the user voice input "Hey Siri, find John and I a restaurant we would both like" corresponds to the "restaurant reservation" domain (e.g., based on results of the natural language processing of the communal digital assistant request), user device 1202 may transmit a request to user device 1204 (which in this examples is John's user device) for user-specific restaurant information and/or preferences (e.g., recently visited restaurants, favorite restaurants, or the like). As another example, if user device 1202 determines that the user voice input "Hey Siri, play a song John and I would like" corresponds to the "music playing" domain, user device 1202 may transmit a request to user device 1204 for user-specific music information and/or preferences (e.g., recently played songs, favorite songs, or the like). In yet another example, if user device 1202 determines that the user voice input "Hey Siri, find a time when we can meet" corresponds to the a "schedule a meeting" domain, user device 1202 may transmit a request to user device 1204 for user-specific calendar information (e.g., all user-specific calendar information instead of user-specific calendar entries for a particular date).

In some examples, user device 1202 transmits a request to user device 1204 for user device 1204 to provide user device 1202 with a predetermined set of one or more types of user-specific information (instead of transmitting a request to user device 1204 for user-specific information associated with the user voice input). In other words, in these examples, user device 1202 transmits a request for the predetermined set of user-specific information types regardless of the content of the communal digital assistant request. In some examples, the predetermined set includes one or more of user-specific calendar information, user-specific restaurant information, user-specific music information, user-specific sports information, or the like. Thus, for example, if the user voice input is "Hey Siri, find a time for us to meet", user device 1202 may transmit a request to user device 1204 for user device 1204 to provide a predetermined set of user-specific information including all user-specific calendar information and all user-specific music information.

In some examples, user device 1202 transmits a general request to user device 1204 for user device 1204 to provide user device 1202 with context information associated with the user voice input (instead of transmitting a request to user device 1204 for user-specific information associated with the user voice input). As explained above, context information associated with a user voice input includes, for example, the contextual state of a user device (e.g., a current location of the user device at the time the user voice input is received), contact information associated with the user voice input, user-specific information and/or data associated with the user voice input, dialog history information associated with the user voice input (and corresponding to digital assistant dialog sessions during the video communication session), or the like. Thus, a general request for context information associated with the user voice input is a request for user-specific information associated with the user voice input as well as for other types of context information associated with the user voice input (e.g., contextual state of a user device, stored contact information, dialog history information, etc.). For example, if the user voice input is "Hey Siri, how long will it take John and I to get to Palo Alto", user device 1202 may transmit a general request for context information such as user-specific navigational preferences and a current location of user device 1204. The various types of information and/or data included in context information that one user device can provide to another user device during a video communication session are described in greater detail above with reference to arrow 810 of FIG. 8.

In some examples, user device 1202 transmits the request for user-specific information and/or the general request for context information to one or more servers (instead of to user device 1204). In these examples, the one or more servers subsequently relay the request for user-specific information and/or the general request for context information to user device 1204.

Determining whether a user voice input is a communal digital assistant request and subsequently transmitting a request for user-specific information (and/or other context information) associated with the user voice input to other user devices participating in a video communication session (if the user voice input is a communal digital assistant request) allows users of user devices participating in a video communication session to provide digital assistant requests during the video communication session in a more natural and conversational manner. For example, instead of two or more users having to individually provide the same digital assistant request (e.g., "Hey Siri, when am I free today?") during a video communication session, a single user can provide a communal digital assistant request (e.g., "Hey Sir, find a time for us to meet.") and, as will be described in greater detail below, the user's user device can subsequently obtain and provide one or more digital assistant responses that take user-specific information (and/or other context information) received from the other user devices into account (e.g., "You, John, and Adam are all free today at 5:30 PM."). This in turn creates an appearance of a single digital assistant that is participating with all of the user devices in the video communication session (as opposed to an individual digital assistant for each user device) and that is aware of the context of each user/user device. This ultimately improves the video communication session experience for the users of the first user device and the second user device.

As represented by arrow 1212, in response to receiving the request for user-specific information associated with the user voice input from user device 1202, user device 1204 retrieves and transmits user-specific information associated with the user voice input (e.g., data representing the user-specific information) to user device 1202. For example, user device 1204 transmits at least a portion of the requested user-specific information to user device 1202. In some examples, user device 1204 retrieves the user-specific information from a memory of user device 1204 (e.g., memory 202 or memory 470). In some examples, user device 1204 retrieves the user-specific information from one or more servers (e.g., DA server 106).

Similarly, in the examples described above in which user device 1202 transmits a general request for context information associated with the user voice input to user device 1204 (instead of a request for user-specific information), user device 1204 retrieves and transmits context information associated with the user voice input (e.g., data representing the context information) to user device 1202 in response to receiving the general request. In some examples, user device 1204 retrieves the context information from a memory of user device 1204. In some examples, user device 1204 retrieves the context information from one or more servers.

In some examples, the requested user-specific information is stored (e.g., locally or remotely) by a software application (e.g., a third-party software application) that is stored on user device 1204. In these examples, user device 1204 issues a request to the software application for the desired user-specific information, the software application retrieves the user-specific information (e.g., from a memory of user device 1204 and/or from one or more servers), and then the software application provides the requested user-specific information to user device 1204. After receiving the requested user-specific information from the software application, user device 1204 transmits the user-specific information to user device 1202. For example, if user device 1204 receives a request from user device 1202 for user-specific calendar information (e.g., a request for a user's calendar entries for a particular date, a request for all of a user's calendar entries, or the like), user device 1204 may issue a request to a third-party calendar software application for the user-specific calendar information. In response to such a request, the calendar software application may retrieve the requested user-specific information from one or more of the third party's remote servers, and subsequently provide the retrieved user-specific information to user device 1204. User device 1204 may then transmit the user-specific calendar information to user device 1202. Other examples of user-specific information that user device 1204 can request from a software application (e.g., third-party software application) stored on user device 1204 include (but are not limited to) user-specific music information, restaurant information, location information, sports information, messaging information, and any other type of user-specific information described above.

In some examples, user device 1204 transmits the requested user-specific information and/or context information to one or more servers (instead of to user device 1202). In these examples, the one or more servers subsequently relay the user-specific information and/or context information to user device 1202.

After receiving user-specific information (or in some examples, context information) from user device 1204, user device 1202 obtains a digital assistant response based on the user voice input (e.g., natural language processing results for the user voice input), at least a portion of the received user-specific information (or context information), and at least a portion of user-specific information (or context information) associated with the user voice input that is stored on user device 1202. For example, if the user input is "Hey Siri, find a time for John and I to meet", user device may obtain the digital assistant response "You and John are both free at 5:30 PM" based on the natural language processing results of the user voice input, user-specific calendar information received from user device 1204, and user-specific calendar information stored on user device 1202.

In some examples, obtaining the digital assistant response includes user device 1202 performing natural language processing of the user voice input, determining one or more tasks to perform (e.g., based on results of the natural language processing), performing one or more tasks (e.g., performing a search, retrieving data, performing text-to-speech processing, etc.) based on at least a portion of the user-specific information received from user device 1204 and/or at least a portion of the user-specific information associated with the user voice input that is stored on user device 1202, and determining the digital assistant response based on results of the performance of the one or more tasks.

In some examples, the one or more tasks that user device 1202 performs include comparing at least a portion of the user-specific information (or context information) received from user device 1204 to at least a portion of user-specific information (or context information) associated with the user voice input that is stored on user device 1202. For example, user device 1202 may compare user-specific calendar information received from user device 1204 to user-specific calendar information stored on user device 1202 to determine common available meeting times for the users of both devices. As another example, user device 1202 may compare user-specific music information (e.g., recently played song data) received from user device 1204 to corresponding user-specific music information stored on user device 1202 to determine a common song and/or genre of music that the users of both devices enjoy listening to.

In some examples, obtaining the digital assistant response includes user device 1202 transmitting (1) the user voice input (e.g., audio data representing the user voice input), (2) at least a portion of the user-specific information received from user device 1204, and/or (3) at least a portion of the user-specific information associated with the user voice input that is stored on user device 1202 to one or more servers (e.g., DA server 106). Then, in some of these examples, user device 1202 subsequently receives the digital assistant response from the one or more servers (e.g., after the one or more servers perform natural language processing of the user voice input and perform one or more tasks to determine the digital assistant response based on the received user-specific information). In other examples, after user device 1202 transmits the user voice input and/or user-specific information to the one or more servers, user device 1202 receives one or more commands to perform one or more tasks from the one or more servers (e.g., a command to find a meeting time based on a comparison of calendar information received from user device 1204 and calendar information stored on user device 1202). In some examples, after performing the one or more tasks in response to the one or more commands, user device 1202 determines the digital assistant response based on results of the one or more performed tasks (e.g., determining the digital assistant response based on one or more available meeting times determined by user device 1202). In other examples, after performing the one or more tasks in response to the one or more commands, user device 1202 transmits the results of the one or more performed tasks (e.g., data representing the results) to the one or more servers. The one or more servers then determine the digital assistant response based on the results and subsequently transmit the digital assistant response (e.g., text and/or audio data representing the digital assistant response) to user device 1202.

As discussed above, in some examples, user-specific information that user device 1204 transmits to user device 1202 includes user specific information that was stored (e.g., locally or remotely) by a software application stored on user device 1204. In some of these examples, obtaining the digital assistant response further includes user device 1202 (or in some examples, one or more servers) processing the user-specific information received from user device 1204 before using at least a portion of that user-specific information to determine the digital assistant response. For example, user device 1202 may reformat user-specific information received from user device 1204 because the information is in a format that is not native to user device 1202 (e.g., the information is in a unique formatting that a third-party software application uses). As another example, user device 1202 may extract certain pieces of information (e.g., calendar entries for a particular date) from the entirety of the user-specific information received from user device 1204 (e.g., all calendar entry data for the user of user device 1204). Then, after processing the user-specific information, user device 1202 (or in some examples, one or more servers) can use at least a portion of the processed information (along with user-specific information stored on user device 1202) to obtain one or more digital assistant responses (e.g., as described above).

In some examples, user device 1202 processes the user-specific information received from user device 1204 based on one or more protocols corresponding to the software application that provides user device 1204 with the user-specific information. In some examples, the one or more protocols are stored on user device 1202 (e.g., in memory 202 or memory 470). In some examples, user device 1204 transmits the one or more protocols (e.g., data corresponding to the one or more protocols) to user device 1202 when transmitting the user-specific information. In some examples, user device 1204 receives the one or more protocols for processing the user-specific information from the software application that provides the user-specific information to user device 1204. For example, the software application provides the one or more protocols to user device 1204 when the software application is installed onto user device 1204. As another example, the software application provides the one or more protocols to user device 1204 when it provides the user-specific information.

In some of the examples described above in which the one or more servers determine the digital assistant response or the one or more commands, user device 1202 transmits the user-specific information to the one or more servers along with the one or more protocols for processing the user-specific information. In these examples, the one or more servers process the user-specific information based on the one or more protocols and then determine the digital assistant response or the one or more commands based on the processed user-specific information. In other examples, user device 1202 processes the user-specific information based on the one or more protocols and then provides the processed user-specific information to the one or more servers so that the one or more servers may determine the digital assistant response or the one or more commands.

In some examples, the digital assistant response includes a natural-language expression corresponding to a task performed by user device 1202 (and/or one or more servers) based on the user voice input, at least a portion of the user-specific information received from user device 1204, and/or at least a portion of the user-specific information from user device 1202. For example, if the user voice input is "Hey Siri, play a song that we like", the digital assistant response may include the natural language expression "OK. Playing Enter Sandman by Metallica." In this example, the natural language expression "OK. Playing Enter Sandman by Metallica" corresponds to the tasks of, for example, comparing the user-specific music information (e.g., recently played songs data) from user device 1204 and user device 1202, selecting a song based on the user-specific information (e.g., a song that has been recently played by both user devices), and providing data for the song (e.g., informational data such as the song name and artist, audio data for the song, and/or the like). In some examples, the digital assistant response includes data that is retrieved and/or determined by user device 1202 (and/or one or more servers) (e.g., website hyperlinks, images, music information, audio data, video data, navigational information, stored contact information, weather information, or the like). For example, the digital assistant response in the example above includes music information (e.g., the song name "Enter Sandman," the artist name "Metallica," and audio data corresponding to the song (e.g., when the digital assistant response includes playing the audio data for the determined song)).

In some examples, user device 1202 (or in some examples, one or more servers) obtains two or more digital assistant responses instead of a single digital assistant response. In some of these examples, each digital assistant response of the two or more digital assistant responses is based on user-specific information (or context information) from a separate user device participating in the video communication session. For example, in response to the user voice input "How long will it take John and I to get to Palo Alto?", user device 1202 (or one or more servers) may obtain a first digital assistant response such as "It will take John 20 minutes to get to Palo Alto" based on context information (specifically, current location data) from user device 1204 and a second digital assistant response such as "It will take you 30 minutes to get to Palo Alto" based on context information (specifically, current location data) from user device 1202.

As represented by arrow 1214, user device 1202 provides the digital assistant response and user-specific information associated with the user voice input (e.g., data representing the digital assistant response and the user-specific information) to user device 1204. User device 1202 provides the digital assistant response and the user-specific information in the same manner that user device 802 and user device 804 provide the first and second digital assistant responses and corresponding context information (according to the various examples described above with reference to arrow 810 and arrow 816 of FIG. 8, respectively).

For example, the different types of context information that user device 802 and user device 804 provide (when providing a digital assistant response in the various examples described above) can also be provided by user device 1202 at this step. While arrow 1214 represents user device 1202 providing user-specific information, as explained above, user-specific information is a type (or subset) of context information. Thus, when user device 1202 provides the different types of context information associated with the user voice input (as described above with reference to arrow 810 and arrow 816 of FIG. 8), this includes providing the user-specific information associated with the user voice input. Note, in some examples, user device 1202 only provides the user-specific information and/or context information that was used to determine the digital assistant response. In other examples, user device 1202 provides all user specific information and/or context information that is associated with the user voice input (even if it was not necessarily used to determine the digital assistant response). For example, user device 1202 may provide a dialog history between a digital assistant of user device 1202 and a user of user device 1202 during the video communication session (that includes the user voice input) even if information from the dialog history was not used to determine the digital assistant response.

Similarly, user device 1202 can provide the digital assistant response and user-specific information (and/or context information) according to the different ways of providing a digital assistant response and context information described above with reference to arrow 810 and arrow 816 of FIG. 8. Specifically, as shown in FIG. 12, user device 1202 directly transmits the digital assistant response (e.g., data corresponding to the digital assistant response) and the user-specific information to user device 12004 (e.g., in a peer-to-peer fashion). For example, user device 1202 can transmit the digital assistant response to user device 1204 via an audio stream established between user device 802 and user device 1204 when the video communication session that the two devices are participating in was initiated. Alternatively, in some examples, providing the digital assistant response and the user-specific information to user device 1204 includes user device 1202 transmitting the digital assistant response and the user-specific information (e.g., data representing the digital assistant response and the user-specific information) to one or more servers. In these examples, the one or more servers subsequently transmit the digital assistant response and the user-specific information to user device 1204.

User device 1202 can also provide the digital assistant response according to the different forms (e.g., data types) in which a digital assistant response is provided in the various examples described above with reference to arrow 810 and arrow 816 of FIG. 8. For example, user device 1202 can transmit the digital assistant response to user device 1204 (or in some examples, one or more servers) as audio data via an audio stream (e.g., an audio stream established between user device 1202 and user device 1204 when the video communication session that the two devices are participating in was initiated). As another example, user device 1202 transmits the digital assistant response to user device 1204 as text data (e.g., a textual representation of the digital assistant response). In yet another example, user device 1202 provides a command to perform one or more tasks to user device 1204. In these examples, user device 1204 performs the one or more tasks in response to receiving the command and subsequently obtains the digital assistant response based on results of the performance of the one or more tasks.

As mentioned above, in some examples, user device 1202 determines two or more digital assistant responses (instead of a single digital assistant response) based on the user voice input, at least a portion of the user-specific information received from user device 1204, and/or the user-specific information stored on user device 1202. In these examples, user device 1202 provides the two or more digital assistant responses (e.g., audio data and/or text data representing the two or more digital assistant responses) to user device 1204.

In some examples, user device 1204 uses at least a portion of the user-specific information (and/or context information) provided by user device 1202 to determine a second digital assistant response for a second user voice input (e.g., and thus create an appearance of a single digital assistant that is participating in the video communication session (e.g., as described above with reference to arrow 814 of FIG. 8)).

As represented by arrow 1216, user device 1202 and/or user device 1204 output the digital assistant response. User device 1202 and/or user device 1204 output the digital assistant response in the same manner that user device 802 and/or user device 804 output the first and second digital assistant responses (according to the various examples described above with reference to arrow 812 and arrow 818 of FIG. 8, respectively).

As mentioned above, in some examples, user device 1202 provides two or more digital assistant response to user device 1204. In these examples, user device 1202 and/or user device 1204 output the two or more digital assistant responses (one digital assistant response followed by another) in any of the various ways described above. For example, if the user voice input is "How long will it take John and I to get to Palo Alto?", user device 1202 and/or user device 1204 may output (e.g., as an audio output and/or as text on a display) a first digital assistant response such as "Traffic to Palo Alto looks heavy for John, so I am estimating 1 hour via I-280 N." followed by a second digital assistant response such as "Traffic to Palo Alto is light for you, so I am estimating 16 minutes via El Camino Real.".

Figure 13A:
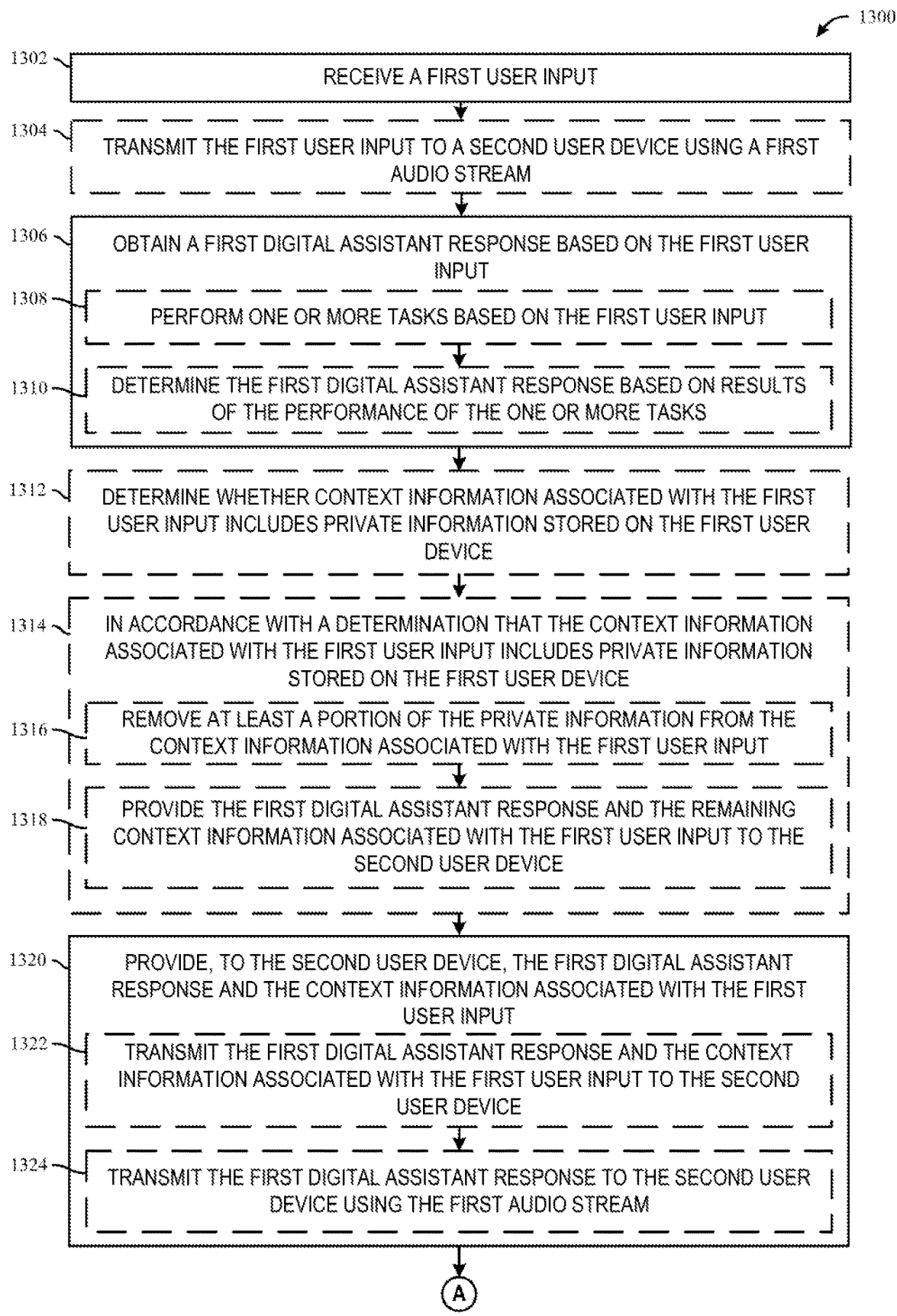
FIGS. 13A-C illustrate a flow chart representing a process for providing context-aware digital assistant responses during a video communication session, according to various examples.
Figure 13B:
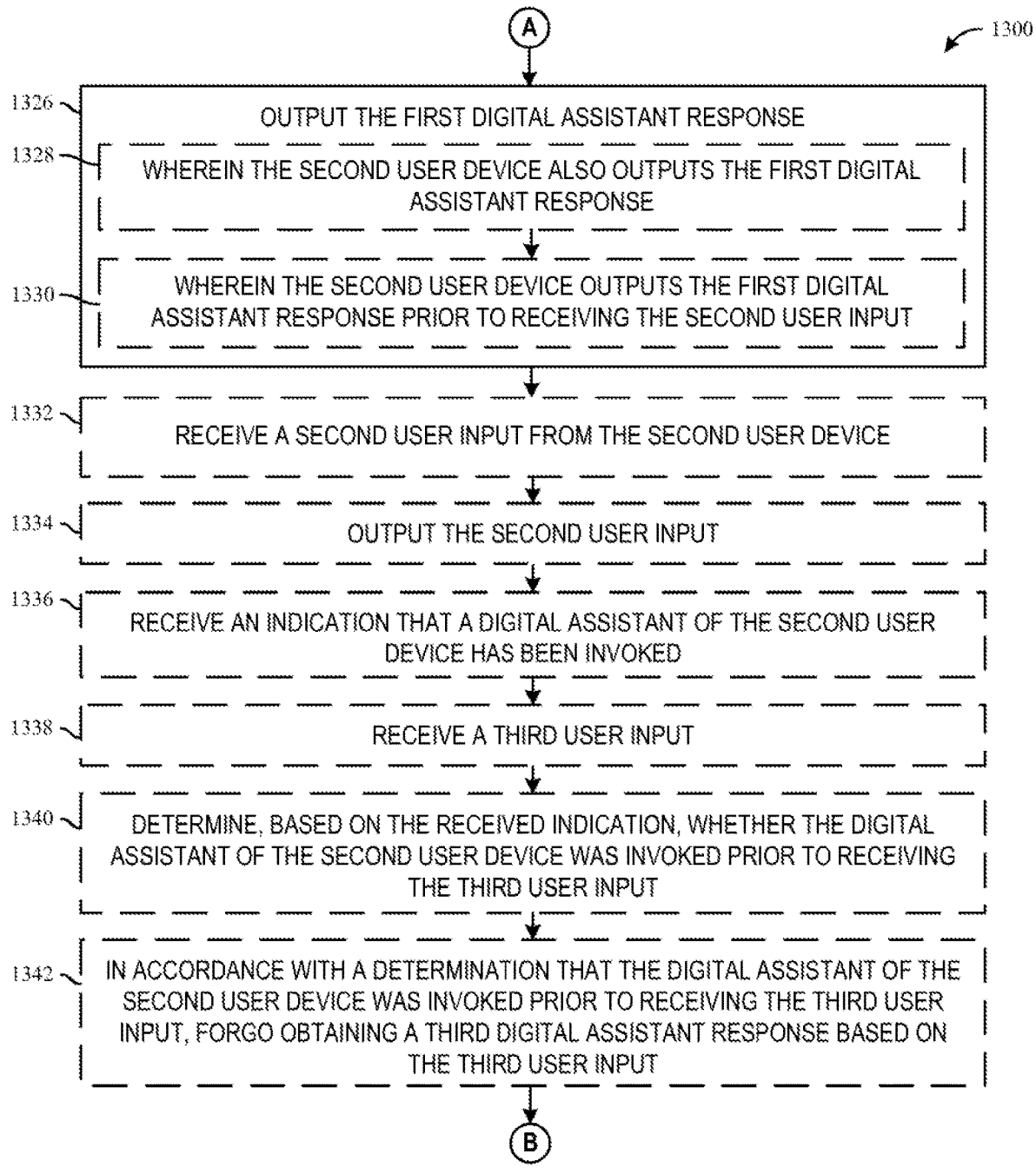
Figure 13C:
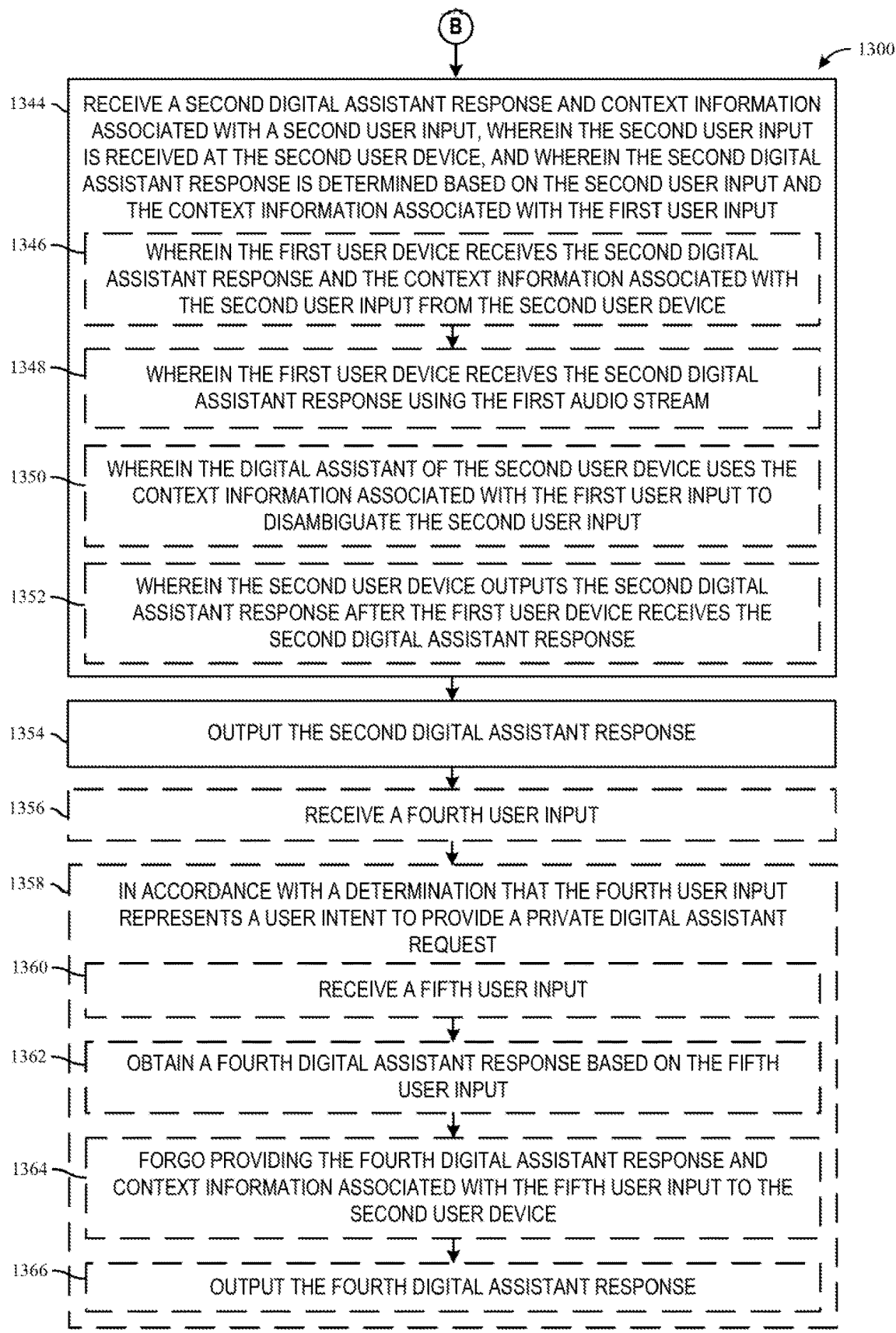

7. Processes for Providing a Digital Assistant During a Video Communication Session Between at Least Two User Devices FIGS. 13A-C illustrate a flow chart representing a process for providing context-aware digital assistant responses during a video communication session, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client/user device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

In some examples, process 1300 (or at least a portion of process 1300) is performed during a video communication session (e.g., a video conference) between at least two user devices (e.g., as represented by arrow 806).

At block 1302, a first user device (of the at least two user devices participating in the video communication session) (e.g., user device 802) receives a first user input (e.g., as represented by arrow 808). In some examples, the first user input represents a user request for a digital assistant of the first user device to perform a task (e.g., "Hey Siri, what's the weather like in Palo Alto?").

At block 1304, in some examples, the first user device transmits the first user input to a second user device (of the at least two user devices participating in the video communication session) (e.g., user device 804) using a first audio stream.

At block 1306, the first user device obtains a first digital assistant response based on the first user input. In some examples, the first digital assistant response includes a natural-language expression corresponding to a task performed by a digital assistant of the first user device based on the first user input (e.g., "It is currently 90 degrees in Palo Alto" corresponds to the task of determining the weather in Palo Alto). In some examples, the first digital assistant response includes data that is retrieved and/or determined by a digital assistant of the first user device (e.g., a website hyperlink, an image, a video, contact information, or the like).

In some examples, obtaining the first digital assistant response includes performing natural language processing of the first user input (e.g., at the first user device or at one or more servers). In some examples, obtaining the first digital assistant response includes receiving the first digital assistant response from one or more servers (e.g., DA server 106) (e.g., when the one or more servers perform the natural language processing of the first user input).

In some examples, obtaining the first digital assistant response based on the first user input includes the first user device performing one or more tasks based on the first user input, as shown at block 1308. In some examples, performing one or more tasks based on the user input includes transmitting the first user input to one or more servers, receiving a command to perform a task (e.g., a command to perform a search to determine the current temperature in Palo Alto) from the one or more servers, and/or performing the task based on the received command.

In some examples, obtaining the first digital assistant response based on the first user input further includes the first user device determining the first digital assistant response based on results of the performance of the one or more tasks (e.g., determining the first digital assistant response based on current temperature information acquired via a search), as shown at block 1310.

In some examples, at block 1312, the first user device determines whether context information associated with the first user input includes private information stored on the first user device. In some examples, the private information includes personal information associated with a user of the first user device (e.g., the user's SSN, email address, personal home address, health records, or the like). In some examples, the private information includes personal information for contacts stored on the first user device (e.g., a stored contact's home address, email address, phone number, or the like).

In some examples, at block 1314, in accordance with a determination that the context that the context information includes private information stored on the first user device, the first user device removes at least a portion of the private information from the context information associated with the first user input, as shown at block 1316. In some examples, the at least a portion of the private information includes private information that was not specifically requested in the user input (e.g., removing a stored contact's email address from the context information if the user input only requests the digital assistant to call the stored contact's phone number). Then, the first user device provides the first digital assistant response and the remaining context information associated with the first user input to the second user device, as shown at block 1318.

At block 1320, the first user device provides, to the second user device, the first digital assistant response and the context information associated with the first user input (e.g., as represented by arrow 810). In some examples, the context information associated with the first user input includes a current location of the first user device when first user input is received (e.g., Palo Alto), a dialog history between a digital assistant of the first user device and a user of the first user device (e.g., the first user input, previous user inputs during video communication session, and/or previous digital assistant responses during the video communication session), and/or the like.

In some examples, providing the first digital assistant response and the context information associated with the first user input to the second user device includes transmitting the first digital assistant response and the context information associated with the first user input to the second user device, as shown at block 1322. In some examples, providing the first digital assistant response and the context information to the second user device includes transmitting the first digital assistant response and the context information associated with the first user input to one or more servers, wherein the one or more servers subsequently transmit the first digital assistant response and the context information associated with the first user input to the second user device.

In some examples, the first user device transmits the first digital assistant response to the second user device using the first audio stream, as shown at block 1324.

At block 1326, the first user device outputs the first digital assistant response (e.g., as represented by arrow 812). In some examples, outputting the first digital assistant response includes outputting the first digital assistant response as an audio output at a speaker of the first user. In some examples, outputting the first digital assistant response includes displaying the first digital assistant response (e.g., data that is retrieved and/or determined by the digital assistant) on a display of the first user device.

In some examples, the second user device also outputs the first digital assistant response, as shown at block 1328. In some examples, the second user device outputs the first digital assistant response prior to receiving the second user input (e.g., as represented by arrow 812), as shown at block 1330.

In some examples, at block 1332, prior to receiving a second digital assistant response, the first user device receives a second user input from the second user device (e.g., a user input from a user of the second user device (e.g., as represented by arrow 814)). In some examples, the second user input is received from the second user device (e.g., via a telecommunications network, using the first audio stream, and/or the like). In some examples, the second user input is received from one or more servers.

In some examples, at block 1334, the first user device outputs the second user input (e.g., as an audio output at a speaker of the first user).

In some examples, at block 1336, prior to receiving a second digital assistant response, the first user device receives an indication (e.g., a message or a signal) that a digital assistant of the second user device has been invoked.

In some examples, at block 1338, the first user device receives a third user input (e.g., a user input that invokes the digital assistant of the first user device).

In some examples, at block 1340, the first user device determines, based on the received indication, whether the digital assistant of the second user device was invoked prior to receiving the third user input.

In some examples, at block 1342, in accordance with a determination that the digital assistant of the second user device was invoked prior to receiving the third user input, the first user device forgoes obtaining a third digital assistant response based on the third user input.

At block 1344, the first user device receives a second digital assistant response (e.g., "Traffic to Palo Alto is moderate, so it should take 20 minutes via US-101 South." or "It is currently 90 degrees in New York.") and context information associated with a second user input (e.g., as represented by arrow 816), wherein the second user input (e.g., "How long will it take to drive there?" or "How about in New York?") is received at the second user device (e.g., as represented by arrow 814), and wherein the second digital assistant response is determined based on the second user input and the context information associated with the first user input. In some examples, the context information associated with the second user input includes a current location of the second user device when second user input is received, a dialog history between a digital assistant of the second user device and a user of the second user device (e.g., the second user input, previous user inputs during video communication session, and/or previous digital assistant responses during video communication session), and/or the like.

In some examples, the first user device receives the second digital assistant response and the context information associated with the second user input from the second user device, as shown at block 1346. In some examples, the first user device receives the second digital assistant response (from the second user device) using the first audio stream, as shown at block 1348. In some examples, the first user device receives the second digital assistant response and the context information associated with the second user input from one or more servers.

In some examples, a digital assistant of the second user device uses the context information associated with the first user input to disambiguate the second user input, as shown at block 1350. In some examples, disambiguating the second user input includes determining one or more parameters for the second user input based on the context information associated with the first user input. In some examples, disambiguating the second user input includes using a parameter of the first user input (e.g., a location, contact name, website, email address, and/or the like included in the first user input) to perform a task (e.g., navigation to Palo Alto instead of weather determination). In some examples, disambiguating the second user input includes determining that the second user input represents a user request for a digital assistant of the second user device to perform a task previously performed by the digital assistant of the first user device (e.g., weather determination) using parameters provided in the second user input (e.g., a location (e.g., "New York"), contact name, website, email address, and/or the like included in the first user input).

In some examples, the second user device outputs the second digital assistant response after the first user device receives the second digital assistant response (e.g., as represented by arrow 818), as shown at block 1352.

At block 1354, the first user device outputs the second digital assistant response (e.g., as represented by arrow 818). In some examples, outputting the second digital assistant response includes outputting the second digital assistant response as an audio output at a speaker of the first user device. In some examples, outputting the second digital assistant response includes displaying the second digital assistant response (e.g., data that is retrieved and/or determined by the digital assistant) on a display of the first user device.

In some examples, at block 1356, the first user device receives a fourth user input (e.g., a user voice input, a selection of a displayed affordance (e.g., a conversation mute affordance or a private digital assistant conversation affordance), or a physical button press).

In some examples, at block 1358, in accordance with a determination that the fourth user input represents a user intent to provide a private digital assistant request, the first user device receives a fifth user input (e.g., "Hey Siri, how is the weather in Palo Alto?"), as shown at block 1360. Then, in some examples, the first user device obtains a fourth digital assistant response based on the fifth user input, as shown at block 1362. In some examples, obtaining the fourth digital assistant response includes performing natural language processing of the fifth user input (e.g., at the first user device or at one or more servers)). In some examples, obtaining the fourth digital assistant response includes receiving the fourth digital assistant response from one or more servers (e.g., when the one or more servers perform the natural language processing of the fifth user input). In some examples, obtaining the fourth digital assistant response includes receiving a command to perform a task (e.g., a search to determine the current temperature in Palo Alto) from the one or more servers, performing the task based on the command, and/or determining the fourth digital assistant response based on results of the performed task (e.g., determining the fourth digital assistant response based on current temperature information acquired via a search).

In some examples, after obtaining the fourth digital assistant response, the first user device forgoes providing the fourth digital assistant response and context information associated with the fifth user input to the second user device, as shown at block 1364. Then, in some examples, the first user device outputs the fourth digital assistant response, as shown at block 1366. In some examples, outputting the fourth digital assistant response includes outputting the fourth digital assistant response as an audio output at a speaker of the first user device. In some examples, outputting the fourth digital assistant response includes displaying the fourth digital assistant response (e.g., data that is retrieved and/or determined by the digital assistant) on a display of the first user device.

Figure 14A:
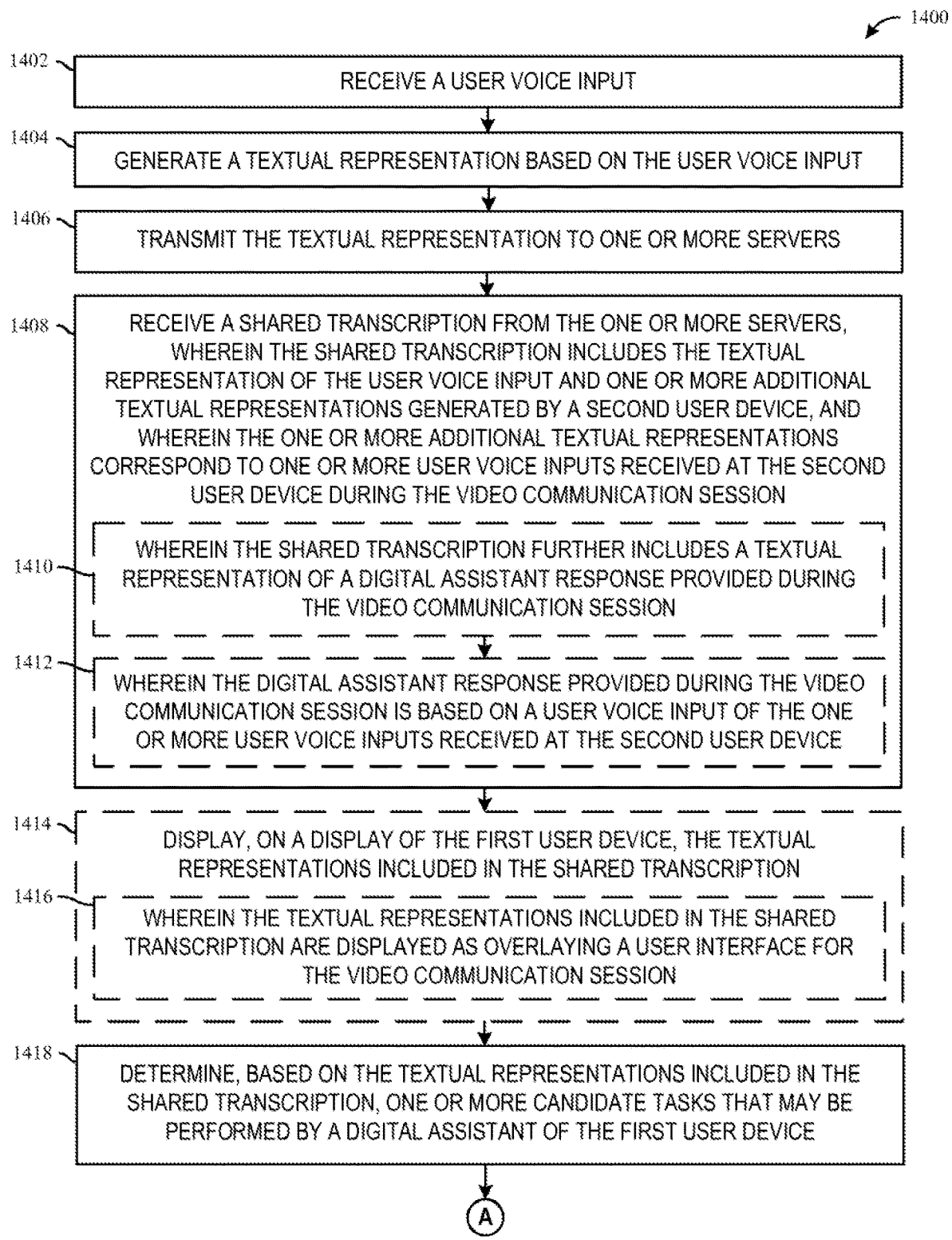
FIGS. 14A-B illustrate a flow chart representing a process for determining candidate digital assistant tasks based on user voice inputs received at user devices participating in a video communication session, according to various examples.
Figure 14B:
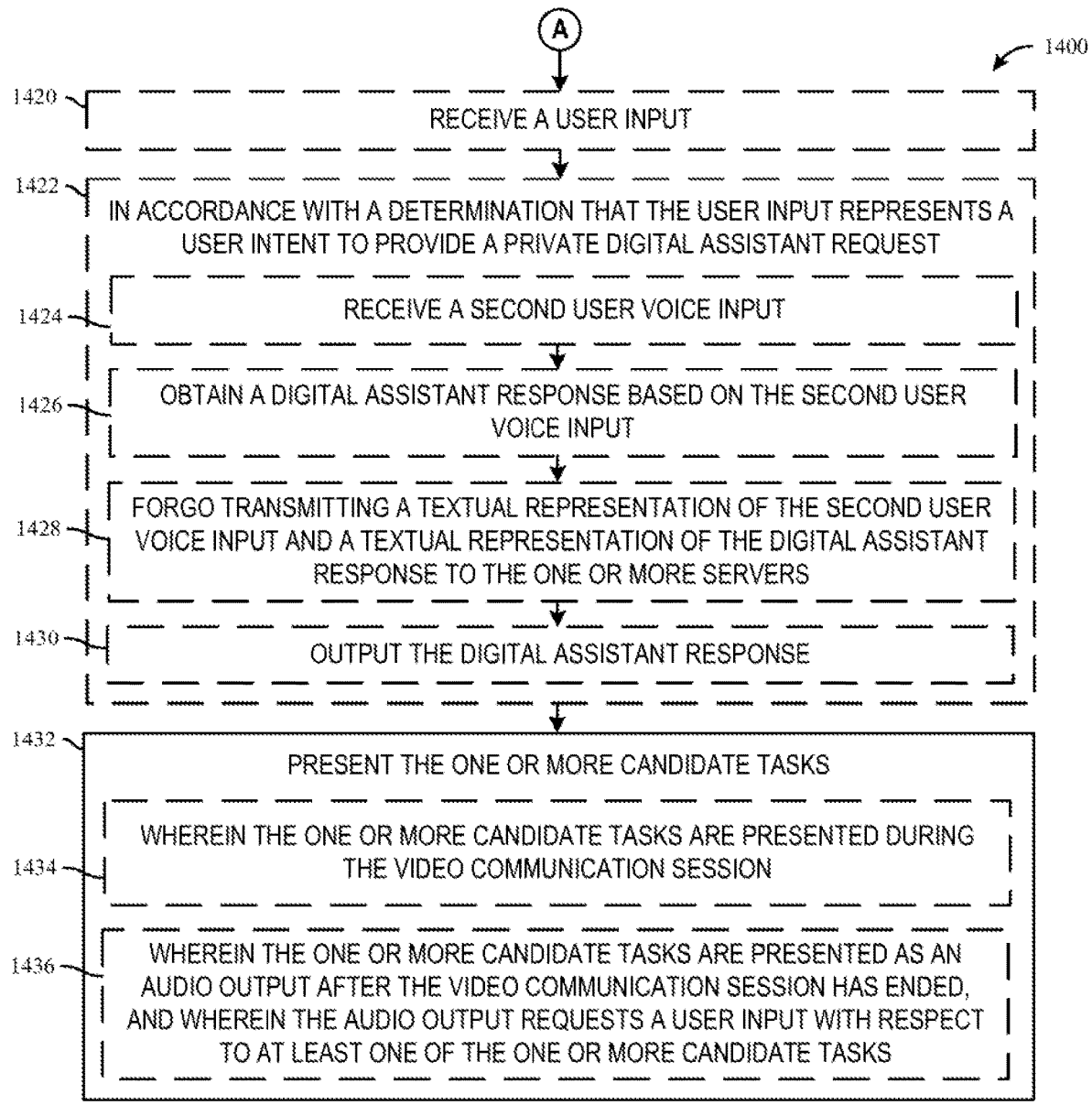

FIGS. 14A-B illustrate a flow chart representing a process for determining candidate digital assistant tasks based on user voice inputs received at user devices participating in a video communication session, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

In some examples, process 1400 (or at least a portion of process 1400) is performed during a video communication session (e.g., a video conference) between at least two user devices (e.g., as represented by arrow 1008).

At block 1402, a first user device of the at least two user devices (e.g., user device 1002) receives a user voice input (e.g., as represented by arrow 1010). In some examples, the first user input invokes a digital assistant of the first user device. In some examples, the first user input does not invoke a digital assistant of the first user device.

At block 1404, the first user device generates a textual representation based on the user voice input.

At block 1406, the first user device transmits the textual representation to one or more servers (e.g., server 1006) (e.g., as represented by arrow 1012). In some examples, the textual representation is transmitted to the one or more servers so that the one or more servers may include the textual representation in a shared transcription (e.g., a shared note or file stored on the one or more servers that corresponds to the established voice communication session and that contains one or more textual representations).

At block 1408, the first user device receives a shared transcription from the one or more servers (e.g., as represented by arrow 1016), wherein the shared transcription includes the textual representation of the user voice input and one or more additional textual representations generated by a second user device of the at least two user devices (e.g., user device 1004), and wherein the one or more additional textual representations correspond to one or more user voice inputs received at the second user device during the video communication session (e.g., textual representations generated based on one or more user voice inputs received at the second user device before and/or after the first user device receives the user voice input). In some examples, the second user device also receives the shared transcription from the one or more severs (e.g., as represented by arrow 1018).

In some examples, the shared transcription further includes a textual representation of a digital assistant response provided during the video communication session (e.g., a digital assistant response determined/provided by a digital assistant of the first user device or a digital assistant of the second user device), as shown at block 1410. In some examples, the digital assistant response provided during the video communication session is based on a user voice input of the one or more user voice inputs received at the second user device, as shown at block 1412.

In some examples, at block 1414, the first user device displays, on a display of the first user device, the textual representations included in the shared transcription (or at least one textual representation of the textual representations included in the shared transcription). In some examples, e textual representations included in the shared transcription are displayed as overlaying a user interface for the video communication session (e.g., as live transcript 1108), as shown at block 1416.

At block 1418, the first user device determines, based on the textual representations included in the shared transcription, one or more candidate tasks that may be performed by a digital assistant of the first user device (e.g., setting a reminder, creating a calendar event, setting an alarm, creating a new contact, requesting a service from a third-party application (e.g., requesting an Uber car using the Uber Application), and/or the like). In some examples, determining the one or more candidate tasks includes performing natural language processing of the textual representations included in the shared transcription (e.g., at the first user device or at the one or more servers) and determining the one or more candidate tasks based on results of the natural language processing.

In some examples, at block 1420, prior to presenting the one or more candidate tasks, the first user device receives a user input (e.g., a user voice input, a selection of a displayed affordance (e.g., a conversation mute affordance or a private digital assistant conversation affordance), or a physical button press).

In some examples, at block 1422, in accordance with a determination that the user input represents a user intent to provide a private digital assistant request, the first user device receives a second user voice input (e.g., "Hey Siri, how is the weather in Palo Alto?"), as shown at block 1424. Then, in some examples, the first user device obtains a digital assistant response based on the second user voice input, as shown at block 1426.

In some examples, after obtaining the digital assistant response based on the second user voice input, the first user device forgoes transmitting a textual representation of the second user voice input and a textual representation of the digital assistant response to the one or more servers (e.g., so that neither the second user voice input nor the digital assistant response are included in the shared transcription), as shown at block 1428. Then, in some examples, the first user device outputs the digital assistant response (e.g., as an audio output using a speaker of the first user device), as shown at block 1430.

At block 1432, the first user device presents the one or more candidate tasks (e.g., as represented by arrow 1020).

In some examples, the first user device presents the one or more candidate tasks during the video communication session (e.g., as a text message within a text messaging application of the first user device and/or as a notification from the digital assistant of the first user device (e.g., a banner notification, a notification in a notification history interface, and/or the like), as shown at block 1434. In some examples, the first user device presents the one or more candidate tasks during the video communication session in response to a user voice input representing a user intent of requesting the one or more candidate tasks (e.g., "Hey Siri, do I have any action items?").

In some examples, the first user device presents the one or more candidate tasks in an audio output after the video communication session has ended (e.g., with or without a corresponding user interface), wherein the audio output requests a user input with respect to the one or more candidate tasks (e.g., requesting user confirmation of the one or more candidate tasks, requesting a user to select at least one candidate task of the one or more candidate tasks for the digital assistant to perform, requesting user permission to perform a candidate task of the one or more candidate tasks, or the like), as shown at block 1436. In some examples, the first user device presents the one or more candidate tasks after the video communication session in response to a user voice input representing a user intent of requesting the one or more candidate tasks (e.g., "Hey Siri, do I have any action items?").

In some examples, the first user device presents the one or more candidate tasks as one or more task suggestions (e.g., in a lock screen interface) after the video communication session has ended.

Figure 15A:
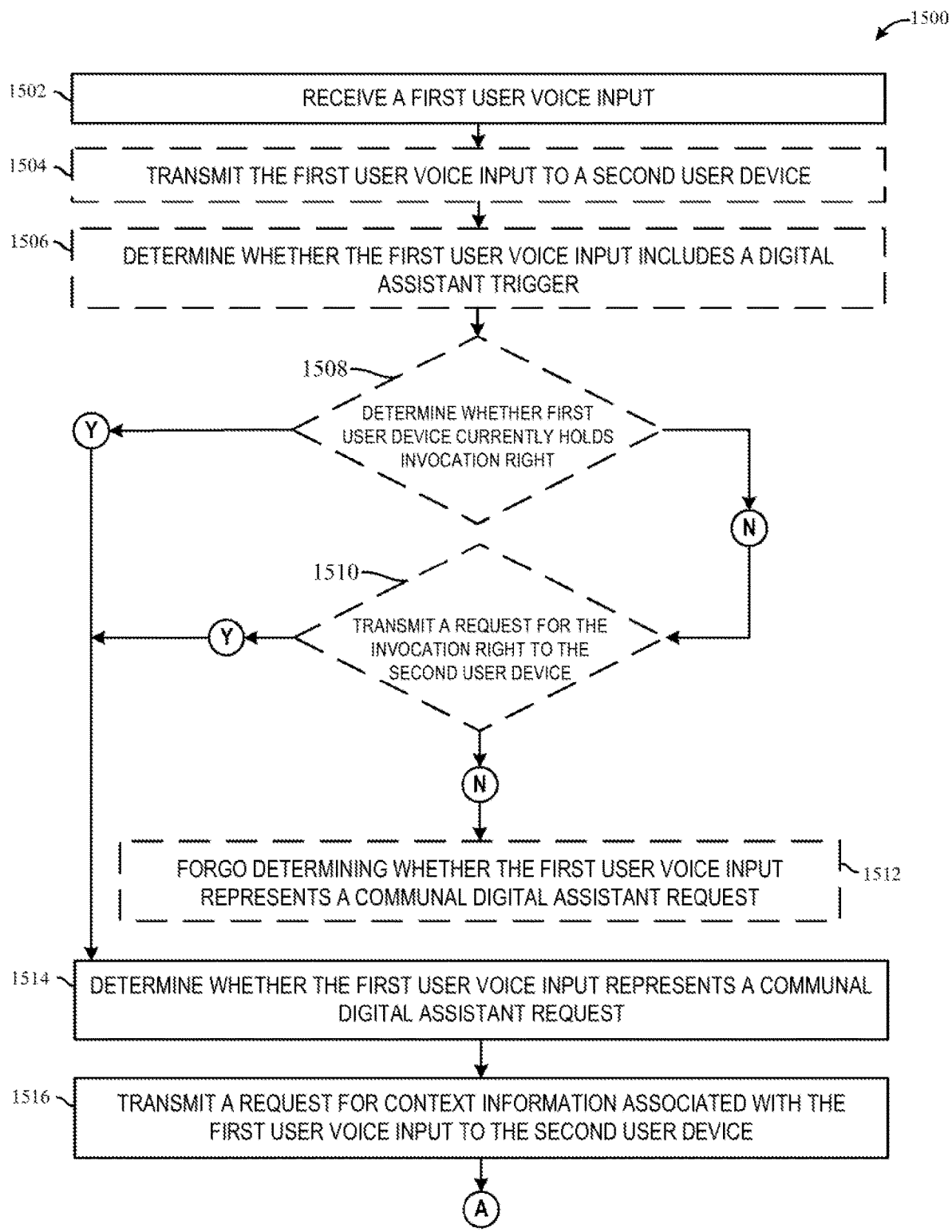
FIGS. 15A-B illustrate a flow chart representing a process for providing a digital assistant response to a communal digital assistant request during a video communication session, according to various examples.
Figure 15B:
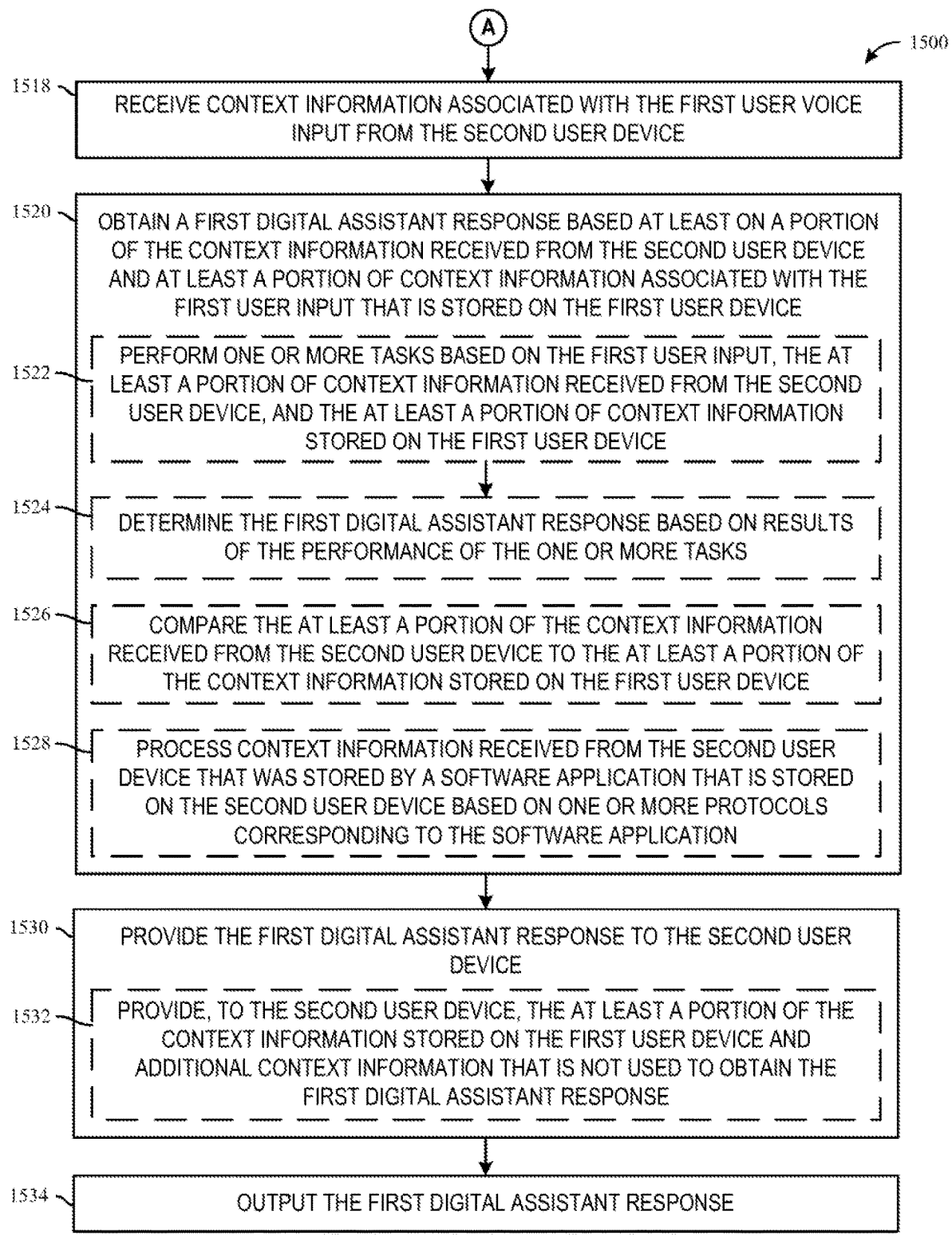

FIGS. 15A-B illustrate a flow chart representing a process for providing a digital assistant response to a communal digital assistant request during a video communication session, according to various examples. Process 1500 is performed, for example, using one or more electronic devices implementing a digital assistant. In some examples, process 1500 is performed using a client-server system (e.g., system 100), and the blocks of process 1500 are divided up in any manner between the server (e.g., DA server 106) and a client device. In other examples, the blocks of process 1500 are divided up between the server and multiple client devices (e.g., a mobile phone and a smart watch). Thus, while portions of process 1500 are described herein as being performed by particular devices of a client-server system, it will be appreciated that process 1500 is not so limited. In other examples, process 1500 is performed using only a client device (e.g., user device 104) or only multiple client devices. In process 1500, some blocks are, optionally, combined, the order of some blocks is, optionally, changed, and some blocks are, optionally, omitted. In some examples, additional steps may be performed in combination with the process 1500.

In some examples, process 1500 (or at least a portion of process 1500) is performed during a video communication session (e.g., a video conference, a virtual reality video session, or the like) between at least two user devices (e.g., as represented by arrow 1206).

At block 1502, a first user device of the at least two user devices receives a first user input (e.g., "Hey Siri, find a time for us to meet." or "Hey Siri, play a song that John and I would like.") (e.g., as represented by arrow 1208).

In some examples, at block 1504, after receiving the first user voice input, the first user device transmits the first user voice input to a second user device (e.g., user device 1204) of the at least two user devices (e.g., as audio data via an audio stream or as text data).

In some examples, at block 1506, in response to receiving the first user voice input and prior to determining whether the first user voice input represents a communal digital assistant request (e.g., at block 1514 below), the first user device determines whether the first user voice input includes a digital assistant trigger (e.g., "Hey Siri . . . "). In some examples, in accordance with a determination that the first user voice input includes a digital assistant trigger, at block 1508, the first user device determines whether the first user device currently holds a digital assistant invocation permission (e.g., the "baton" needed to invoke a digital assistant during a video communication session). Only one user device participating in the video communication session may hold the digital assistant invocation permission at one time.

In some examples, in accordance with a determination that the first user device currently holds the digital assistant invocation permission, the first user device determines whether the first user voice input represents a communal digital assistant request (e.g., at block 1514 below).

In some examples, in accordance with a determination that the first user device does not currently hold the digital assistant invocation permission, at block 1510, the first user device transmits a request to the second user device for the second user device to provide the digital assistant invocation permission to the first user device. In some examples, at block 1512, the first user device forgoes determining whether the first user voice input represents a communal digital assistant request in response to not receiving the digital assistant invocation permission from the second user device within a predetermined period of time (e.g., 0.5 seconds, 1 second, or 2 seconds). In some examples, the first user device receives a request denial from the second user device and forgoes determining whether the first user voice input represents a communal digital assistant request in response to receiving the request denial. In some examples, after forgoing the determination of whether the first user voice input represents a communal digital assistant request, the first user device displays an indication that a digital assistant of the first user device is currently unavailable or that a digital assistant of the second user device is currently invoked.

In some examples, the first user device determines whether the first user voice input represents a communal digital assistant request in response to receiving the digital assistant invocation permission from the second user device (e.g., at block 1514 below).

At block 1514, the first user device determines whether the first user voice input represents a communal digital assistant request (e.g., a user request for a digital assistant of the first user device to perform a task based on context information (e.g., user-specific information/data) associated with at least two user devices participating in the video communication session. In some examples, determining whether the first user voice input represents a communal digital assistant request includes determining whether context information from at least two user devices participating in the video communication session can be used to fulfill the user request (e.g., to perform one or more tasks associated with the user request). In some examples, determining whether the first user voice input represents a communal digital assistant request includes determining whether the first user voice input references more than one participant of the video communication session (e.g., based on the first user voice input including a proper name (e.g., a stored contact name) of two or more video communication session participants, based on the first user voice input including at least one proper name of a video communication session participant and a first-person singular pronoun (e.g., "I" or "me"), and/or based on the first user voice input including at least one plural pronoun (e.g., "us," "they," "them," "both," "our," and/or "we")).);

At block 1516, in accordance with a determination that the first user voice input represents a communal digital assistant request, the first user device transmits a request to the second user device for the second user device to provide context information associated with the first user voice input to the first user device (e.g., as represented by arrow 1210). In some examples, the request for the context information associated with the first user voice input is a request for the second user device to provide a specific piece of context information (e.g., user-specific calendar entries for a particular date). In some examples, the request for the context information associated with the first user voice input is a request for the second user device to provide a specific type of context information based on a domain of the communal digital assistant request (e.g., user-specific restaurant information and/or preferences (e.g., recently visited restaurants, favorite restaurants, etc.) based on a "restaurant reservation" domain, user-specific music information and/or preferences (e.g., recently played songs, favorite songs, etc.) based on a "music playing" domain, user-specific calendar information (e.g., all user-specific calendar information, not for a specific date) based on a "schedule a meeting" domain). In some examples, the request for the context information associated with the first user voice input is a request for the second user device to provide all user-specific information and/or preferences stored on the second user device.

At block 1518, the first user device receives context information associated with the first user voice input from the second user device (e.g., as represented by arrow 1212). In some examples, the context information received from the second user device includes at least one of user-specific calendar data, user-specific music preference data, user-specific restaurant preference data, and a current location of the second user device. In some examples, the context information received from the second user device includes context information that was stored by a software application (e.g., a third-party software application (e.g., Google Calendar)) that is stored on the second user device.

At block 1520, the first user device obtains a first digital assistant response based at least on a portion of the context information received from the second user device and at least a portion of context information associated with the first user voice input that is stored on the first user device. In some examples, obtaining the first digital assistant response further includes processing the context information received from the second user device to extrapolate the context information needed to fulfill the communal digital assistant request.

In some examples, at block 1522, obtaining the first digital assistant response includes the first user device performing one or more tasks based on the first user voice input, the at least a portion of the context information received from the second user device, and the at least a portion of context information associated with the first user voice input that is stored on the first user device. In some examples, performing the one or more tasks includes transmitting at least the first user voice input (e.g., audio data corresponding to the first user voice input) to one or more servers and subsequently receiving, from the one or more servers, one or more commands to perform the one or more tasks. In some of these examples, the one or more servers determine the one or more commands based at least on natural language processing results for the first user voice input. In some examples, at block 1524, the first user device determines the first digital assistant response based on results of the performance of the one or more tasks.

In some examples, at block 1526, obtaining the first digital assistant response includes the first user device comparing at least a portion of the context information received from the second user device to at least a portion of the context information associated with the first user voice input that is stored on the first user device (e.g., comparing calendar information associated with a user of the second user device to calendar information associated with a user of the first user device).

In some of the examples described above in which context information received from the second user device includes context information that was stored by a software application (e.g., a third-party software application (e.g., Google Calendar)) that is stored on the second user device, at block 1528, obtaining the first digital assistant response includes the first user device processing the context information received from the second user device based on one or more protocols corresponding to the software application.

At block 1530, the first user device provides the first digital assistant response to the second user device (e.g., as represented by arrow 1214). In some examples, providing the first digital assistant response to the second user device includes the first user device transmitting the first digital assistant response directly to the second user device. In some examples, providing the first digital assistant response to the second user device includes the first user device transmitting the first digital assistant response to one or more servers. In these examples, the one or more servers subsequently transmit the first digital assistant response to the second user device.

In some examples, the first user device provides the first digital assistant response to the second user device (and/or one or more servers) as text data (e.g., a textual representation of the first digital assistant response). In some examples, the second user device performs text-to-speech processing of the text data to output the first digital assistant response as an audio output.

In some examples, the first user device provides the first digital assistant response to the second user device (and/or one or more servers) as audio data via an audio stream (e.g., an audio stream established between the first user device and the second user device when the first user device and the second user device initiated the video communication session).

In some examples, providing the first digital assistant response to the second user device causes the second user device to output the first digital assistant response (e.g., as an audio output) (e.g., as represented by arrow 1216).

In some examples, the first digital assistant response includes at least one of a natural-language expression corresponding to a task performed by a digital assistant of the first user device based on the first user voice input, the at least a portion of the context information received from the second user device, and the at least a portion of the context information associated with the first user voice input that is stored on the first user device; and data retrieved by the digital assistant of the first user device based on the first user voice input, the at least a portion of the context information received from the second user device, and the at least a portion of the context information associated with the first user voice input that is stored on the first user device.

In some examples, at block 1532, providing the first digital assistant response further includes the first user device providing, to the second user device, the at least a portion of the context information associated with the first user voice input that is stored on the first user device and/or additional context information (e.g., associated with the first user voice input) that is not used to obtain the first digital assistant response (e.g., a digital assistant dialog history for the first user device during the video communication session) (e.g., as represented by arrow 1214). In some examples, the first user device provides the context information associated with the first user voice input that is stored on the first user device and/or the additional context information to the second user device when the first user device provides the first digital assistant response to the second user device. In some examples, the context information associated with the first user voice input that is stored on the first user device and/or the additional context information is used by the second user device to determine a second digital assistant response for a second user voice input (e.g., to create a continuous digital assistant conversation as described above with reference to FIG. 8)).

In some examples, at block 1534, the first user device outputs the first digital assistant response (e.g., as represented by arrow 1216). In some examples, outputting the first digital assistant response includes the first user device outputting the first digital assistant response as an audio output (e.g., at a speaker of the first user device). In some examples, the first user device outputs the first digital assistant response as an audio output based on one or more predefined digital assistant language and/or digital assistant voice settings of the first user device.

In some examples, outputting the first digital assistant response includes the first user device displaying the first digital assistant response (e.g., a textual representation of the first digital assistant response and/or data that is retrieved and/or determined by the digital assistant) on a display of the first user device. In some examples, each of the user devices participating in the video communication session (e.g., the first user device and the second user device) concurrently output the first digital assistant response (e.g., within 1 or 2 second time-range).

The operations described above with reference to FIGS. 13A-C, 14A-B, and 15A-B are optionally implemented by components depicted in FIGS. 1-4, 6A-B, and 7A-C. For example, the operations of process 1300, process 1400, and/or process 1500 may be implemented by system 100. It would be clear to a person having ordinary skill in the art how other processes are implemented based on the components depicted in FIGS. 1-4, 6A-B, and 7A-C.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data (e.g., user-specific context information) available from various sources to assist with/improve the determination of digital assistant responses during a video communication session. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine one or more parameters of a task to be performed by digital assistant of a user device during a video communication session. Accordingly, use of such personal information data enables a digital assistant of a user device to provide a digital assistant response during the video communication session (based on the performance of the above task) that is more relevant and/or useful to users participating in the video communication session. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gathering and using user-specific context information to assist with/improve the determination of digital assistant responses during a video communication session, the present technology can be configured to allow users to select to "opt in" or "opt out" of participation in the collection of personal information data during registration for services or anytime thereafter. In another example, users can select not to provide user-specific context information to assist with/improve the determination of digital assistant responses during a video communication session. In yet another example, users can select to prevent the gathering and use of certain types/forms of user-specific context information (e.g., home addresses, email addresses, phone numbers, location data, or the like) for the determination of digital assistant responses during a video communication session. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, digital assistant responses can be determined during a video communication session based on non-personal information data or a bare minimum amount of personal information, such as the content being requested by the device associated with a user, other non-personal information available to the digital assistant, or publicly available information.

What is claimed is:

1. A method, comprising:
   during a video communication session between at least two user devices, and at a first user device of the at least two user devices;
   receiving a first user voice input;
   determining whether the first user voice input represents a communal digital assistant request;
   in accordance with a determination that the first user voice input represents a communal digital assistant request, transmitting a request to a second user device of the at least two user devices for the second user device to provide context information associated with the first user voice input to the first user device;
   receiving the context information associated with the first user voice input from the second user device;
   obtaining a first digital assistant response based at least on a portion of the context information received from the second user device and at least a portion of context information associated with the first user voice input that is stored on the first user device;
   providing the first digital assistant response to the second user device; and
   outputting the first digital assistant response.

2. The method of claim 1, wherein the context information received from the second user device includes at least one of user-specific calendar data, user-specific music preference data, user-specific restaurant preference data, and a current location of the second user device.

3. The method of claim 1, wherein the first digital assistant response comprises at least one of:
- a natural-language expression corresponding to a task performed by a digital assistant of the first user device based on the first user voice input, the at least a portion of the context information received from the second user device, and the at least a portion of the context information associated with the first user voice input that is stored on the first user device; and
- data retrieved by the digital assistant of the first user device based on the first user voice input, the at least a portion of the context information received from the second user device, and the at least a portion of the context information associated with the first user voice input that is stored on the first user device.

4. The method of claim 1, wherein obtaining the first digital assistant response includes:
- performing one or more tasks based on the first user voice input, the at least a portion of the context information received from the second user device, and the at least a portion of the context information associated with the first user voice input that is stored on the first user device; and
- determining the first digital assistant response based on results of the performance of the one or more tasks.

5. The method of claim 1, wherein obtaining the first digital assistant response includes comparing the at least a portion of the context information received from the second user device to the at least a portion of the context information associated with the first user voice input that is stored on the first user device.

6. The method of claim 1, wherein the context information received from the second user device was stored by a software application stored on the second user device, wherein obtaining the first digital assistant response includes processing the context information received from the second user device based on one or more protocols corresponding to the software application.

7. The method of claim 1, wherein the first user device provides the first digital assistant response to the second user device as text data.

8. The method of claim 1, wherein the first user device provides the first digital assistant response to the second user device as audio data via an audio stream.

9. The method of claim 1, further comprising:
- prior to transmitting the request to the second user device, transmitting the first user voice input to the second user device.

10. The method of claim 1, further comprising:
- prior to outputting the first digital assistant response, providing, to the second user device, the at least a portion of the context information associated with the first user voice input that is stored on the first user device and additional context information that is not used to obtain the first digital assistant response.

11. The method of claim 1, wherein providing the first digital assistant response to the second user device causes the second user device to output the first digital assistant response.

12. The method of claim 1, further comprising:
- in response to receiving the first user voice input and prior to determining whether the first user voice input represents a communal digital assistant request, determining whether the first user voice input includes a digital assistant trigger; and
- in accordance with a determination that the first user voice input includes the digital assistant trigger, determining whether the first user device currently holds a digital assistant invocation permission, wherein the first user device determines whether the first user voice input represents a communal digital assistant request in accordance with a determination that the first user device currently holds the digital assistant invocation permission.

13. The method of claim 12, further comprising:
- in accordance with a determination that the first user device does not currently hold the digital assistant invocation permission, transmitting a request to the second user device for the second user device to provide the digital assistant invocation permission to the first user device,
- wherein the first user device determines whether the first user voice input represents a communal digital assistant request in response to receiving the digital assistant invocation permission from the second user device, and
- wherein the first user device forgoes determining whether the first user voice input represents a communal digital assistant request in response to not receiving the digital assistant invocation permission from the second user device within a predetermined period of time.

14. A first user device, comprising:
- a display;
- one or more processors;
- a memory; and
- one or more programs, wherein the one or more programs are stored in the memory and configured to be executed by the one or more processors, wherein the one or more programs include instructions for:
- during a video communication session between the first user device and at least a second user device:
  - receiving a first user voice input;
  - determining whether the first user voice input represents a communal digital assistant request;
  - in accordance with a determination that the first user voice input represents a communal digital assistant request, transmitting a request to a second user device of the at least two user devices for the second user device to provide context information associated with the first user voice input to the first user device;
  - receiving the context information associated with the first user voice input from the second user device;
  - obtaining a first digital assistant response based at least on a portion of the context information received from the second user device and at least a portion of context information associated with the first user voice input that is stored on the first user device;
  - providing the first digital assistant response to the second user device; and
  - outputting the first digital assistant response.

15. The first user device of claim 14, wherein the context information received from the second user device includes at least one of user-specific calendar data, user-specific music preference data, user-specific restaurant preference data, and a current location of the second user device.

16. The first user device of claim 14, wherein the first digital assistant response comprises at least one of:
- a natural-language expression corresponding to a task performed by a digital assistant of the first user device based on the first user voice input, the at least a portion of the context information received from the second user device, and the at least a portion of the context information associated with the first user voice input that is stored on the first user device; and data retrieved by the digital assistant of the first user device based on the first user voice input, the at least a portion of the context information received from the second user device, and the at least a portion of the context information associated with the first user voice input that is stored on the first user device.

17. The first user device of claim 14, wherein obtaining the first digital assistant response includes:
performing one or more tasks based on the first user voice input, the at least a portion of the context information received from the second user device, and the at least a portion of the context information associated with the first user voice input that is stored on the first user device; and
determining the first digital assistant response based on results of the performance of the one or more tasks.

18. The first user device of claim 14, wherein obtaining the first digital assistant response includes comparing the at least a portion of the context information received from the second user device to the at least a portion of the context information associated with the first user voice input that is stored on the first user device.

19. The first user device of claim 14, wherein the context information received from the second user device was stored by a software application stored on the second user device, wherein obtaining the first digital assistant response includes processing the context information received from the second user device based on one or more protocols corresponding to the software application.

20. The first user device of claim 14, wherein the first user device provides the first digital assistant response to the second user device as text data.

21. The first user device of claim 14, wherein the first user device provides the first digital assistant response to the second user device as audio data via an audio stream.

22. The first user device of claim 14, wherein the one or more programs further include instructions for:
prior to transmitting the request to the second user device, transmitting the first user voice input to the second user device.

23. The first user device of claim 14, wherein the one or more programs further include instructions for:
prior to outputting the first digital assistant response, providing, to the second user device, the at least a portion of the context information associated with the first user voice input that is stored on the first user device and additional context information that is not used to obtain the first digital assistant response.

24. The first user device of claim 14, wherein providing the first digital assistant response to the second user device causes the second user device to output the first digital assistant response.

25. The first user device of claim 14, wherein the one or more programs further include instructions for:
in response to receiving the first user voice input and prior to determining whether the first user voice input represents a communal digital assistant request, determining whether the first user voice input includes a digital assistant trigger; and
in accordance with a determination that the first user voice input includes the digital assistant trigger, determining whether the first user device currently holds a digital assistant invocation permission, wherein the first user device determines whether the first user voice input represents a communal digital assistant request in accordance with a determination that the first user device currently holds the digital assistant invocation permission.

26. The first user device of claim 25, wherein the one or more programs further include instructions for:
in accordance with a determination that the first user device does not currently hold the digital assistant invocation permission, transmitting a request to the second user device for the second user device to provide the digital assistant invocation permission to the first user device,
wherein the first user device determines whether the first user voice input represents a communal digital assistant request in response to receiving the digital assistant invocation permission from the second user device, and
wherein the first user device forgoes determining whether the first user voice input represents a communal digital assistant request in response to not receiving the digital assistant.

27. A non-transitory computer-readable storage medium storing one or more programs, the one or more programs comprising instructions, which when executed by one or more processors of a first user device with a display, cause the first user device to:
during a video communication session between the first user device and at least a second user device:
receive a first user voice input;
determine whether the first user voice input represents a communal digital assistant request;
in accordance with a determination that the first user voice input represents a communal digital assistant request, transmit a request to a second user device of the at least two user devices for the second user device to provide context information associated with the first user voice input to the first user device;
receive the context information associated with the first user voice input from the second user device;
obtain a first digital assistant response based at least on a portion of the context information received from the second user device and at least a portion of context information associated with the first user voice input that is stored on the first user device;
provide the first digital assistant response to the second user device; and
output the first digital assistant response.

28. The non-transitory computer-readable storage medium of claim 27, wherein the context information received from the second user device includes at least one of user-specific calendar data, user-specific music preference data, user-specific restaurant preference data, and a current location of the second user device.

29. The non-transitory computer-readable storage medium of claim 27, wherein the first digital assistant response comprises at least one of:
a natural-language expression corresponding to a task performed by a digital assistant of the first user device based on the first user voice input, the at least a portion of the context information received from the second user device, and the at least a portion of the context information associated with the first user voice input that is stored on the first user device; and
data retrieved by the digital assistant of the first user device based on the first user voice input, the at least a portion of the context information received from the second user device, and the at least a portion of the context information associated with the first user voice input that is stored on the first user device.

30. The non-transitory computer-readable storage medium of claim 27, wherein obtaining the first digital assistant response includes:
- performing one or more tasks based on the first user voice input, the at least a portion of the context information received from the second user device, and the at least a portion of the context information associated with the first user voice input that is stored on the first user device; and
- determining the first digital assistant response based on results of the performance of the one or more tasks.

31. The non-transitory computer-readable storage medium of claim 27, wherein obtaining the first digital assistant response includes comparing the at least a portion of the context information received from the second user device to the at least a portion of the context information associated with the first user voice input that is stored on the first user device.

32. The non-transitory computer-readable storage medium of claim 27, wherein the context information received from the second user device was stored by a software application stored on the second user device, wherein obtaining the first digital assistant response includes processing the context information received from the second user device based on one or more protocols corresponding to the software application.

33. The non-transitory computer-readable storage medium of claim 27, wherein the first user device provides the first digital assistant response to the second user device as text data.

34. The non-transitory computer-readable storage medium of claim 27, wherein the first user device provides the first digital assistant response to the second user device as audio data via an audio stream.

35. The non-transitory computer-readable storage medium of claim 27, wherein the one or more programs further include instructions, which when executed by the one or more processors, cause the first user device to:
- prior to transmitting the request to the second user device, transmit the first user voice input to the second user device.

36. The non-transitory computer-readable storage medium of claim 27, wherein the one or more programs further include instructions, which when executed by the one or more processors, cause the first user device to:
- prior to outputting the first digital assistant response, provide, to the second user device, the at least a portion of the context information associated with the first user voice input that is stored on the first user device and additional context information that is not used to obtain the first digital assistant response.

37. The non-transitory computer-readable storage medium of claim 27, wherein providing the first digital assistant response to the second user device causes the second user device to output the first digital assistant response.

38. The non-transitory computer-readable storage medium of claim 27, wherein the one or more programs further include instructions, which when executed by the one or more processors, cause the first user device to:
- in response to receiving the first user voice input and prior to determining whether the first user voice input represents a communal digital assistant request, determine whether the first user voice input includes a digital assistant trigger; and
- in accordance with a determination that the first user voice input includes the digital assistant trigger, determine whether the first user device currently holds a digital assistant invocation permission, wherein the first user device determines whether the first user voice input represents a communal digital assistant request in accordance with a determination that the first user device currently holds the digital assistant invocation permission.

39. The non-transitory computer-readable storage medium of claim 38, wherein the one or more programs further include instructions, which when executed by the one or more processors, cause the first user device to:
- in accordance with a determination that the first user device does not currently hold the digital assistant invocation permission, transmit a request to the second user device for the second user device to provide the digital assistant invocation permission to the first user device,
- wherein the first user device determines whether the first user voice input represents a communal digital assistant request in response to receiving the digital assistant invocation permission from the second user device, and
- wherein the first user device forgoes determining whether the first user voice input represents a communal digital assistant request in response to not receiving the digital assistant.

* * * * *

UNITED STATES PATENT AND TRADEMARK OFFICE
CERTIFICATE OF CORRECTION

PATENT NO. : 11,837,232 B2
APPLICATION NO. : 18/115721
DATED : December 5, 2023
INVENTOR(S) : Niranjan Manjunath et al.

It is certified that error appears in the above-identified patent and that said Letters Patent is hereby corrected as shown below:

In the Specification

Column 19, Line 23, delete "contacts 237" and insert --contacts module 237--.

Column 19, Line 24, delete "email 240" and insert --e-mail client module 240--.

Column 19, Line 24, delete "browser 247" and insert --browser module 247--.

Column 19, Line 28, delete "telephone 238" and insert --telephone module 238--.

Column 19, Line 29, delete "camera 243" and insert --camera module 243--.

Column 21, Line 16, delete "telephone 238" and insert --telephone module 238--.

Column 21, Line 17, delete "e-mail 240" and insert --e-mail client module 240--.

Column 21, Line 17, delete "IM 241" and insert --IM module 241--.

Column 84, Line 48, delete "that the context that the context" and insert --that the context--.

In the Claims

Column 98, Line 33, Claim 14, delete "a second user device:" and insert --the second user device:--.

Signed and Sealed this
Fifth Day of November, 2024

Katherine Kelly Vidal
*Director of the United States Patent and Trademark Office*